(12) United States Patent
Chang et al.

(10) Patent No.: US 11,861,337 B2
(45) Date of Patent: Jan. 2, 2024

(54) DEEP NEURAL NETWORKS COMPILER FOR A TRACE-BASED ACCELERATOR

(71) Applicant: Micron Technology, Inc., Boise, ID (US)

(72) Inventors: Andre Xian Ming Chang, Seattle, WA (US); Aliasger Zaidy, Seattle, WA (US); Eugenio Culurciello, Seattle, WA (US); Marko Vitez, Trieste (IT)

(73) Assignee: Micron Technology, Inc., Boise, ID (US)

( * ) Notice: Subject to any disclaimer, the term of this patent is extended or adjusted under 35 U.S.C. 154(b) by 278 days.

(21) Appl. No.: 17/003,476

(22) Filed: Aug. 26, 2020

(65) Prior Publication Data

US 2022/0066760 A1 Mar. 3, 2022

(51) Int. Cl.
*G06F 8/41* (2018.01)
*G06F 9/30* (2018.01)
(Continued)

(52) U.S. Cl.
CPC .......... *G06F 8/458* (2013.01); *G06F 9/30087* (2013.01); *G06F 9/5027* (2013.01); *G06N 3/02* (2013.01)

(58) Field of Classification Search
CPC .... G06F 8/458; G06F 9/30087; G06F 9/5027; G06N 3/02
(Continued)

(56) References Cited

U.S. PATENT DOCUMENTS 6,601,117 B1 * 7/2003 Dahlen .................. G06F 9/466
710/52
8,442,927 B2 5/2013 Chakradhar et al.
(Continued)

FOREIGN PATENT DOCUMENTS

WO WO2018094099 A1 5/2018

OTHER PUBLICATIONS

International Search Report for International Application No. PCT/US2020/048073, dated May 21, 2021, pp. 1-3.
(Continued)

*Primary Examiner* — Chat C Do
*Assistant Examiner* — Bradford F Wheaton
(74) *Attorney, Agent, or Firm* — Nancy R. Gamburd; Gamburd Law Group LLC

(57) ABSTRACT

A method of compiling neural network code to executable instructions for execution by a computational acceleration system having a memory circuit and one or more acceleration circuits having a maps data buffer and a kernel data buffer is disclosed, such as for execution by an inference engine circuit architecture which includes a matrix-matrix (MM) accelerator circuit having multiple operating modes to provide a complete matrix multiplication. A representative compiling method includes generating a list of neural network layer model objects; fusing available functions and layers in the list; selecting a cooperative mode, an independent mode, or a combined cooperative and independent mode for execution; selecting a data movement mode and an ordering of computations which reduces usage of the memory circuit; generating an ordered sequence of load objects, compute objects, and store objects; and converting the ordered sequence of load objects, compute objects, and store objects into the executable instructions.

22 Claims, 23 Drawing Sheets

(51) Int. Cl.
*G06F 9/50* (2006.01)
*G06N 3/02* (2006.01)

(58) Field of Classification Search
USPC .......................................................... 717/140
See application file for complete search history.

(56) References Cited

U.S. PATENT DOCUMENTS

| | | | |
|---|---|---|---|
| 8,533,431 | B2 | 9/2013 | Master et al. |
| 8,620,881 | B2 | 12/2013 | Chamberlain et al. |
| 10,019,245 | B2* | 7/2018 | Egorov ............... G06F 16/9024 |
| 2002/0067501 | A1* | 6/2002 | Watanabe ............. G06F 3/1244 358/1.15 |
| 2007/0150718 | A1* | 6/2007 | Toi ........................ G06F 1/3218 713/100 |
| 2008/0046871 | A1* | 2/2008 | Nair ........................ G06F 8/443 717/140 |
| 2008/0120260 | A1 | 5/2008 | Yancey |
| 2012/0131235 | A1* | 5/2012 | Nageshappa ......... H04L 69/162 710/52 |
| 2018/0096226 | A1* | 4/2018 | Aliabadi .................. G06N 3/10 |
| 2018/0341495 | A1* | 11/2018 | Culurciello .......... G06F 9/30036 |
| 2019/0266485 | A1* | 8/2019 | Singh .................... G06N 3/0454 |
| 2019/0311245 | A1* | 10/2019 | Zhang .................... G06N 3/105 |
| 2019/0340498 | A1* | 11/2019 | Mills .................... G06N 3/0454 |
| 2020/0153605 | A1* | 5/2020 | Hu ........................ H04L 9/3247 |
| 2020/0175396 | A1* | 6/2020 | Boyce ....................... G06T 1/20 |
| 2020/0321374 | A1* | 10/2020 | Ion .................... H01L 27/14605 |
| 2020/0364288 | A1* | 11/2020 | Wen ...................... G06N 3/0454 |
| 2021/0027082 | A1* | 1/2021 | Faion ................. G06F 18/2155 |
| 2021/0064622 | A1* | 3/2021 | Lee ..................... G06F 12/1009 |
| 2021/0303939 | A1* | 9/2021 | Hu ........................ G06K 9/6293 |

OTHER PUBLICATIONS

Zaidy, Aliasger et al., A High Efficiency Accelerator for Deep Neural Networks, 2018 1st Workshop on Energy Efficient Machine Learning and Cognitive Computing for Embedded Applications (EMC2), IEEE, Mar. 25, 2018, pp. 9-13, XP033441891.

Gokhale, Vinayak et al., Snowflake: A Model Agnositc Accelerator for Deep Convolutional Neural Networks, arXiv.org, Cornell University Library, arXiv:1708.02579v1 [cs.AR], Aug. 8, 2017, pp. 1-11.

A. Krizhevsky, One weird trick for parallelizing convolutional neural networks, arXiv.org, Cornell University Library, arXiv:1404. 5997v2 [cs.NE], https://arxiv.org/abs/1404.5997, Apr. 26, 2014, pp. 1-7.

C. Szegedy et al., Going deeper with convolutions, The IEEE Conference on Computer Vision and Pattern Recognition (CVPR), Jun. 2015, pp. 1-9.

C. Szegedy et al., Rethinking the inception architecture for computer vision, CoRR, vol. abs/1512.00567, 2015, pp. 1-9.

K. He et al., "Deep residual learning for image , recognition," CoRR, vol. abs/1512.03385, 2015, pp. 1-9.

J. Long et al., Fully convolutional networks for semantic segmentation in the IEEE Conference on Computer Vision and Pattern Recognition (CVPR), Jun. 2015, pp. 1-10.

Z. Wu et al., Wider or deeper: Revisiting the resnet model for visual recognition, CoRR, vol. abs/1611.10080, arXiv.org, Cornell University Library, arXiv:1611.10080v1 [cs.CV], Nov. 30, 2016, pp. 1-19.

A. Conneau et al., Very deep convolutional networks for text classification, arXiv.org, Cornell University Library, arXiv:1606. 01781v2 [cs.CL], Jan. 27, 2017, pp. 1-10.

Y. LeCun et al., Gradient-based learning applied to document recognition, Proceedings of the IEEE, vol. 86, No. 11, Nov. 1998, pp. 2278-2324.

O. Russakovsky et al., ImageNet Large Scale Visual Recognition Challenge, International Journal of Computer Vision (IJCV), vol. 115, No. 3, pp. 211-252, 2015.

K. He et al., Delving deep into rectifiers: Surpassing human-level performance on imagenet classification, CoRR, vol. abs/1502. 01852, Feb. 2015.

C. Szegedy et al., Inception-v4, inceptionresnet and the impact of residual connections on learning, CoRR, Proceedings of the Thirty-First AAAI Conference on Artificial Intelligence (AAAI-17), vol. abs/1602.07261, 2016.

S. Han et al. Deep compression: Compressing deep neural networks with pruning, trained quantization and huffman coding, International Conference on Learning Representations (ICLR), arXiv.org, Cornell University Library, arXiv:1510.00149v5 [cs.CV], Feb. 15, 2016, pp. 1-14.

F. N. Iandola et al., Squeezenet: Alexnet-level accuracy with 50x fewer parameters and <1mb model size, CoRR, vol. abs/1602. 07360, arXiv.org, Cornell University Library, arXiv:1602.07360v4 [cs.CV], Nov. 4, 2016, pp. 1-13.

S. Han et al., Eie: Efficient inference engine on compressed deep neural network, 2016 ACM/IEEE 43rd Annual International Symposium on Computer Architecture, 2016, pp. 243-254.

S. Han et al., Learning both weights and connections for efficient neural network, Advances in Neural Information Processing Systems (NIPS), pp. 1135-1143, 2015.

T. Chen et al., Diannao: A small-footprint high-throughput accelerator for ubiquitous machine-learning, in Proceedings of the 19th International Conference on Architectural Support for Programming Languages and Operating Systems, ASPLOS '14, (New York, NY, USA), pp. 269-284, ACM, 2014.

Z. Du et al., Shidiannao: Shifting vision processing closer to the sensor, Proceedings of the 42nd Annual International Symposium on Computer Architecture, ISCA '15, (New York, NY, USA), pp. 92-104, ACM, 2015.

C. Zhang et al., Caffeine: Towards uniformed representation and acceleration for deep convolutional neural networks, Proceedings of the 35th International Conference on Computer-Aided Design, ICCAD '16, (New York, NY, USA), pp. 12:1-12:8, ACM, 2016.

J. Qiu et al., Going deeper with embedded FPGA platform for convolutional neural network, Proceedings of the 2016 ACM/SIGDA International Symposium on Field-Programmable Gate Arrays, FPGA '16, (New York, NY, USA), pp. 26-35, ACM, 2016.

A. Krizhevsky et al., Imagenet classification with deep convolutional neural networks, Advances in Neural Information Processing Systems 25 (F. Pereira, C. J. C. Burges, L. Bottou, and K. Q. Weinberger, eds.), Curran Associates, Inc., 2012, pp. 1097-1105.

K. Simonyan et al., Very deep convolutional networks for large-scale image recognition, CoRR, vol. abs/1409.1556, arXiv.org, Cornell University Library, arXiv:1409.1556v6 [cs.CV], Apr. 10, 2015, pp. 1-14.

V. Gokhale et al., A 240 g-ops/s mobile coprocessor for deep neural networks, in Proceedings of the IEEE Conference on Computer Vision and Pattern Recognition Workshops, pp. 682-687, 2014.

C. Farabet et al., Bio-inspired vision processor for ultra-fast object categorization, Proc. High Performance Embedded Computing Workshop, 2010.

S. Gupta et al., Deep learning with limited numerical precision., Proceedings of the 32nd International Conference on Machine Learning, Lille, France, 2015. JMLR: W&CP vol. 37., pp. 1737-1746.

Y. H. Chen et al., Eyeriss: A spatial architecture for energy-efficient dataflow for convolutional neural networks, 2016 ACM/IEEE 43rd Annual International Symposium on Computer Architecture, vol. 44, pp. 367-379, Jun. 2016.

Y. H. Chen et al., Eyeriss: An energy efficient reconfigurable accelerator for deep convolutional neural networks, IEEE Journal of Solid-State Circuits, vol. 52, Jan. 2017, pp. 127-138.

C. Zhang et al., Optimizing FPGA-based accelerator design for deep convolutional neural networks, Proceedings of the 2015 ACM/SIGDA International Symposium on Field-Programmable Gate Arrays, FPGA '15, (New York, NY, USA), pp. 161-170, ACM, 2015.

P. Meloni et al., Curbing the roofline: A scalable and flexible architecture for CNNs on FPGA, Proceedings of the ACM International Conference on Computing Frontiers, CF '16, (New York, NY, USA), pp. 376-383, ACM, 2016.

(56) References Cited

OTHER PUBLICATIONS

E. Azarkhish et al., Neurostream: Scalable and energy efficient deep learning with smart memory cubes, IEEE Transactions on Parallel and Distributed Systems, vol. 29, No. 2, Feb. 2018, pp. 420-434.
L. Cavigelli et al., Origami: A 803-GOp/s/W Convolutional Network Accelerator, IEEE Transactions on Circuits and Systems for Video Technology, vol. 27, No. 11, Nov. 2017, pp. 2461-2475.
Chang et al. "Deep Neural Networks Compiler for a Trace-Based Accelerator", Journal of Systems Architecture, vol. 102 (2020) 101659, Nov. 5, 2019, pp. 1-9.
Chang et al. "Compiling Deep Learning Models for Custom Hardware Accelerators", arXiv:1708.00117v2 [cs.DC] Dec. 10, 2017, pp. 1-8.
Written Opinion of the International Searching Authority, for International Application No. PCT/US2020/048073, dated May 21, 2021, pp. 1-6.
Notification of Transmittal of the International Search Report and Written Opinion of the International Searching Authority, or the Declaration for International Application No. PCT/US2019/059118, dated Feb. 5, 2020, pp. 1-11.

\* cited by examiner

FIG. 14
MODE: COOPERATIVE
MAPS:
IN 12x4x256
OUT 10x2x128
KERNEL:
3x3x256 x3 x16
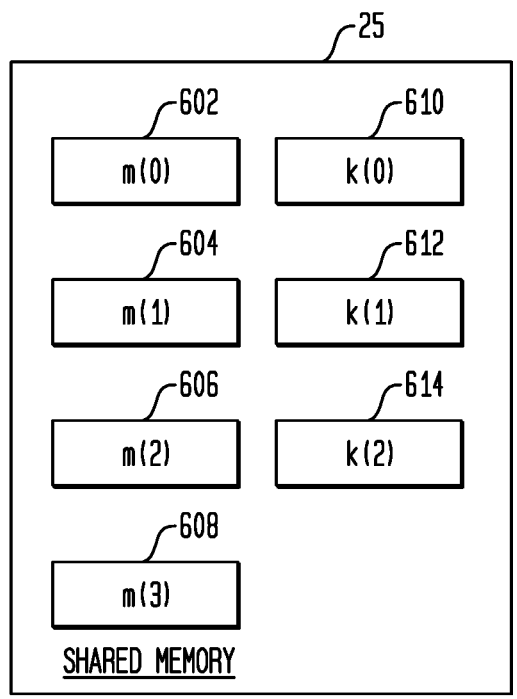
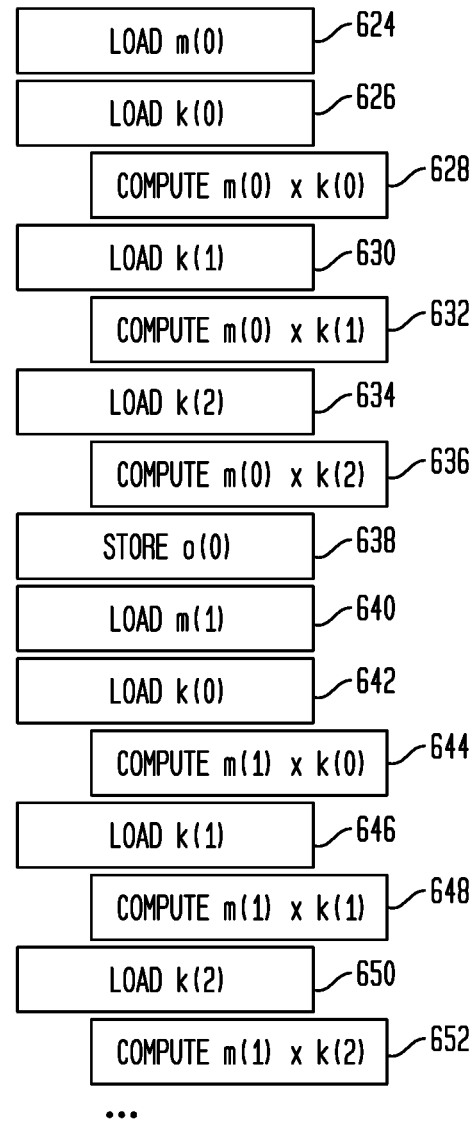
```
FOR(m=0;m<4;m++){
    LOAD(MAPS[m]);
    FOR(k=0;k<3;k++){
        LOAD(KERNEL[k]);
        OUTPUT=COMPUTE();
    }
    STORE(OUTPUT);
}
```
EXPECTED BW: 6.34 GB/s

```
MIX

← 622
FOR(m=0; m<4; m+=2){
    LOAD(MAPS[m]);
    IF(FLIP){
        FOR(k=0; k<3; k++){
            LOAD(KERNEL[k]);
            OUTPUT=COMPUTE();
            IF(K==0) LOAD(MAPS[m+1]);
        }
    }
    ELSE{
        FOR(k=2; k>0; k--){
            LOAD(KERNEL[k]);
            OUTPUT=COMPUTE();
            IF(k==0) LOAD(MAPS[M+1]);
        }
    }
    STORE(OUTPUT[m]);
    STORE(OUTPUT[m+1]);
}
```

EXPECTED BW: 2.38 GB/s

FIG. 19

```
MOV R0 maddr          // PUT Buf ADDRESS IN R0
MOV R1 kaddr          // PUT KBuf ADDRESS IN R1
MAC R0 R1             // USES R1. RAW 4 STALL CYCLES
ADD R0 += offset      // INCREMENT Buf ADDRESS IN R0
ADD R1 += offset      // INCREMENT KBuf ADDRESS IN R1
MAC R0 R1             // USES R1. RAW 4 STALL CYCLES
ADD R0 += offset
ADD R1 += offset
MAC R0 R1             // USES R1. RAW 4 STALL CYCLES
                      // TOTAL: 12 STALL CYCLES
```

```
MOV R0 maddr          // PUT Buf ADDRESS IN R0
MOV R1 kaddr          // PUT KBuf ADDRESS IN R1
MOV R2 maddr+offset
MOV R3 kaddr+offset
MOV R4 maddr+2.offset
MOV R5 kaddr+2.offset
MAC R0 R1
MAC R2 R3
MAC R4 R5             // USES R5. RAW 2 STALL CYCLES
                      // TOTAL: 2 STALL CYCLES
```

FIG. 20

```
addi(4,1,256);  //kaddr = kbuff_rd + 256
addi(5,2,0);    //maddr = mbuff_rd
addi(8,5,768);
addi(9,4,12288);
addi(10,5,1536);
addi(11,4,24576);
macv(1,1,5,4,768);
macv(1,1,8,9,768);
macv(1,6,10,11,768); //;output 0X0
```

DEEP NEURAL NETWORKS COMPILER FOR A TRACE-BASED ACCELERATOR

FIELD OF THE INVENTION

The present invention, in general, relates to compilers for generating instructions or other executable code for computing circuitry, and more particularly, relates to a compiler for an electronic circuit architecture capable of performing matrix-by-matrix multiplication which is useful in implementing convolutional neural networks, for applications such as artificial intelligence, machine learning, and image recognition.

BACKGROUND OF THE INVENTION

At the core of neural network operations are a large number of multiplications. Convolutional neural networks ("CNNs") are feed-forward neural networks having a plurality of interconnected, hierarchical layers, which are often utilized for a wide range of applications such as artificial intelligence, machine learning, and image recognition. The inputs and outputs of a CNN layers are typically three-dimensional ("3D"). For example, a typical CNN may use an image input having red, green, and blue channels, each of which is a separate two-dimensional (2D) input feature map. Two-dimensional convolutions are performed on each of these input feature maps to produce three outputs, which are then combined additively, pixel-by-pixel, to produce multiple output maps, which are then fed as input into the next CNN layer, until a final result is produced. One set of such input data, such as an input feature map, is referred to as an input "map". The input map data is then convolved with corresponding weights, referred to as a convolutional "kernel". Accordingly, for such neural networks, the most atomic operation is a multiplication between inputs (maps) and weights (kernels).

To run the deep learning applications typically used by a consumer, such as tagging photos in Facebook, or asking Alexa a question, or translating a language to another in Google, computers have to perform a large number of such multiplication of inputs or neural activations with weights. Neural networks use a huge number of weight parameters, as many as 150 million, and more typically between 30-60 million weights. This means that a neural network has to perform millions of multiplications for every input, every time it is used. And it should do so as fast as practicable, as people typically prefer not to wait or will not wait longer than about 200 milliseconds for a result.

Deep Neural Networks ("DNNs") are widely adopted in various areas, such as robotics, security and data analytics. DNNs are composed of various layers, each with a large parallel workload, making them well suited to hardware accelerators. Accelerators are a very attractive solution for deploying DNNs especially in the embedded world, where it demands real-time processing under a limited power budget.

A method to implement a programmable Deep Learning (DL) inference engine is to create a domain specific instruction set ("ISA"). Manually crafting assembly-like custom instructions can be cumbersome and error prone, especially when a model is composed of several layers. Even if one were willing to write custom assembly code, modifying thousands of lines would be required to further customize the hardware and software.

Accordingly, there is an ongoing need for a compiler to generate instructions or other executable code to operate a computing architecture (an "engine") capable of providing high performance for CNN applications, for applications such as artificial intelligence, machine learning, image recognition, and other inferential applications requiring mathematical computations, for example and without limitation.

Such a compiler should generate correct and efficient instructions or other executable code to allow the computing architecture to have a comparatively high efficiency, with significant utilization, and provide for the computing architecture to have a comparatively low bandwidth for access to any memory integrated circuit storing the maps and kernel data. To provide such performance, such a compiler should be capable of reordering data transfers and data computations, for example and without limitation. Such a compiler should also be able to parse various DNN models created from different high-level frameworks, so that users can use their favorite DL tool.

SUMMARY OF THE INVENTION

As discussed in greater detail below, a compiler and compilation method is disclosed for use with an accelerator circuit, such as the representative inference engine circuit architecture.

The representative compiler and compilation method significantly reduces memory usage or bandwidth and increases data reuse, resulting in significant performance and efficiency of accelerator circuits such as the inference engine circuit architecture. The representative compiler and compilation method merges or fuses neural network layers, including merger or fusion of different functions or operations into network layers, and provides for rearranging instructions or other executable code, all for additional performance and efficiency of accelerator circuits such as the inference engine circuit architecture. The representative compiler and compilation method also provides for selection of various operating modes for the acceleration circuits, such as cooperative modes, independent modes, mixed cooperative and independent modes, in addition to selection of pipelining modes.

The representative inference engine circuit architecture, as a system, is a computing architecture capable of providing high performance for CNN applications, for applications such as artificial intelligence, machine learning, image recognition, and other inferential applications requiring mathematical computations, for example and without limitation. The inference engine circuit architecture (or system) has comparatively high efficiency, with significant utilization (about 95%), and has a comparatively low bandwidth for access to any memory integrated circuit storing the maps and kernel data. The inference engine circuit architecture system is capable of performing a complete matrix-by-matrix multiplication.

The inference engine circuit architecture system reaches 99.9% efficiency in a large majority of deep neural network layers, eliminating unused circuitry (dead or "dark" silicon) and providing highly efficient power consumption, especially useful for mobile applications. The inference engine circuit architecture can provide significant scaling as well, as discussed in greater detail below.

A representative embodiment of an acceleration circuit architecture is disclosed which comprises: a first buffer circuit storing maps data; a first data network coupled to the first buffer circuit; a second buffer circuit storing kernel data; a second, serial data network coupled to the second buffer circuit; a first plurality of multiply and accumulate circuits arranged in a first array and coupled through the first data network to the first buffer circuit and coupled through the second, serial data network to the second buffer circuit, each multiply and accumulate circuit of the first plurality of multiply and accumulate circuits comprising: a multiplier circuit to multiply a maps datum and a kernel datum to generate a multiplicative product; and a first adder circuit coupled to the multiplier; with the acceleration circuit architecture further comprising: a shift register coupled to the first plurality of multiply and accumulate circuits; a first control multiplexer adapted to provide a selected output in response to a first mode control word, the selected output comprising a bias parameter or a first or next accumulation sum; and a second adder circuit coupled to the shift register and to the first control multiplexer, the second adder circuit adapted to add the multiplicative product to the bias parameter or to the first accumulation sum to generate a second or next accumulation sum.

In a representative embodiment, in response to a first mode control word designating an independent mode, the first control multiplexer provides the bias parameter as the selected output. In a representative embodiment, in response to a first mode control word designating a cooperative mode, the first control multiplexer provides the bias parameter as the selected output for a first cycle and provides the first or next accumulation sum as the selected output for a plurality of subsequent cycles. In a representative embodiment, in response to a first mode control word designating a combined independent and cooperative mode, the first control multiplexer provides the bias parameter as the selected output for a first cycle and provides the first or next accumulation sum as the selected output for a first plurality of subsequent cycles; and following the first plurality of subsequent cycles, the first control multiplexer provides the bias parameter as the selected output for a next cycle and provides the first or next accumulation sum as the selected output for a second plurality of subsequent cycles.

In a representative embodiment, the second, serial data network provides first kernel data to a first plurality of multiply and accumulate circuits, followed by sequentially providing the first kernel data to a second plurality of multiply and accumulate circuits.

In a representative embodiment, the acceleration circuit architecture may further comprise: a maps buffer arbiter circuit coupled to the first buffer circuit and to the first data network, the maps buffer arbiter circuit adapted to determine a conflict in accessing the first buffer circuit and in response to the conflict, to implement a priority protocol for access to the first buffer circuit. In a representative embodiment, the maps buffer arbiter circuit is further adapted to receive an address for selected maps data in the first buffer circuit and, in response, to obtain and provide the selected maps data.

In a representative embodiment, the acceleration circuit architecture may further comprise: a tensor decoder circuit coupled to the first data network, the tensor decoder circuit adapted to generate and output a sequence of addresses starting with a base address and incrementing the base address until the output address is equal to the base address plus a tensor length. In a representative embodiment, the tensor decoder circuit may further comprise: an operand collector coupled to the first data network, the operand collector adapted to transfer the output addresses to a maps buffer arbiter circuit or to the second buffer circuit, to obtain data corresponding to the output addresses, and to transfer the obtained data to the first plurality of multiply and accumulate circuits. In a representative embodiment, the acceleration circuit architecture may further comprise: a tensor buffer coupled to the tensor decoder circuit; and a control core coupled to the tensor decoder circuit and to the first data network, the control core adapted to receive and decode a plurality of instructions, and to transfer a tensor instruction to the tensor buffer for execution by the tensor decoder circuit.

In a representative embodiment, the acceleration circuit architecture may further comprise: a mode control circuit adapted to provide or generate the first mode control word.

In a representative embodiment, the acceleration circuit architecture may further comprise: a MAX circuit comprising a plurality of comparators, the plurality of comparators adapted to determine a maximum value of a plurality of second or next accumulation sums.

In another representative embodiment, the acceleration circuit architecture may further comprise: a plurality of second control multiplexers, each second control multiplexer of the plurality of second control multiplexers coupled to a first adder circuit of a multiply and accumulate circuit of the first plurality of multiply and accumulate circuits, each second control multiplexer of the plurality of second control multiplexers adapted to provide a selected output in response to a second mode control word, the selected output comprising a bias parameter or a first accumulation sum.

Another representative embodiment of an acceleration circuit architecture is disclosed which comprises: a first buffer circuit storing maps data; a first data network coupled to the first buffer circuit; a plurality of second buffer circuits storing kernel data, each second buffer circuit of the plurality of second buffer circuits storing different kernel data than another second buffer circuit of the plurality of second buffer circuits; a plurality of second, serial data networks, each second, serial data network of the plurality of second, serial data networks coupled to a corresponding second buffer circuit of the plurality of second buffer circuits; a plurality of vector-vector acceleration circuits arranged in a plurality of arrays, each vector-vector acceleration circuit of the plurality of vector-vector acceleration circuits coupled through the first data network to the first buffer circuit, and each vector-vector acceleration circuit of the plurality of vector-vector acceleration circuits of a selected array of the plurality of arrays coupled through a corresponding second, serial data network of the plurality of second, serial data networks to a second buffer circuit of the plurality of second buffer circuits, each vector-vector acceleration circuit of the plurality of vector-vector acceleration circuits comprising: a plurality of multiply and accumulate circuits, each multiply and accumulate circuit of the plurality of multiply and accumulate circuits comprising: a multiplier circuit to multiply a maps datum and a kernel datum to generate a multiplicative product; and a first adder circuit coupled to the multiplier; with each vector-vector acceleration circuit further comprising a shift register coupled to the plurality of multiply and accumulate circuits; a first control multiplexer adapted to provide a selected output in response to a first mode control word, the selected output comprising a bias parameter or a first or next accumulation sum; and a second adder circuit coupled to the shift register and to the first control multiplexer, the second adder circuit adapted to add the multiplicative product to the bias parameter or to the first accumulation sum to generate a second or next accumulation sum.

In a representative embodiment, each second, serial data network of the plurality of second, serial data networks provides first kernel data to a first vector-vector acceleration circuit, followed by sequentially providing the first kernel data to a second vector-vector acceleration circuit of the selected array of the plurality of arrays.

In a representative embodiment, a first serial data network of the plurality of second, serial data networks provides first kernel data to a first array of vector-vector acceleration circuits and a second serial data network of the plurality of second, serial data networks provides second kernel data to a second array of vector-vector acceleration circuits, the first kernel data different than the second kernel data.

Another representative embodiment of an acceleration circuit architecture is disclosed which comprises: a memory interface circuit; a first buffer circuit storing maps data; a first data network coupled to the first buffer circuit and to the memory interface circuit; a plurality of second buffer circuits storing kernel data, each second buffer circuit of the plurality of second buffer circuits storing different kernel data than another second buffer circuit of the plurality of second buffer circuits; a plurality of second, serial data networks, each second, serial data network of the plurality of second, serial data networks coupled to a corresponding second buffer circuit of the plurality of second buffer circuits; at least one matrix-matrix acceleration circuit having a plurality of operating modes, the plurality of operating modes comprising an independent mode, a cooperative mode, and a plurality of combined independent and cooperative modes, the at least one matrix-matrix acceleration circuit comprising: a plurality of matrix-vector acceleration circuits, each matrix-vector acceleration circuit of the plurality of matrix-vector acceleration circuits comprising an array of a plurality of vector-vector acceleration circuits, each matrix-vector acceleration circuit of the plurality of matrix-vector acceleration circuits coupled through the first data network to the first buffer circuit, and each matrix-vector acceleration circuit of the plurality of matrix-vector acceleration circuits coupled through a corresponding second, serial data network of the plurality of second, serial data networks to a different second buffer circuit of the plurality of second buffer circuits, each vector-vector acceleration circuit of the plurality of vector-vector acceleration circuits comprising: a plurality of multiply and accumulate circuits, each multiply and accumulate circuit of the plurality of multiply and accumulate circuits comprising: a multiplier circuit to multiply a maps datum and a kernel datum to generate a multiplicative product; and a first adder circuit coupled to the multiplier; a shift register coupled to the plurality of multiply and accumulate circuits; a control multiplexer adapted to provide a selected output in response to a mode control word corresponding to a selected operating mode of the plurality of operating modes, the selected output comprising a bias parameter or a first or next accumulation sum; and a second adder circuit coupled to the shift register and to the first control multiplexer, the second adder circuit adapted to add the multiplicative product to the bias parameter or to the first accumulation sum to generate a second or next accumulation sum and to provide the second or next accumulation sum as an output corresponding to the selected operating mode; and further comprising: a MAX circuit comprising a plurality of comparators, the plurality of comparators adapted to determine a maximum value of a plurality of second or next accumulation sums.

A representative embodiment of a method of accelerating a matrix multiplication is also disclosed, with the method comprising: selecting an operating mode; obtaining maps data; obtaining kernel data; obtaining a mode control word; using a multiplier circuit, multiply maps data and kernel data to generate a multiplicative product; when the mode control word indicates that an accumulation is to occur, using an adder circuit, add the multiplicative product to a first or next accumulation sum to generate a next accumulation sum; when the mode control word indicates that a first bias parameter is to be added, using an adder circuit, add the first bias parameter to the multiplicative product or to the next accumulation sum; and outputting the next accumulation sum. In a representative embodiment, the multiplication and accumulation steps continue until a complete matrix multiplication has occurred.

In a representative embodiment, in response to a mode control word designating an independent mode, the method provides a plurality of next accumulation sums as a plurality of separate outputs. In such a representative embodiment, the method may further comprise: adding the bias parameter for a first cycle; adding the first or next accumulation sum for a plurality of subsequent cycles to generate the next accumulation sum; and outputting the next accumulation sum as a separate output of the plurality of outputs.

In another representative embodiment, the method may further comprise: adding the bias parameter for a first cycle; adding the first or next accumulation sum for a plurality of subsequent cycles to generate the next accumulation sum; in response to a mode control word designating a combined independent and cooperative mode, adding together a predetermined number of next accumulation sums to generate an output accumulation sum; and successively outputting the output accumulation sum as a separate output of the plurality of outputs.

In another representative embodiment, the method may further comprise: in response to a mode control word designating a cooperative mode, providing a single accumulation sum as an output. In such a representative embodiment, the method may further comprise: adding the bias parameter for a first cycle; adding the first or next accumulation sum for a plurality of subsequent cycles to generate the next accumulation sum; and adding together all next accumulation sums to generate the single accumulation sum.

In various representative embodiments, the method may further comprise: generating and outputting a sequence of addresses starting with a base address and incrementing the base address until the output address is equal to the base address plus a tensor length.

A representative method of compiling neural network code to a plurality of executable instructions or other into executable code for execution by a computational acceleration system having a memory circuit and one or more acceleration circuits having a maps data buffer and a kernel data buffer, is also disclosed, with the method comprising: using one or more processors, from the neural network code, generating a list of neural network layer model objects; using the one or more processors, fusing available functions and layers in the list of neural network layer model objects; using the one or more processors, selecting a cooperative mode, an independent mode, or a combined cooperative and independent mode for code execution by the one or more acceleration circuits; using the one or more processors, selecting a data movement mode and an ordering of computations which reduces usage of the memory circuit; using the one or more processors, generating an ordered sequence of load objects, compute objects, and store objects; and using the one or more processors, converting the ordered sequence of load objects, compute objects, and store objects into the plurality of executable instructions.

In various representative embodiments, the step of selecting a data movement mode and an ordering of computations may further comprise: using the one or more processors, determining memory circuit usage when kernel data is maintained in the kernel data buffer for a predetermined number of computations with reordering of maps data movement and computations to utilize the selected kernel data which is currently loaded in the kernel data buffer. In various representative embodiments, the step of selecting a data movement mode and an ordering of computations may further comprise: using the one or more processors, determining memory circuit usage when maps data is maintained in the maps data buffer for a predetermined number of computations with reordering of kernel data movement and computations to utilize the selected maps data which is currently loaded in the maps data buffer. In various representative embodiments, the step of selecting a data movement mode and an ordering of computations may further comprise: using the one or more processors, determining memory circuit usage when maps data movement is reordered, kernel data movement is reordered, and computations are reordered to utilize the selected maps data or kernel data which is currently loaded respectively in the maps data buffer or in the kernel data buffer. 6. In various representative embodiments, the step of selecting a data movement mode and an ordering of computations may further comprise: using the one or more processors, determining memory circuit usage when maps data movement is reordered, kernel data movement is reordered, and computations are reordered to utilize one or more rows of the selected maps data or kernel data which is currently loaded respectively in the maps data buffer or in the kernel data buffer.

In another representative embodiment, the method may further comprise: using the one or more processors, reordering at least one computation to utilize selected maps data or kernel data which is currently loaded respectively in the maps data buffer or in the kernel data buffer.

In various representative embodiments, the method may further comprise: using the one or more processors, further ordering load objects to provide data pre-fetching. In various representative embodiments, the method may further comprise: using the one or more processors, further ordering the sequence of load objects, compute objects, and store objects to reduce any computational latency. In various representative embodiments, the method may further comprise: using the one or more processors, pipelining the plurality of executable instructions for execution across a plurality of acceleration circuits.

In another representative embodiment, the method may further comprise: using the one or more processors, determining a maps data size for transferring maps data from the memory circuit to the maps data buffer. In another representative embodiment, the method may further comprise: using the one or more processors, determining a kernel data size for transferring kernel data from the memory circuit to the kernel data buffer.

In various representative embodiments, the method may further comprise: using the one or more processors, merging a plurality of executable instructions into a plurality of instruction banks without branching between banks of the plurality of instruction banks.

In various representative embodiments, the method may further comprise: using the one or more processors, generating one or more synchronization instructions.

In various representative embodiments, the step of selecting a data movement mode and an ordering of computations may further comprise: using the one or more processors, selecting the data movement mode and the ordering of computations which minimizes usage of the memory circuit.

In various representative embodiments, the neural network code is open neural network exchange (ONNX) interchange format code.

A representative compiler system is disclosed for compiling neural network code to a plurality of executable instructions or other into executable code for execution by a computational acceleration system having a first memory circuit and one or more acceleration circuits having a maps data buffer and a kernel data buffer, with the compiler system comprising: a second memory circuit storing the neural network code; and one or more processors coupled to the second memory circuit, the one or more processors adapted to generate a list of neural network layer model objects from the neural network code; to fuse available functions and layers in the list of neural network layer model objects; to select a cooperative mode, an independent mode, or a combined cooperative and independent mode for code execution by the one or more acceleration circuits; to select a data movement mode and an ordering of computations which reduces usage of the first memory circuit; to generate an ordered sequence of load objects, compute objects, and store objects; and to convert the ordered sequence of load objects, compute objects, and store objects into the plurality of executable instructions.

In various representative embodiments, the one or more processors may be further adapted to determine first memory circuit usage when kernel data is maintained in a kernel data buffer for a predetermined number of computations with reordering of maps data movement and computations to utilize the selected kernel data which is currently loaded in the kernel data buffer. In various representative embodiments, the one or more processors may be further adapted to determine first memory circuit usage when maps data is maintained in the maps data buffer for a predetermined number of computations with reordering of kernel data movement and computations to utilize the selected maps data which is currently loaded in the maps data buffer. In various representative embodiments, the one or more processors may be further adapted to determine first memory circuit usage when maps data movement is reordered, kernel data movement is reordered, and computations are reordered to utilize the selected maps data or kernel data which is currently loaded respectively in the maps data buffer or in the kernel data buffer. In various representative embodiments, the one or more processors may be further adapted to determine first memory circuit usage when maps data movement is reordered, kernel data movement is reordered, and computations are reordered to utilize one or more rows of the selected maps data or kernel data which is currently loaded respectively in the maps data buffer or in the kernel data buffer.

In various representative embodiments, the one or more processors may be further adapted to reorder at least one computation to utilize selected maps data or kernel data which is currently loaded respectively in the maps data buffer or in the kernel data buffer.

In various representative embodiments, the one or more processors may be further adapted to order load objects to provide data pre-fetching and to order the sequence of load objects, compute objects, and store objects to reduce any computational latency. In various representative embodiments, the one or more processors may be further adapted to pipeline the plurality of executable instructions for execution across a plurality of acceleration circuits and to generate synchronization instructions. In various representative embodiments, the one or more processors may be further adapted to determine a maps data size for transferring maps data from the first memory circuit to the maps data buffer and to determine a kernel data size for transferring kernel data from the first memory circuit to the kernel data buffer.

In various representative embodiments, the one or more processors may be further adapted to merge a plurality of executable instructions into a plurality of instruction banks without branching between banks of the plurality of instruction banks. In various representative embodiments, the one or more processors may be further adapted to select the data movement mode and the ordering of computations which minimizes usage of the first memory circuit.

Another representative method of compiling neural network code to a plurality of executable instructions or other into executable code is disclosed for execution by a computational acceleration system having a memory circuit and one or more acceleration circuits having a maps data buffer and a kernel data buffer, with the representative method comprising: using one or more processors, from the neural network code, generating a list of neural network layer model objects; using the one or more processors, fusing available functions and layers in the list of neural network layer model objects; using the one or more processors, selecting a cooperative mode, an independent mode, or a combined cooperative and independent mode for code execution by the one or more acceleration circuits; using the one or more processors, determining memory circuit usage when kernel data is maintained in the kernel data buffer for a predetermined number of computations with reordering of maps data movement and computations to utilize the selected kernel data which is currently loaded in the kernel data buffer; using the one or more processors, determining memory circuit usage when maps data is maintained in the maps data buffer for a predetermined number of computations with reordering of kernel data movement and computations to utilize the selected maps data which is currently loaded in the maps data buffer; using the one or more processors, determining memory circuit usage when maps data movement is reordered, kernel data movement is reordered, and computations are reordered to utilize one or more rows of the selected maps data or kernel data which is currently loaded respectively in the maps data buffer or in the kernel data buffer; using the one or more processors, reordering at least one computation to utilize one or more rows of selected maps data or kernel data which is currently loaded respectively in the maps data buffer or in the kernel data buffer; using the one or more processors, selecting a data movement mode and an ordering of computations which minimizes usage of the memory circuit; using the one or more processors, generating an ordered sequence of load objects, compute objects, and store objects; further ordering the sequence of load objects, compute objects, and store objects to reduce any computational latency and to provide data pre-fetching; and using the one or more processors, converting the ordered sequence of load objects, compute objects, and store objects into the plurality of executable instructions.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 14 illustrates a first example of compute steps and memory bandwidth requirements without reordering of data movements and computations.

FIG. 19 illustrates an example of optimization or transformation of instructions or other executable code to account for execution latencies.

FIG. 20 illustrates an example of instructions or other executable code.

DETAILED DESCRIPTION OF REPRESENTATIVE EMBODIMENTS

Figure 1:
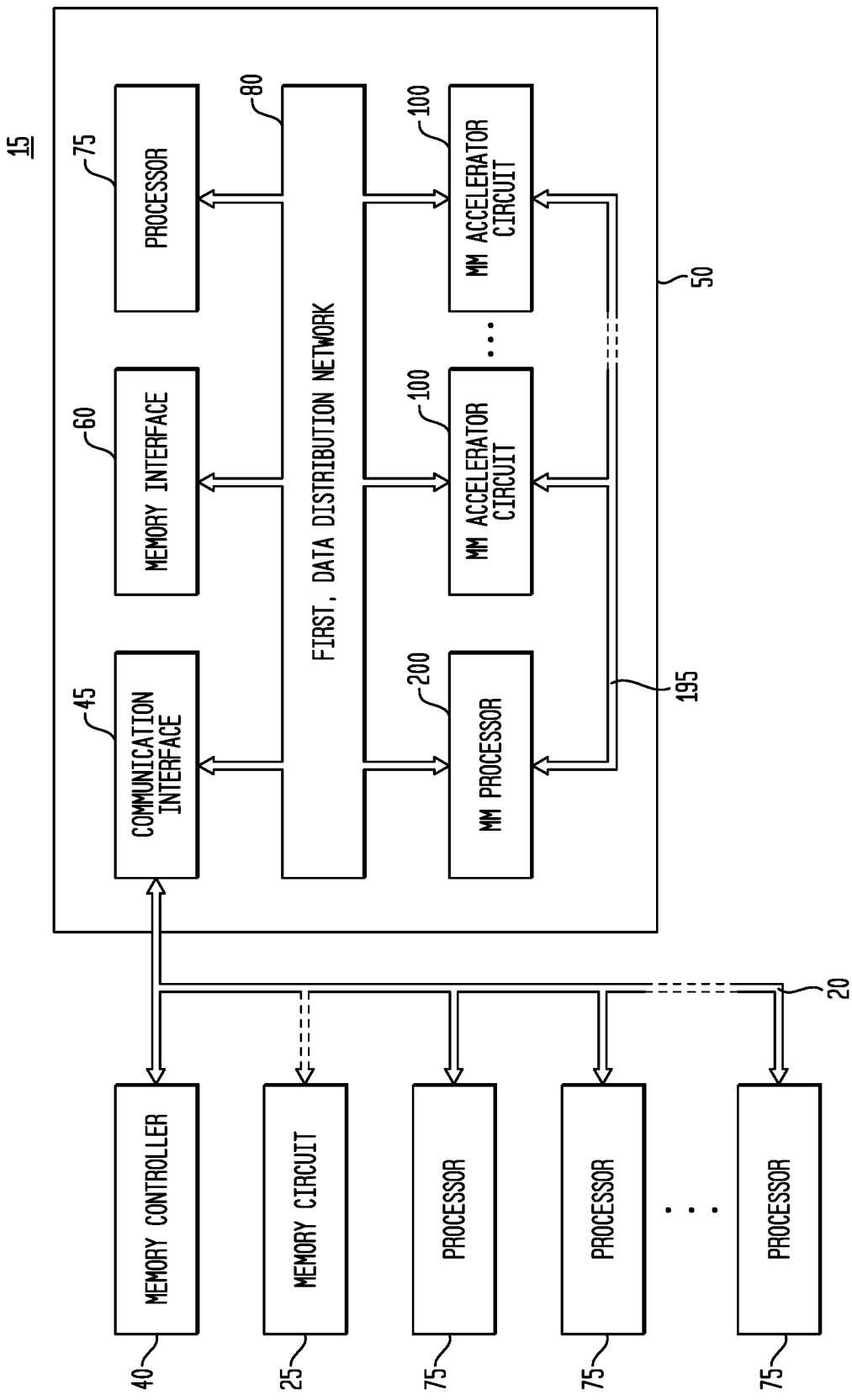
FIG. 1 is a block diagram of a representative embodiment of an inference engine circuit architecture or system having a matrix-matrix ("MM") processor circuit one or more matrix-matrix ("MM") accelerator circuits.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

As an example and without limitation, a representative computing architecture is illustrated and discussed below with reference to FIGS. 1-10, as a background to illustrate the operation of the representative compiler 400, 500, with a compiler 400 referring to the apparatus or system which implements the compiler or compilation method 500, which are collectively referred to as the representative compiler 400, 500. It should be understood that the representative compiler 400, 500 may be operative with and applied to innumerable computing or other circuit architectures, and all such variations are considered equivalent and within the scope of the disclosure. The structure and operation of the representative compiler 400, 500 is discussed below with reference to FIGS. 11-21.

The representative compiler 400, 500 supports DL accelerators with custom ISA and the supporting software elements to execute a model defined in a high-level framework. This representative compiler 400, 500 also employs optimization methods to achieve improved performance on an inference engine discussed below.

The representative compiler 400, 500 supports the open neural network exchange ("ONNX") interchange format, allowing it to parse models from different frameworks, for example and without limitation. An intermediate representation was created to represent low level operations that matches with the hardware accelerator's capabilities. Multi-level optimizations were created to minimize memory bandwidth and maximize performance. The representative compiler 400, 500 correctly generated custom instructions for various DNN models trained for face identification, image segmentation, style transfer, speech identification and speech command. The generated code was also benchmarked on different FPGA systems. Systems with 256-2048 processing units were evaluated.

I. A Representative Computing Architecture:

FIG. 1 is a block diagram of a representative embodiment of an inference engine circuit architecture (or system) 50 comprising a matrix-matrix (MM) processor circuit 200 and one or more matrix-matrix (MM) accelerator circuits 100. The inference engine circuit architecture 50, as a system, further comprises a memory interface 60 for read (load) and write (store) access to a memory circuit 25, which access may be through a memory controller 40 optionally. As another option, the inference engine circuit architecture 50 may also comprise a general purpose processor 75, which may be any type or kind of processor as described in greater detail below, such as a microprocessor, for performing computations and/or executing control code which are not being performed or executed by the MM processor circuit 200 and the one or more MM accelerator circuits 100. The inference engine circuit architecture 50 also typically includes a communication interface (or other input-output interface) 45, described in greater detail below, for communication between the inference engine circuit architecture 50 and other, typically off-chip components which may be part of a larger system or board 15 (e.g., a rack-mounted board of a server, for example and without limitation), such as the memory circuit 25 (via a communication bus 20, which may have any type of kind of communication bus structure, for example and without limitation). In a representative embodiment, the communication interface 45 includes the functionality of the memory interface 60, or vice-versa, and only one such memory interface 60 or communication interface (or other input-output interface) 45 is included in the inference engine circuit architecture (or system) 50.

In a representative embodiment, the inference engine circuit architecture 50 is embodied as an integrated circuit, such as an application specific integrated circuit ("ASIC") or a field programmable gate array ("FPGAs"). A memory controller 40 optionally may be included as part of the inference engine circuit architecture 50 or system 15. The memory circuit 25 is typically embodied as a separate IC. Depending upon the embodiment, the inference engine circuit architecture 50 may also be coupled to additional processors 75, such as via the communication bus 20.

The MM processor circuit 200, the one or more MM accelerator circuits 100, the memory interface 60 and the processor 75 are typically coupled to each other over a first, data distribution network 80 (and/or first, data distribution network 80A, illustrated in and discussed below with reference to FIG. 4). The first, data distribution network 80, 80A is for data transfer and other communication, such as for data transfer from the memory circuit 25 through the communication interface 45, such as for reading and obtaining maps and kernel data, and for data transfer from the MM processor circuit 200 and one or more MM accelerator circuits 100 for storage in the memory circuit 25, also via the communication interface 45. The first, data distribution network 80 is also utilized for data transfer between or among the one or more of MM accelerator circuits 100, and optionally for data transfer between or among the MM processor circuit 200 and the one or more MM accelerator circuits 100. The first, data distribution network 80, 80A can implement one or more priority protocols to determine which data is transferred when and in what order, such as a round-robin protocol or a hierarchical priority in which various components have a higher priority for data transmission or reception, such as providing a higher priority to the MAC circuits 190, followed by a MAX circuit 130 as next in priority, followed by a load operation from the memory circuit 25 as next in priority, etc., and any and all such variations are considered equivalent and within the scope of the disclosure. In a representative embodiment, the MM processor circuit 200 optionally may also have a separate control bus or network 195 for data and control communication with the one or more MM accelerator circuits 100. In another representative embodiment, the first, data distribution network 80 also may be combined with the second, data access network 110, discussed below, as a first, data distribution network 80A illustrated in FIG. 4. When a separate control bus 195 is not implemented, control information also may be distributed via the first, data distribution network 80 and the second, data access network 110 and/or first, data distribution network 80A, any and all such variations are considered equivalent and within the scope of the disclosure.

Figure 2:
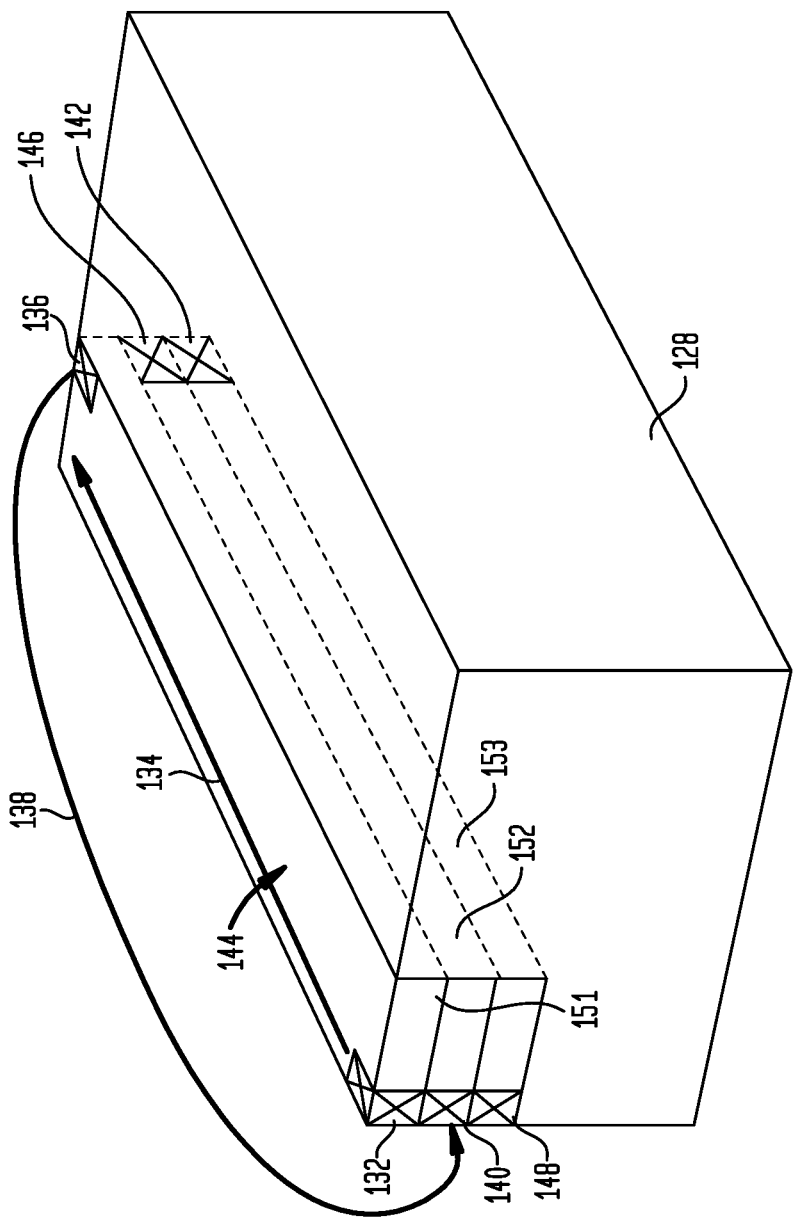
FIG. 2 is a schematic diagram of three-dimensional volume of maps or kernel data used in a representative embodiment of an inference engine circuit architecture system.

FIG. 2 is a schematic diagram of three-dimensional volume of maps or kernel data 128 used in a representative embodiment of an inference engine circuit architecture 50. The inference engine circuit architecture 50 implements a "tensor" construct, in which data operation may be performed across a three-dimensional volume of non-contiguous data, and not merely a series of adjacent vectors of data. The tensor decoder 250 of the MM processor circuit 200 and/or MM accelerator circuits 100 can process a single instruction to read such a volume of data, tensor 144, given a start address 132, a depth 134 (for obtaining data in a "depth first" pattern), a stride 138 from a second or end address 136 of the first data plane 151 to the next non-contiguous data start address 140 of the second or next data plane 152, and continuing through the last or end address 142, bringing in multiple planes 151, 152, and 153 of maps or kernel data of the selected tensor 144, as illustrated in FIG. 2. It should be noted that the stride for proceeding from address 146 to 148 is the same as the stride 138. This use of tensor data is helpful in diminishing or minimizing the bandwidth requirements for obtaining data from the memory circuit 25, for example. As illustrated in FIG. 2, the length of the tensor 144 comprises the combined lengths of all of the data in each such data plane, i.e., the length of all of the data vectors from start address 132 to the last or end address 136 of the first data plane 151 of the tensor 144, plus the length of all of the data vectors from start address 140 to the last or end address 146 of the second data plane 152 of the tensor 144, plus the length of all of the data vectors from start address 148 to the last or end address 142 of the third data plane 153 of the tensor 144.

Figure 3:
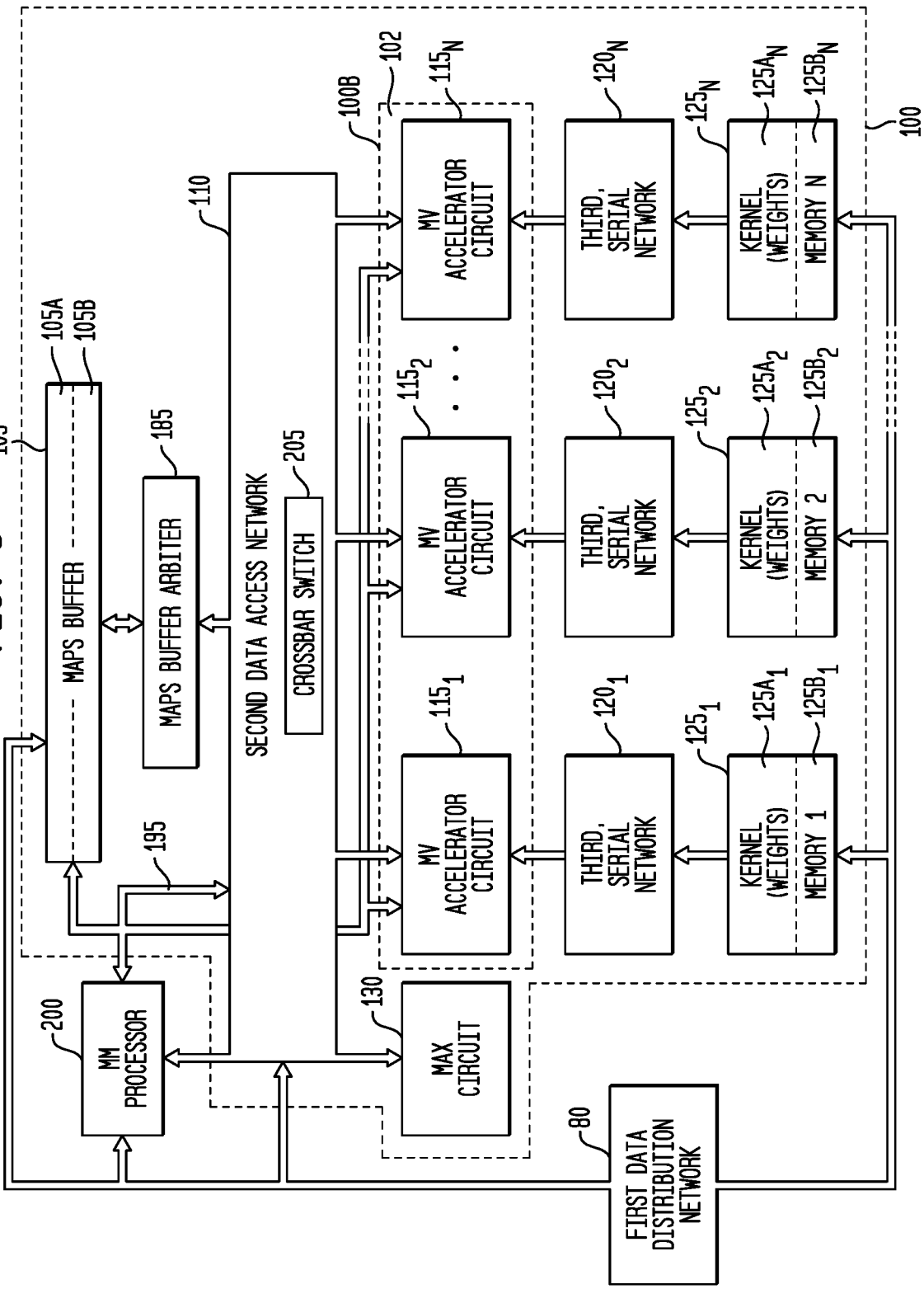
FIG. 3 is a block diagram of a representative first embodiment of a matrix-matrix accelerator circuit having a plurality of matrix-vector ("MV") accelerator circuits.

FIG. 3 is a block diagram of a representative first embodiment of a MM accelerator circuit 100 having a plurality of matrix-vector (MV) accelerator circuits 115 and at least one MAX circuit 130. FIG. 4 is a block diagram of a representative second embodiment of a MM accelerator circuit 100A having a plurality of MV accelerator circuits and at least one MAX circuit 130. The first and second embodiments of the MM accelerator circuit 100, 100A differ only insofar as in the MM accelerator circuit 100A, the functionality of the first, data distribution network 80 and the functionality of the second, data access network 110 have been combined into a singular first, data distribution network 80A, which functions identically to the separate first, data distribution network 80 as described above combined with the functionality of the second, data access network 110 described below. Alternatively, also illustrated in FIGS. 3 and 4, an MM accelerator circuit 100B can also be considered to comprise merely an array 102 of a plurality of MV accelerator circuits 115, as a third embodiment, and if so, then the inference engine circuit architecture 50 will be considered to comprise and include the other components (105, 185, 110 or 80A, 205, 120, 125, 130) illustrated in FIGS. 3 and 4 for MM accelerator circuits 100, 100A.

Figure 4:
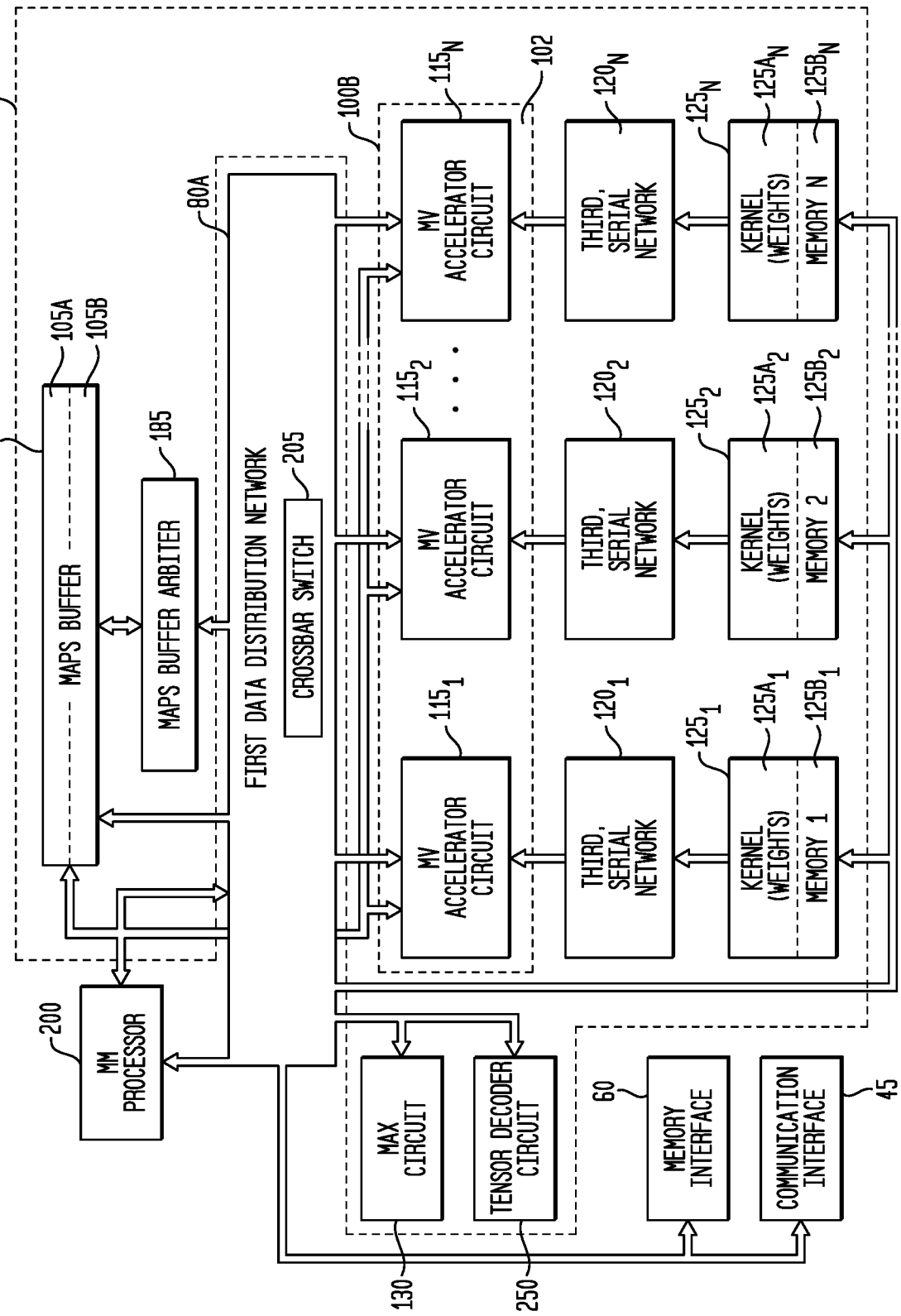
FIG. 4 is a block diagram of a representative second embodiment of a matrix-matrix accelerator circuit having a plurality of matrix-vector (MV) accelerator circuits.

As illustrated in FIGS. 3 and 4, the MM accelerator circuit 100 includes a MAX circuit 130 and a number "N" of MV accelerator circuits 115, illustrated as MV accelerator circuit $115_1$, MV accelerator circuit $115_2$, through MV accelerator circuit $115_N$. Each MM accelerator circuit 100 is structured or adapted to perform a complete multiplication of a first matrix ("A") by another, second matrix ("B") (C=A*B), using a plurality of MV accelerator circuits 115, each of which is structured or adapted to perform a complete multiplication of the first matrix by one of the vectors comprising the second matrix (c=A*b). The MAX circuit 130 is comprised of a plurality of comparators 280 (illustrated in FIG. 9), and is utilized to obtain a maximum of the operands being compared, such as to implement a maxpooling operation of a CNN as part of the functions of the MM accelerator circuit 100.

The MV accelerator circuits 115 are coupled to each other and to a maps (operand data) buffer (or other memory or registers) 105 over the second, data access network 110 (or first, data distribution network 80A), and each MV accelerator circuit 115 has access to all of the maps data stored in the maps buffer 105. The maps buffer 105 may be implemented as any type of buffer, memory or registers, and stores maps data, which may have been obtained from the memory circuit 25 or which may have other maps data which has been stored as results following computations from the various MAC circuits 190 and/or MAX circuit 130. The maps buffer 105 is typically divided into separate banks (not separately illustrated), which may be accessed separately by the physical links of the second, data access network 110 (or first, data distribution network 80A). In a representative embodiment, the maps buffer 105 implements double-buffering, illustrated as maps buffer 105A and maps buffer 105B, so data may be pre-fetched or written into a first part of the maps buffer 105, as maps buffer 105A, while data is being read from a second part of the maps buffer 105, as maps buffer 105B, and vice-versa, reducing latency in obtaining maps data for computations or other processing. In such an embodiment, the MV accelerator circuits 115 will alternate or "ping-pong" between the maps buffer 105A and the maps buffer 105B of the double-buffered maps buffer 105 to obtain or store the corresponding maps data.

In addition, the second, data access network 110 (operating at a double data rate (DDR)) typically also performs the functions described above for the first, data distribution network 80, also functioning as a data highway, implementing priority protocols, controlling the data load and bandwidth, gathering data to write to one or more data vectors to the memory circuit 25, and controlling read and write operations from and to the maps buffer 105 and kernel buffers 125.

Each of the MV accelerator circuits 115 is also coupled, via a third, serial network 120, to separate a kernel (weights) buffer (or other memory or registers) 125, illustrated as kernel buffer $125_1$ coupled via third, serial network $120_1$ to the MV accelerator circuit $115_1$, kernel buffer $125_2$ coupled via third, serial network $120_2$ to the MV accelerator circuit $115_2$, through kernel buffer $125_N$ coupled via third, serial network $120_N$ to the MV accelerator circuit $115_N$. The third, serial network 120 is discussed in greater detail below with reference to FIG. 5. The kernel buffers 125 may be implemented as any type of buffer, memory or registers, and each stores kernel (weights) data, which may have been obtained from the memory circuit 25. The kernel buffers 125 also may implement double-buffering, as previously described, so kernel (weights) data may be pre-fetched or written into a first part of the kernel buffer 125, as kernel buffer 125A, while kernel (weights) data is being read from a second part of the kernel buffer 125, as kernel buffer 125B, and vice-versa, also reducing latency in obtaining kernel (weights) data for computation and other processing (illustrated as kernel buffer $125A_1$, kernel buffer $125B_1$, kernel buffer $125A_2$, kernel buffer $125B_2$, through kernel buffer $125A_N$, and kernel buffer $125B_N$. For this representative embodiment, each MV accelerator circuit 115 has access only to the kernel (weights) data of the corresponding kernel buffer 125 to which it is coupled via the third, serial network 120, e.g., MV accelerator circuit $115_1$ accesses only the kernel data in the corresponding kernel buffer $125_1$ via the corresponding third, serial network $120_1$. In a first mode, each of the kernel buffers 125 contain different kernel (weights) data for use in the various computations (using the same maps data), while in a second mode, each of the kernel buffers 125 contain the same kernel (weights) data for use in the various computations (using different maps data or different parts of the same maps data). As a result, in the multiplication process performed by the MV accelerator circuits 115, all of the relevant maps data of the maps buffer 105 will be multiplied by all of the different kernel (weights) data held in the kernel buffers 125, without repeating a computation, for example, by not repeating a multiplication of maps data with the same kernel data in an MV accelerator circuit 115 that has already been utilized by another MV accelerator circuit 115.

Higher performance of the inference engine circuit architecture 50 has been achieved using the maps buffer 105, which is global to a MV accelerator circuit 115), and separate kernel buffers 125, each of which is specific to a single MV accelerator circuit 115 (including its array of VV accelerator circuits 150).

In a representative embodiment, the second, data access network 110 is comprises a crossbar switch 205 together with any selected bus structure, which may be embodied in any of a wide variety of ways (e.g., as a folded CLOS configuration, for example and without limitation), any and all of which are considered equivalent and within the scope of the disclosure. The second, data access network 110 and/or first, data distribution network 80A provides for each vector-vector (VV) accelerator circuit 150 of each MV accelerator circuit 115 to have complete read (load) and write (store) access to all of the maps data in the entire maps buffer 105. For example, each VV accelerator circuit 150 of each MV accelerator circuit 115 has its own physical links to the memory banks of the maps buffer 105, via the second, data access network 110 (or first, data distribution network 80A). To avoid conflict, a maps buffer arbiter circuit 185 is included, either as a separate component or within the second, data access network 110 and/or first, data distribution network 80A, or alternatively within the maps buffer 105, for example and without limitation. As mentioned above, in the second representative embodiment, first, data distribution network 80A includes the functionality of the second, data access network 110, such that the crossbar switch 205 is implemented between all of the VV accelerator circuits 150 and the maps buffer 105, and that the maps buffer arbiter circuit 185 is included (e.g., separately, or within the first, data distribution network 80A, or within the maps buffer 105, or within the MM accelerator circuit 100, 100A more generally, for example and without limitation), and any and all such variations are considered equivalent and within the scope of the disclosure.

It should also be noted that when a first, data distribution network 80A is implemented, combining the functionality of the first, data distribution network 80 and the second, data access network 110 into the first, data distribution network 80A, then the third, serial network 120 may be referred to equivalently as a second, serial network 120 or more simply as a serial network 120.

Each of the MV accelerator circuits 115 is also coupled to the MM processor circuit 200, to receive control information, such as to determine the operational mode of the MV accelerator circuit 115 and/or VV accelerator circuits 150. As discussed in greater detail below, in a first embodiment, the MM processor circuit 200 includes a tensor decoder circuit 250. In a second representative embodiment, illustrated in FIG. 4, each MM accelerator circuit 100 includes separate a tensor decoder circuit 250 (which is then no longer included within the MM processor circuit 200), such that multiple tensor decoder circuits 250 may be implemented and distributed within the inference engine circuit architecture 50, for example and without limitation. In another representative embodiment, not separately illustrated, other components of the MM processor circuit 200 (such as an operand collector 260 or a mode control circuit 255 discussed below) also may be duplicated and distributed within the inference engine circuit architecture 50, such that each MM accelerator circuit 100 includes a separate such component (which is then no longer included within the MM processor circuit 200), also for example and without limitation. Any and all such variations are considered equivalent and within the scope of the disclosure.

It should also be noted that for any of these various first and second (or third) embodiments of the MM accelerator circuit 100, 100A, the various components may be clustered or included, or not included, in a wide variety of ways, each of which is considered equivalent and within the scope of the disclosure. For example and without limitation, as another alternative, an MM accelerator circuit 100, 100A may be considered to comprise an array of the plurality of MV accelerator circuits 115 and the at least one MAX circuit 130, with all other components (such as the maps buffer 105, the kernel buffers 125, the second, data access network 110, the tensor decoder circuit 250, etc.) considered to be part of a larger "cluster" circuit configuration such as the system 50. Also for example and without limitation, as another alternative, an MV accelerator circuit 115 may be considered to comprise an array of a plurality of VV accelerator circuits 150 and the at least one MAX circuit 130, with all other components (such as the maps buffer 105, the kernel buffers 125, the second, data access network 110, the tensor decoder circuit 250, etc.) considered to be part of a larger "cluster" circuit configuration such as the MM accelerator circuit 100. Any and all of these various combinations and permutations are considered equivalent and within the scope of the disclosure.

Figure 5:
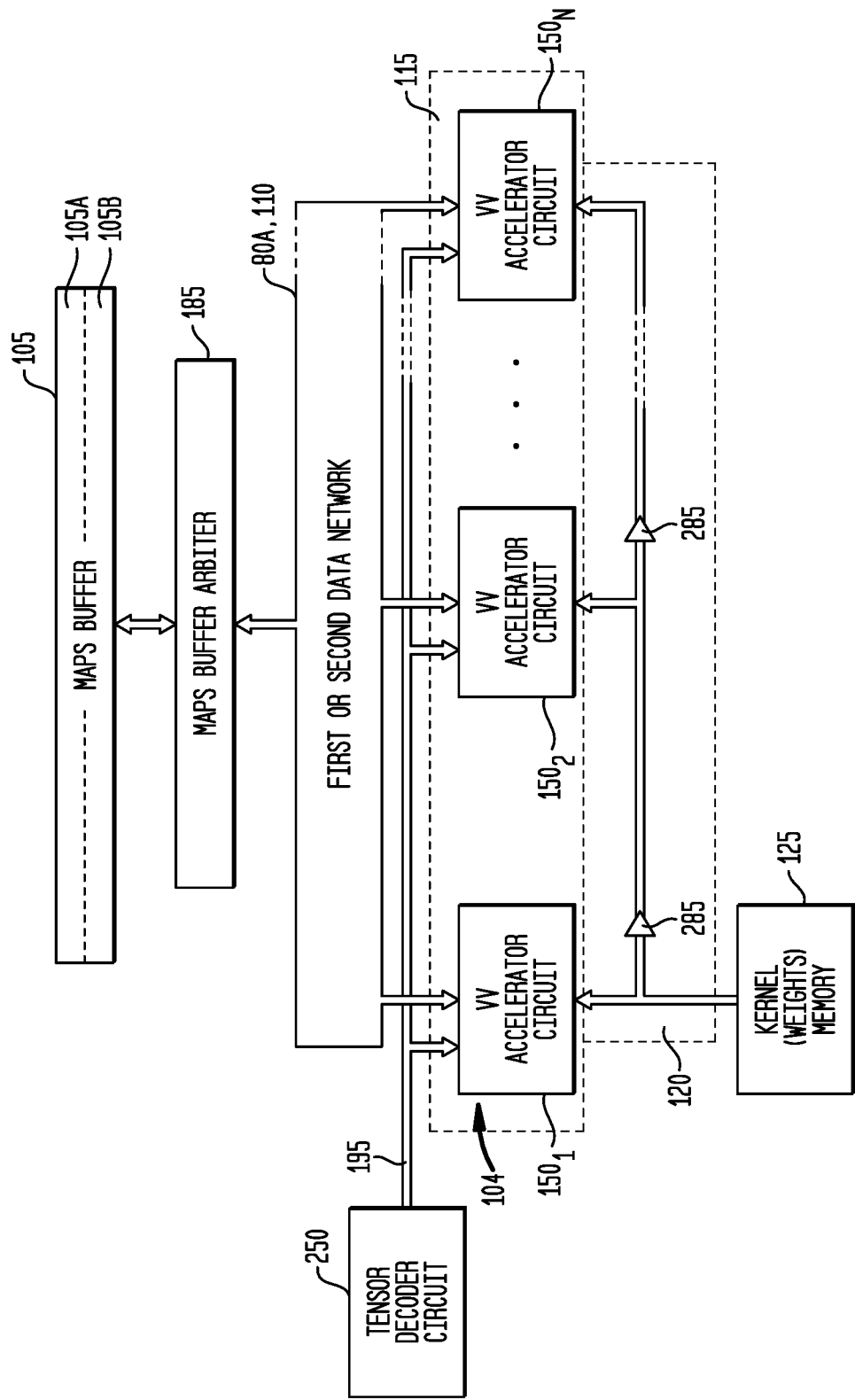
FIG. 5 is a block diagram of a representative embodiment of a matrix-vector accelerator circuit having a plurality of vector-vector ("VV") accelerator circuits.

FIG. 5 is a block diagram of a representative embodiment of a matrix-vector (MV) accelerator circuit 115 having an array 104 of a plurality of vector-vector (VV) accelerator circuits 150, illustrated as VV accelerator circuit $150_1$, VV accelerator circuit $150_2$, VV accelerator circuit $150_3$, through VV accelerator circuit $150_N$. Each of the VV accelerator circuits 150 are coupled to each other and to a maps (operand data) buffer (or other memory or registers) 105 over the second, data access network 110 and/or first, data distribution network 80A, and each VV accelerator circuit 150 has access to all of the maps data stored in the maps buffer 105, as described above. With each MM accelerator circuit 100 structured or adapted to perform a complete multiplication of a first matrix by another, second matrix to produce a resulting matrix "C" (C=A*B), using a plurality of MV accelerator circuits 115, and each MV accelerator circuit 115 of a selected MM accelerator circuit 100 structured or adapted to perform a complete multiplication of the first matrix by one of the vectors comprising the second matrix (c=A*b), and in turn, each VV accelerator circuit 150 of a selected MV accelerator circuits 115 is structured or adapted to perform a complete multiplication of one or the vectors comprising the first matrix by one of the vectors comprising the second matrix (c=a*b).

In addition to performing a vector multiplication, the array of VV accelerator circuits 150 (forming a MV accelerator circuit 115) can implement any numerical function via piecewise linear approximation and also provide counting, pointers and group operations such as averaging, computation of least and most value. These VV accelerator circuits 150 provide all the atomic operations needed to compute virtually any neural network layer, for example and without limitation.

Each of the VV accelerator circuits 150 of a single MV accelerator circuit 115 is also coupled, via a corresponding third, serial network 120, to a corresponding kernel (weights) buffer (or other memory or registers) 125, as mentioned above. The kernel (weights) data from the kernel (weights) buffer 125 is transferred to a first VV accelerator circuit $150_1$, then sequentially transferred to the next VV accelerator circuit 1502, such as by using a buffer (driver, amplifier or other data transfer) circuit 285 (for example and without limitation), and so on, with the kernel (weights) data propagating within a few clock cycles over the third, serial network 120 to all of the VV accelerator circuits 150 of the given MV accelerator circuit 115. This use of the third, serial network 120 significantly increases efficiency, without any significant increase in latency, and further reduces the size (area), power consumption, and fanout of the bus structure forming the third, serial network 120, particularly compared to any network or bus structure which would provide the kernel data in parallel to all of the VV accelerator circuits 150 of an MV accelerator circuit 115 or entire MM accelerator circuit 100. As mentioned above, when a first, data distribution network 80A is implemented, the third, serial network 120 may be referred to equivalently as a second, serial network 120 or more simply as a serial network 120. It is irrelevant if any of these communication networks or buses is referred to as first, second, or third, for example. Rather, what is significant is that a separate serial network 120 is utilized to couple each VV accelerator circuit 150 to a corresponding kernel (weights) buffer 125, while a more global network (the first, data distribution network 80 and the second, data access network 110 or the first, data distribution network 80A) is utilized to couple the VV accelerator circuits 150 to the maps buffer 105 for more global sharing of maps data.

Each of the VV accelerator circuits 150 is also coupled to the MM processor circuit 200 or tensor decoder circuit 250 to receive control information, such as to determine the operational mode of the VV accelerator circuit 150, using a mode control word, such as via the control bus 195 as illustrated or via the first, data distribution network 80, 80A and/or the second, data access network 110. As discussed in greater detail below, these operational modes include an independent mode, a cooperative mode, and several combined or blended cooperative and independent modes, each of which generates different sequences of outputs from each VV accelerator circuit 150.

Figure 6:
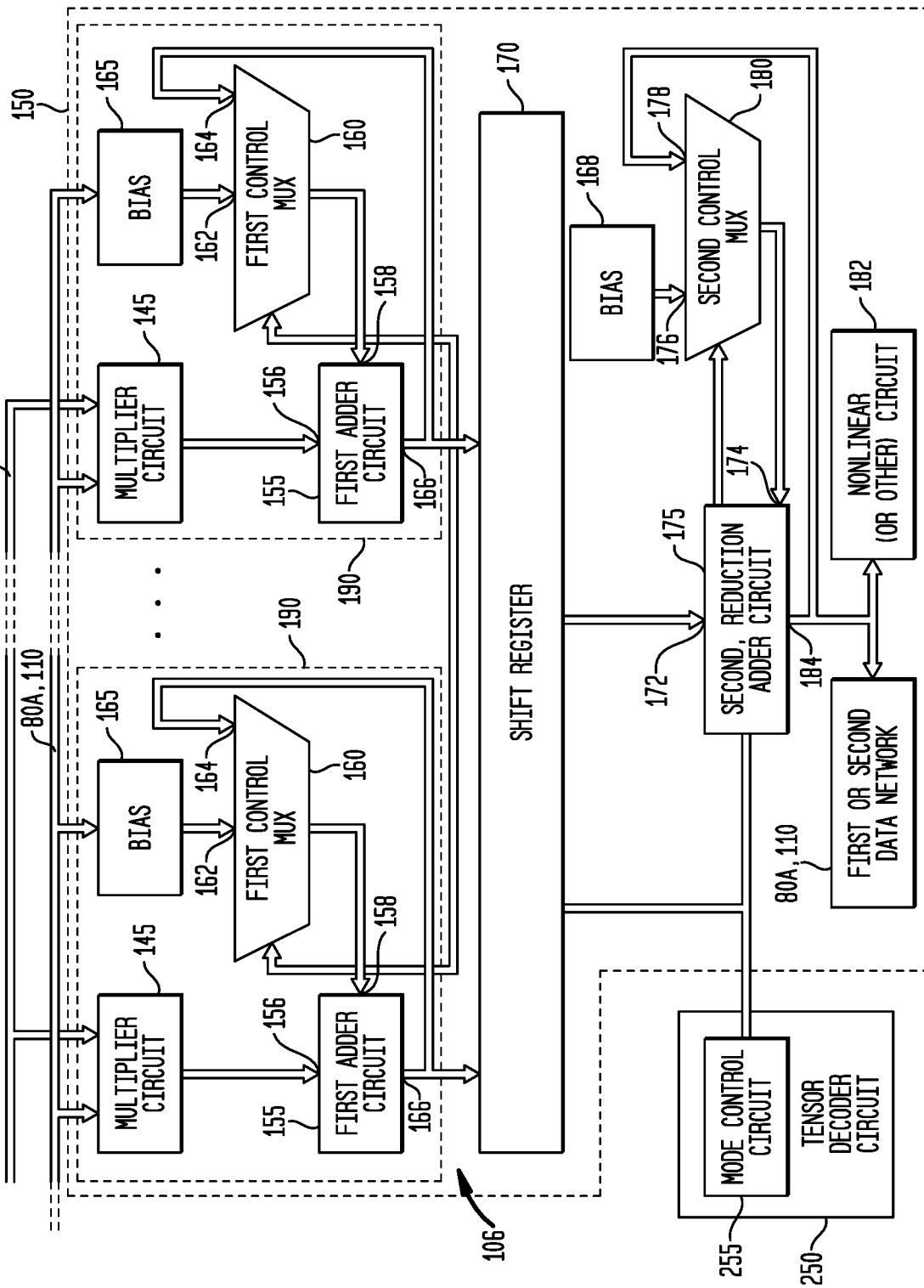
FIG. 6 is a block diagram of a representative embodiment of a vector-vector accelerator circuit having a plurality of multiply and accumulate ("MAC") circuits.

FIG. 6 is a block diagram of a representative embodiment of a VV accelerator circuit 150 having an array 106 of a plurality of multiply and accumulate (MAC) circuits 190, illustrated as MAC circuit $190_1$, MAC circuit $190_2$, through MAC circuit $190_N$. Each MAC circuit 190 comprises a multiplier 145, a first adder 155, and optionally a first control multiplexer ("MUX") 160. The multiplier 145 multiplies map data (as a first word) from the maps buffer 105 by corresponding kernel (weight) data (as a second word) from the corresponding kernel buffer 125, and provides as its output an intermediate, multiplicative product as a first input (156) to the first adder 155. The first adder 155, in turn, will add that intermediate, multiplicative product to a second input (158), which second input (158) is the output from the first control MUX 160, and provide that resulting sum as a first (or next) accumulation sum. The first control MUX 160 receives, as a first input (162), a first bias parameter (which may be from a register 165 (as illustrated) or provided via the second, data access network 110 and/or first, data distribution network 80A (not separately illustrated)), and as a second input (164), feedback of the first (or next) accumulation sum. The first bias parameter, for example, may be a parameter or other value (e.g., a constant or a variable value) utilized to normalize the resulting data. The feedback of the first (or next) accumulation sum is provided for the first adder 155 to perform an ongoing accumulation, adding the first (or next) accumulation sum to the current multiplicative product received from the multiplier 145, to produce a next accumulation sum. Under the control of a first mode control word provided by the tensor decoder circuit 250 and/or the MM processor circuit 200, one of these two inputs (162 or 164), namely, the first bias parameter or the first (or next) accumulation sum, is selected by the first control MUX 160 as the second input (158) into the first adder 155, which adds it to the current multiplicative product received from the multiplier 145 to produce a next accumulation sum, which is output (166) to a shift register 170. Alternatively, in the event that nothing is to be added to the current multiplicative product by the first adder 155, the first bias parameter or the second input (158) can be set to zero and selected as the second input into the first adder 155. Also alternatively, in the event a bias parameter is not to be selectively added to the current multiplicative product by the first adder 155, optionally the first control MUX 160 may be omitted, with the feedback of the first (or next) accumulation sum provided directly as an input to the first adder 155 for ongoing accumulation.

The shift register 170 receives such accumulation sum outputs (166) from each of the MAC circuits 190, and sequentially shifts these outputs to provide them as one or more first inputs (172) to a second, reduction adder 175. The reduction adder 175, in turn, will add that accumulation sum output from a MAC circuit 190 (provided via shift register 170) to a second input (174) to the reduction adder 175, which second input (174) is the output from a second control multiplexer ("MUX") 180, to provide a second (or next) accumulation sum. The second control MUX 180 also receives, as a first input (176), a second bias parameter (which may be from a register 168 (as illustrated) or provided via the second, data access network 110 and/or first, data distribution network 80A (not separately illustrated)), and as a second input (178), feedback of the second (or next) accumulation sum. The second bias parameter, for example, may be a parameter or other value (e.g., a constant or a variable value) utilized to normalize the resulting data, and may be the same as or different from the first bias parameter. The feedback of the second (or next) accumulation sum is provided for the reduction adder 175 to perform an ongoing accumulation, such as across all or some of the MAC circuits 190, adding the second (or next) accumulation sum to the current output from a MAC circuit 190 provided via the shift register 170. Under the control of a second mode control word provided by the tensor decoder circuit 250 and/or the MM processor circuit 200, one of these two inputs (176, 178), namely, the second bias parameter or the second (or next) accumulation value, is selected by the second control MUX 180 as the second input into the reduction adder 175. The reduction adder 175 adds the selected second input to the current accumulation sum received from the shift register 170 to produce the second (or next) accumulation sum, which can be provided as an output 184 from the VV accelerator circuit 150 (to the second, data access network 110 and/or first, data distribution network 80A (such as for storage in memory 25 or the maps buffer 105), or to another linear or nonlinear computation circuit 182, or to another MAC circuit 190 or to the MAX circuit 130 (such as for maxpooling), for example and without limitation) or which can be fed back through the second control MUX 180 for ongoing accumulation to produce a next accumulation sum. Alternatively, in the event that nothing is to be added to the accumulation sum output from a MAC circuit 190, either the second bias parameter or the second input (174) can be set to zero and selected as the second input into the reduction adder 175. Those having skill in the art will recognize that as multiple outputs are provided, multiple multiply and accumulation operations can be performed successively and iteratively across such outputs, eventually obtaining the complete multiplication of a matrix by another matrix.

It should be noted that in representative embodiments, at least one of the first control multiplexers (MUXes) 160 or the second control multiplexer (MUX) 180 are included in the VV accelerator circuit 150. For example, the first control MUX 160 may be optional, and may be included or not included in the MAC circuit 190 depending upon the granularity of the control selected or desired to be implemented, as described in greater detail below. Also for example, when the first control MUX 160 is included, the second control MUX 180 may be optional, and vice-versa.

It should also be noted that depending upon the description and ordering within the description, a second control MUX 180 may be referred to as a first control MUX 180 and a first control MUX 160 may be referred to as a second control MUX 160. For example, when the first control MUX 160 is optional, the second control MUX 180 is then typically referred to as a first control MUX 180 or more simply as a control MUX 180. Whether either of these multiplexers 160, 180 is referred to as first or second is largely irrelevant; rather, what is important is that a control MUX 180 is coupled to the reduction adder 175, while a control MUX 160 is coupled to a first adder 155, as an option.

In another representative embodiment, both the first control multiplexers (MUXes) 160 and the second control multiplexer (MUX) 180 are included in the VV accelerator circuit 150. For such a representative embodiment, each of the first control multiplexers 160 and the second control multiplexer 180 of each of the VV accelerator circuits 150 are also coupled to the tensor decoder circuit 250 and/or the MM processor circuit 200 to receive, respectively, first and second mode control words, which determine the operational mode of the VV accelerator circuit 150. In another representative embodiment, only the control MUX 180 is included in the VV accelerator circuit 150.

For any of these various embodiments, these operational modes of the VV accelerator circuit 150 may include:

(1) An independent mode, in which each of the MAC circuits 190 provides a corresponding first (or next) accumulation sum as a complete result to the shift register 170, each of which may then be modified by the reduction adder 175 to the extent of adding in a second bias parameter (or not, if such a bias parameter was already added as the first bias parameter by the first adder 155, or if no bias parameter is being included). In a representative example, without limitation, when sixteen MAC circuits 190 are implemented in a VV accelerator circuit 150, such a second (or first) mode control word may be [1111111111111111], for example and without limitation, such as selecting the addition by the reduction adder 175 of the second bias parameter to each first (or next) accumulation sum, which are then provided as sixteen successive outputs from the VV accelerator circuit 150.

(2) A cooperative mode, in which each of the MAC circuits 190 provides a first (or next) accumulation sum as a corresponding partial result to the shift register 170. In a first cycle of the reduction adder 175, the first such partial result is added to a second bias parameter (if any) to provide a second (or next) accumulation sum, and in successive cycles, each successive second (or next) accumulation sum is selected for feedback through the second control multiplexer (MUX) 180)) and is then successively added by the reduction adder 175 to the current second (or next) accumulation sum provided by the shift register 170, thereby providing a single overall accumulation result as a single output from the VV accelerator circuit 150. Also in a representative example, without limitation, when sixteen MAC circuits 190 are implemented in a VV accelerator circuit 150, such a second mode control word may be [1000000000000000], selecting the addition by the reduction adder 175 of the second bias parameter to the first (or next) accumulation sum in the first cycle, followed by selecting successive feedback of the second (or next) accumulation sum, which is then successively added by the reduction adder 175 to the current second (or next) accumulation sum provided by the shift register 170, resulting in a single overall accumulation result provided as a single output from the VV accelerator circuit 150.

(3) Any of several combined, blended or intermediate cooperative and independent modes, each of which generates different sequences of outputs from each VV accelerator circuit 150 with varying degrees of accumulation. Continuing with the example, without limitation, when sixteen MAC circuits 190 are implemented in a VV accelerator circuit 150, different groups of MAC circuits 190 may be selected to operate in a cooperative mode, independently of other groups of MAC circuits 190 which are each collectively operating in their own cooperative modes, allowing for selection of:

(A) a single output selected (a fully cooperative mode, with a second (or first) mode control word being, for example and without limitation, [1000000000000000]), as discussed above;

(B) 16 separate outputs selected (a fully independent mode, with a second (or first) mode control word being, for example and without limitation, [1111111111111111]);

(C) two outputs selected (a first intermediate cooperative and independent mode) in which two groups of eight MAC circuits 190 are selected, functioning in a cooperative mode within a group, but with each group itself operating independently from the other group (with a second mode control word being, for example and without limitation, [1000000010000000]);

(D) four outputs selected (a second intermediate cooperative and independent mode) in which four groups of four MAC circuits 190 are selected, also functioning in a cooperative mode within a group, but with each group itself operating independently from the other group (with a second mode control word being, for example and without limitation, [1000100010001000]); and (E) eight outputs selected (a third intermediate cooperative and independent mode) in which eight groups of two MAC circuits 190 are selected, also functioning in a cooperative mode within a group, but with each group itself operating independently from the other group (with a second mode control word being, for example, [1010101010101010]).

Those having skill in the art will recognize that other combinations of combined, blended or intermediate cooperative and independent modes are available, depending upon the number of MAC circuits 190 which are implemented. Those having skill in the art will also recognize that for any of these operational modes, any bias parameter may be added in separately by the first adder 155. In addition, additional control is also provided using the first control MUX 160 of the MAC circuits 190, each of which can also be selected for feedback of a first (or next) accumulation sum for addition to the multiplicative product, also providing for significant accumulation by each MAC circuit 190, e.g., over hundreds to thousands of instructions or cycles. This is especially helpful in preserving high resolution, as some bits and resolution may be lost if intermediate results have to be stored to memory 25 (e.g., reducing accumulation at 32 bits to storage of only 16 bits). Any and all of these selections, implementations or combinations are considered equivalent and within the scope of the disclosure In addition, using these different operational modes, different kinds of parallelism may be exploited, and in different combinations. For example, fully independent modes and intermediate cooperative and independent modes may be more efficient for parallelism across kernels (inter-kernel parallelism). The MM accelerator circuit 100 architecture of the inference engine circuit architecture 50 allows for complete exploitation of any type of relevant parallelism. For example, the MAC circuits 190 of a VV accelerator circuit 150 may share both maps data (intra-map parallelism) and kernel data (intra-activation parallelism), for providing one output in a cooperative mode. Also for example, the MAC circuits 190 of a VV accelerator circuit 150 may share maps data (intra-map parallelism) and utilize different kernel data (inter-activation parallelism), for providing multiple outputs in an independent mode. Also for example, the MAC circuits 190 of a VV accelerator circuit 150 may utilize different maps data and share kernel data, also for providing multiple outputs in an independent mode. Also for example, the MAC circuits 190 of a VV accelerator circuit 150 may share different parts of the maps data (e.g., the same pixel position in different maps layers) and utilize different kernel data, also for providing one output in a cooperative mode. All of these types of exploitation of parallelism are possible with the inference engine circuit architecture 50.

Referring again to FIGS. 3 and 4, the MM accelerator circuit 100, or the maps buffer 105, or the second, data access network 110 (or first, data distribution network 80A) includes a maps buffer arbiter circuit 185. The maps buffer arbiter circuit 185 provides the request response mechanism for the maps buffer 105. The maps buffer arbiter circuit 185 receives addresses from the operand collector 260 (discussed below) and the various decoders of the tensor decoder circuit 250. Using the received address, the maps buffer arbiter circuit 185 obtains the requested data from the appropriate bank of the maps buffer 105, and then forwards the requested data (via the second, data access network 110 (or first, data distribution network 80A)) to either the operand collector 260 or to the appropriate MAC circuit 190 or MAX circuit 130. The maps buffer arbiter circuit 185 typically comprises state machine and control logic circuits 290 and various registers 270, illustrated and discussed below with reference to FIG. 8. As various incoming requests may conflict with each other for access to the maps buffer 105, the requests may be stored in the registers 270, and conflicts resolved (arbitrated) (e.g., implementing a round robin protocol, for example and without limitation) by the state machine and control logic circuits 290, such that all of the various data requests are or become fulfilled.

Figure 7:
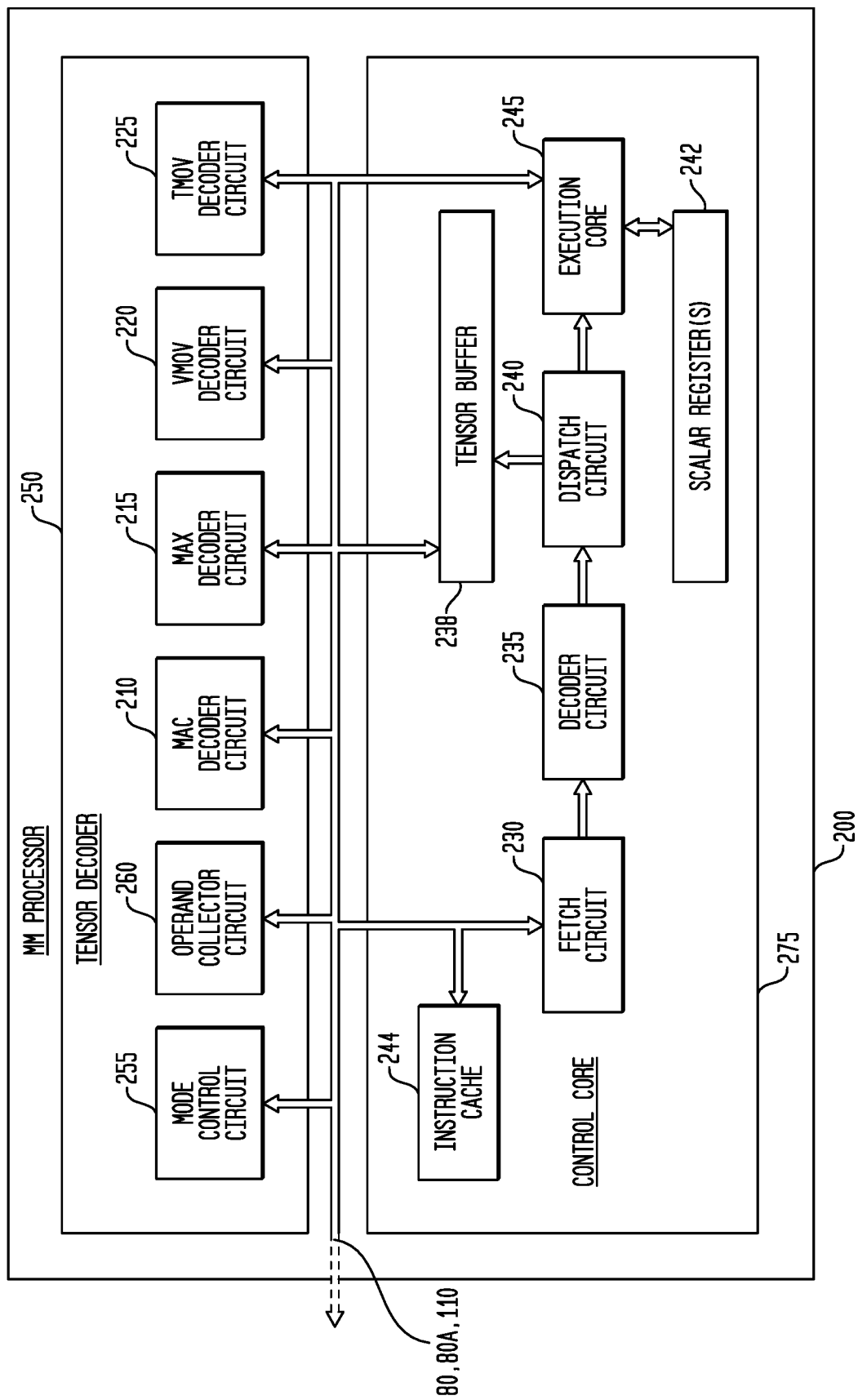
FIG. 7 is a block diagram of a representative embodiment of a matrix-matrix processor circuit.

FIG. 7 is a block diagram of a representative embodiment of a MM processor circuit 200. A representative embodiment of a MM processor circuit 200 comprises a tensor decoder circuit 250 and a control core 275 (also referred to as a "pipeline" controller or processor 275). Another representative embodiment of a MM processor circuit 200 comprises the control core 275 and, as mentioned above, in such embodiments, the tensor decoder circuit 250 is not included within the MM processor circuit 200. Instead, a plurality of tensor decoder circuits 250 are distributed throughout the inference engine circuit architecture 50, such as providing a tensor decoder circuit 250 for or in each MM accelerator circuit 100, as illustrated in FIG. 4. The tensor decoder circuit 250 functions the same, however, regardless of the location of the tensor decoder circuit 250 within either a MM accelerator circuit 100 or a MM processor circuit 200 or elsewhere within the inference engine circuit architecture 50.

As the inference engine circuit architecture 50 receives instructions for execution or other processing, those instructions are provided to or fetched from an instruction cache (buffer or register) 244 by the control core 275, by fetch circuit 230, and are decoded into a type of instruction, using decoder circuit 235. The instruction cache (buffer or register) 244 is illustrated as being located within the control core 275, but can be located within any of the various registers or memories of the MM accelerator circuit 100. Any tensor instructions (used for running tensor operations) or vector instructions (used for preloading vector data and loading configurations in the MM accelerator circuit 100), for execution by a MM accelerator circuit 100, are provided to and queued in the tensor instruction buffer 238 by the dispatch circuit 240. Other instructions (e.g., scalar instructions, used for metadata manipulation and bookkeeping) which are not for the MM accelerator circuits 100 are dispatched for execution by the control core 275 (dispatch circuit 240), and subsequently may be executed by the control core 275, such as using execution (or processor) core 245.

For example, the decoder circuit 235 will determine whether a scalar instruction has any data dependencies, and if so, will hold the instruction until the dependencies resolve. The decoder circuit 235 will also serve to synchronize instructions which will be going out the VV accelerator circuits 150 (MV accelerator circuits 115). One or more scalar register(s) 242 within the control core 275 includes registers to hold various metadata, such as to manipulate or add to various addresses. The scalar register(s) 242 can also be used for general purposes, such as a scratchpad for computing, and for any special functions, such as for address manipulation in the dispatch stage.

The dispatch circuit 240 receives decoded or partially decoded instructions. The dispatch circuit 240 also conducts data dependency checks for both the maps buffer 105 and the kernel buffers 125, such as checking for read after write operations (e.g., if a load operation is not complete, it will stall a MAC circuit 190). The dispatch circuit 240 also collects any metadata, which it will send to the appropriate execution unit (execution (or processor) core, 245, VV accelerator circuits 150 or MV accelerator circuits 115).

Whether located within the various MM accelerator circuits 100 or located within the MM processor circuit 200, the tensor decoder circuit 250 is structured or adapted to offload significant processing work from the control core 275, enabling the control core 275 to execute other instructions and perform other computations, particularly while the MM accelerator circuit 100 may be involved in computations occurring over hundreds to thousands of cycles, for example and without limitation. For example, the control core 275 may generate a base address to the tensor decoder circuit 250, which will then compute all of the addressing to move data into or out of a MM accelerator circuit 100 and/or between the memory circuit 25 and a MM accelerator circuit 100. The tensor decoder circuit 250 receives tensor instructions from the tensor buffer 238, such as instructions for execution by the MAC circuits 190 (MAC instructions), the MAX circuit 130 (MAX instructions), and instructions to move data into or out of the MM accelerator circuit 100 (tensor data move and vector data move instructions), such as to and from the memory circuit 25 and to and from any of the MAC circuits 190 or MAX circuits 130.

Figure 8:
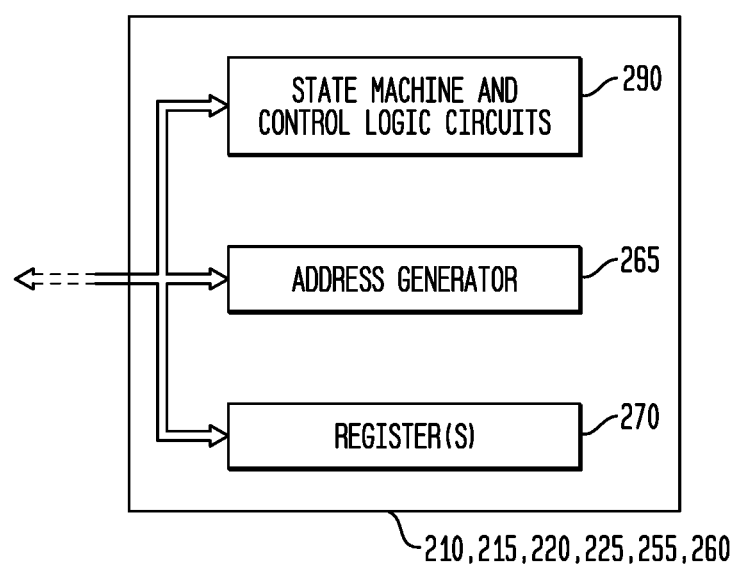
FIG. 8 is a block diagram of a representative embodiment of a maps buffer arbiter circuit, and a decoder circuit, a mode control circuit, and an operand collector circuit of a tensor decoder circuit.

The tensor decoder circuit 250 comprises a MAC decoder circuit 210, a MAX decoder circuit 215, a vector data move ("VMOV") decoder circuit 220, a tensor data move ("TMOV") decoder circuit 225, an operand collector 260, and a mode control circuit 255. Each of these components has the same general circuit structure, illustrated in FIG. 8. FIG. 8 is a block diagram of a representative embodiment of a maps buffer arbiter circuit 185, and of a decoder circuit 210, 215, 220, 225, a mode control circuit 255, and an operand collector circuit 260 of a tensor decoder circuit 250. Each of the maps buffer arbiter circuit 185, decoder circuits 210, 215, 220, 225, mode control circuit 255, and operand collector circuit 260 typically comprise state machine and control logic circuits 290 structured or adapted to perform the functions of the particular component and registers 270 to store various kinds of data, such as addresses. In addition, the decoder circuits 210, 215, 220, 225 also typically comprise an address generator circuit 265, used to calculate and generate addresses for obtaining or storing data in any of the memory circuit 25, the maps buffer 105, or the kernel buffers 125.

In operation, the VMOV decoder circuit 220 generates and holds addresses until the memory 25 may be ready to receive the data request. Like the MAC decoder circuit 210, the TMOV decoder circuit 225 checks for the availability of physical resources for data movement, and checks to avoid data conflicts, such as write after read dependencies. The TMOV decoder circuit 225 generates and holds addresses for data movement between the maps buffer 105 and the memory circuit 25, and also between and among the MM accelerator circuits 100. For example, the TMOV decoder circuit 225 may buffer data while waiting for the memory circuit 25 to be available. Using the VMOV decoder circuit 220 and TMOV decoder circuit 225, address generation for data movement may be offloaded from the control core 275, which is then free to perform other operations.

The MAC decoder circuit 210 determines whether the top instruction on the tensor buffer 238 is a MAC instruction, and if not, it waits for a MAC instruction to appear in the tensor buffer 238. When it obtains a MAC instruction, using state machine and control logic circuits 290, the MAC decoder circuit 210 then determines if the MAC instruction(s) has resource constraints, such as whether the physical links to the maps buffer 105 that are used by some VV accelerator circuits 150 are already occupied by other activities, such as from MAX instructions, VMOV instructions, or TMOV instructions. If these links are occupied, the MAC decoder circuit 210 waits until those links are free, to avoid link conflicts. If these links are not occupied, the MAC decoder circuit 210 takes the MAC instruction from the tensor buffer 238 and starts executing it. Using state machine and control logic circuits 290, the MAC decoder circuit 210 also makes sure that there is sufficient (e.g., 16 cycle) latency available for writing data back to the maps buffer 105, such as may be required by the shift register 170 and reduction adder 175. If some cycles are remaining, it stalls the new tensor instruction. The MAC decoder circuit 210 also ensures that VV accelerator circuits 150 in the current tensor instruction are not addressing the same memory bank of the maps buffer 105 as the previous tensor instruction at the same time, to avoid bank conflicts. Using state machine and control logic circuits 290 and address generation circuits 265, the MAC decoder circuit 210 executes by outputting addresses starting at a base address (e.g., 132) and incrementing (including any stride 138 increments) until the current address is equal to the base address plus the tensor length (plus any stride 138 increments for non-contiguous data which may be part of a tensor 144), illustrated as last or end address 142 for the tensor length illustrated in and discussed with reference to FIG. 2, and provides these output addresses to the operand collector 260 (when the operand collector 260 is ready). The MAX decoder circuit 215 functions identically to the MAC decoder circuit 210, but does so for instructions applicable to the MAX circuit 130.

The operand collector circuit 260 receives addresses from the MAC decoder circuit 210 and transfers those addresses to the maps buffer arbiter circuit 185 (or the maps buffer 105) and to the kernel buffers 125. The maps buffer 105 and the kernel buffers 125 then transfer the requested data to the operand collector circuit 260 which then supplies the data appropriately to the VV accelerator circuits 150 (MV accelerator circuits 115) based on the compute mode, as discussed above (e.g., shared maps data, different kernel data, etc., for example and without limitation).

More particularly, the operand collector circuit 260 receive addresses from the MAC decoder circuit 210. Based on the selected operational mode (e.g., independent mode (e.g., 16 outputs from a VV accelerator circuit 150), cooperative mode (e.g., a single output from a VV accelerator circuit 150), or a blended independent/cooperative mode (e.g., 2, 4, or 8 outputs selected from a VV accelerator circuit 150), the operand collector circuit 260 ensures that the transaction is a hit, i.e., that the data is in the maps buffer 105 or the kernel buffers 125. If the data is not available, the operand collector circuit 260 sends a stall message or flag to the MAC decoder circuit 210 until the data is received. Such a stall depends on the operational mode. For example, in independent mode, the stall depends on the word address within a vector and for the cooperative mode a stall is not encountered. When the data is obtained (following a hit or if the data is received following a miss), the data is buffered (e.g., in registers 270) and appropriate amounts or packets of that data are then transferred to the VV accelerator circuits 150 (MV accelerator circuits 115). In independent mode, some unnecessary words may be shifted out before sending data to the VV accelerator circuits 150 (MV accelerator circuits 115). The operand collector circuit 260 may also buffer operational metadata that is sent out to cooperative mode with maps or kernel data.

The mode control circuit 255 is optional, and in a representative embodiment, is used to hold and distribute mode control words (described above) to the first control MUX 160 and/or second control MUX) 180 of the VV accelerator circuits 150 (MV accelerator circuits 115), via the second, data access network 110 and/or first, data distribution network 80A or via the control bus 195. The mode to be implemented is typically selected by the user, and may be implemented at compile time, for example and without limitation. When a mode control circuit 255 is not included, the functions of storing and/or distributing mode control words may be performed by other components of either the tensor decoder circuit 250 or the control core 275.

Figure 9:
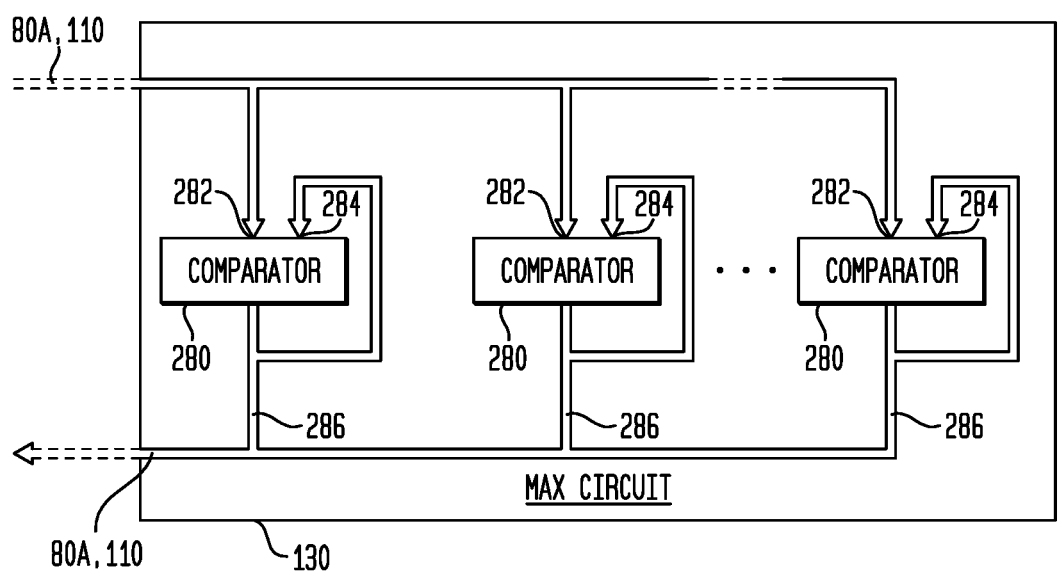
FIG. 9 is a block diagram of a representative embodiment of a MAX circuit.

FIG. 9 is a block diagram of a representative embodiment of a MAX circuit 130, and is illustrated for completeness. The MAX circuit 130 is comprised of a plurality of comparators 280, and is utilized to obtain a maximum of the operands being compared, such as to implement a maxpooling operation of a CNN. An operand is input (input 282) (via the second, data access network 110 and/or first, data distribution network 80A) and compared with a second input (284) (which may be initialized to zero, for example, for the first comparison cycle), with the current highest value (or maximum) being fed back (input 284) for ongoing comparisons, until a maximum value had been obtained and output (286).

Figure 10A:
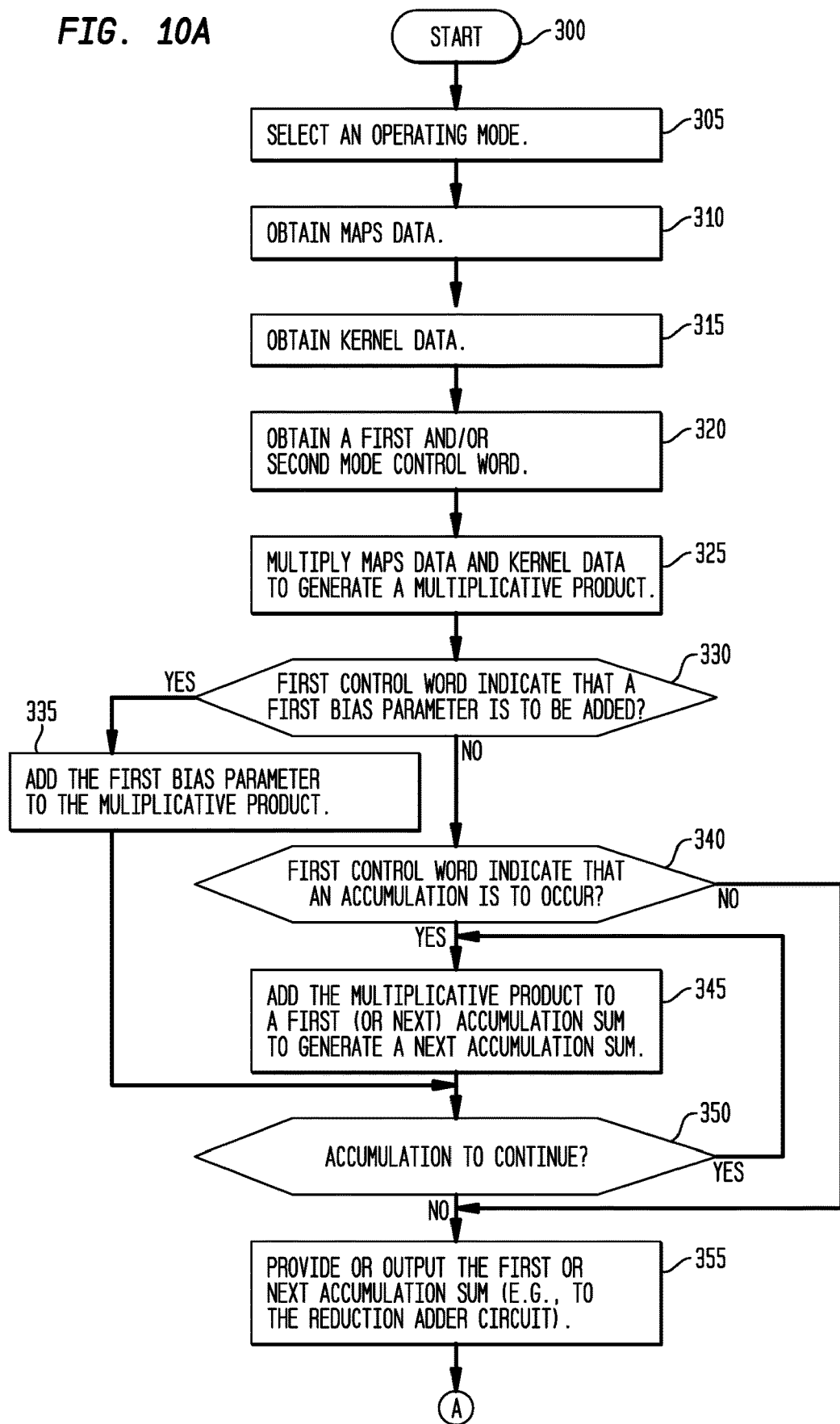
FIGS. 10A and 10B (collectively referred to as FIG. 10) is a flow chart of a representative embodiment of a method of performing matrix multiplication using the inference engine circuit architecture or system.
Figure 10B:
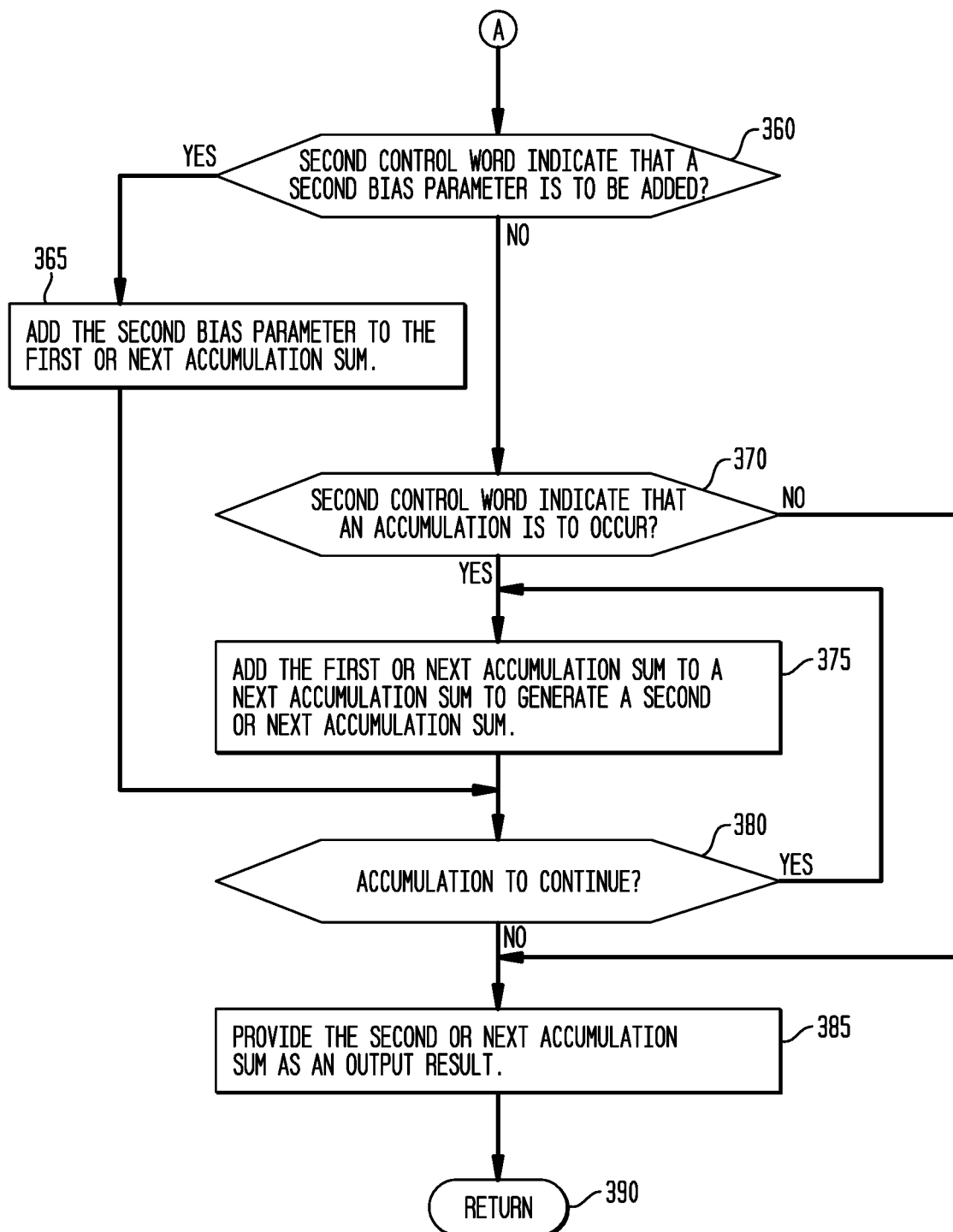

FIG. 10 is a flow chart of a representative embodiment of a method of performing matrix multiplication using the inference engine circuit architecture or system 50, and provides a useful summary. It should be noted that the various steps illustrated in FIG. 10 may occur in a wide variety of orders, and all such variations are considered equivalent and within the scope of the disclosure. Beginning with start step 300, an operating mode is selected, step 305, such as at compile time. As discussed above, maps data is obtained, step 310, kernel data is obtained, step 315, and a first and/or second control word is obtained, step 320. Maps data and kernel data are multiplied to generate a multiplicative product, step 325, using multiplier circuit 145. When a first control word indicates that a first bias parameter is to be added, step 330, the first bias parameter is added to the multiplicative product, step 335, using the first adder circuit 155, and the method proceeds to step 350. When the first control word does not indicate that a first bias parameter is to be added, step 330, the method determines whether the first control word indicates that an accumulation is to occur, step 340. When an accumulation is to occur in step 340, the multiplicative product is added to a first (or next) accumulation sum to generate a next accumulation sum, step 345, using the first adder circuit 155. When accumulation is to continue, step 350, the method returns to step 345 and iterates. When accumulation is not to continue, step 350, the method provides the first or next accumulation sum to the reduction adder circuit 175, step 355, such as via the shift register 170.

When a second control word indicates that a second bias parameter is to be added, step 360, the second bias parameter is added to the first or next accumulation sum, step 365, using the reduction adder 175, and the method proceeds to step 380. When the second control word does not indicate that a second bias parameter is to be added, step 360, the method determines whether the second control word indicates that an accumulation is to occur, step 370. When an accumulation is to occur in step 370, the first or next accumulation sum is added to a next accumulation sum to generate a second or next accumulation sum, step 375, using the reduction adder circuit 175. When accumulation is to continue, step 380, the method returns to step 375 and iterates. When accumulation is not to continue, step 380, the method provides the second or next accumulation sum as an output result, step 385, and the method may end, return step 390.

Numerous advantages of the representative embodiments are readily apparent. The representative inference engine circuit architecture 50 provides a computing architecture capable of providing high performance for CNN applications, for applications such as artificial intelligence, machine learning, image recognition, and other inferential applications requiring mathematical computations, for example and without limitation. The inference engine circuit architecture (system) 50 has comparatively high efficiency, with significant utilization (about 95%), and has a comparatively low bandwidth for access to any memory integrated circuit storing the maps and kernel data. The inference engine circuit architecture 50 is capable of performing a complete matrix-by-matrix multiplication.

The inference engine circuit architecture 50 reaches 99.9% efficiency in a large majority of deep neural network layers, eliminating dead or dark silicon and making the most of every watt of power. The inference engine circuit architecture 50 can provide easier scaling than systolic arrays, at the multiple of VV accelerator circuits 150. Beyond MV accelerator circuits 115, the inference engine circuit architecture 50 scales with MM accelerator circuits 100, as shown in FIG. 1.

DNNs are composed of various layers of operations connected together. Commonly used layers in DNN models are discussed below.

A. Spatial convolution (CONV): Spatial convolution (CONV) is the core layer of CNNs, accounting for more than 90% of the operations for most of the CNN models. CONV is the multiplication and accumulation of values from an 3D input tensor (maps) with a set of 3D kernels that produces a 3D output volume. Each 3D kernel is associated with a bias value and produces a 2D output plane, also referenced as feature maps. Each output pixel of this plane was created by striding the kernel along a window of the input. Padding is added to the corners of the input plane so that the kernel can cover the corners of the input. Padding is also used to create different output sizes. The main parameters of a CONV are: the dimension sizes of the input, kernel sizes, stride and padding. From those parameters, the output size is calculated using Equation 1. Only an equation with a subscript x is shown, but an equivalent with subscript y should be inferred. Equation 1:

$$o_x = [(i_x - k_x + 2*pad_x)/s_x] + 1$$

where $i_x$, $i_y$, and $i_p$ are input width, height and planes; $o_x$, $o_y$, and $o_p$ are output width, height and planes; $k_x$, $k_y$, $k_p$ and $k_o$ is kernel width, height, planes and kernels; $k_p$ and $i_p$ are equal; $k_o$ and $o_p$ are equal; $s_x$ and $s_y$ are the window strides along x and along y; $pad_x$ is number of columns padded on top and bottom; $pad_y$ is the number of rows padded on top and bottom. There are two types of padding: use zeros values or replication of the corner values. In any case, the representative compiler does not send padding values to the MM accelerator circuit 100 and/or MM processor 200 to save memory 25 usage and memory 25 bandwidth. It addresses this by using the appropriate addressing and computation sizes. The operations in a window are independent, hence they are well suited to multicore processors, such as GPUs and the inference engine circuit architecture 50, for example and without limitation.

B. Transposed Convolution ("TCONV"): CONVs produce $o_x$ and $o_y$ that are less than or equal to $i_x$ and $i_y$. Thus the sizes of feature planes shrink in the deeper layers. To reverse this process, transpose convolution is a special case of CONV that recover the sizes of the feature planes. TCONV have $o_x$ and $o_y$ of TCONV greater or equal to its $i_x$ and $i_y$. TCONV parameters are thought by applying a CONV on the output of the TCONV to get its input. The padding defines the amount of rows or columns padded in the output of the TCONV, so that a CONV on that would produce the right sizes of the TCONV's input. Similar thought applies for stride. TCONV also have an output padding, in which TCONV's input has extra row or column in one of the corners (not both unlike padding), so that the output width and height matches.

It is possible to compute TCONV using an equivalent CONV. TCONV with stride greater than 1 is a CONV with padding/gaps in between each row and column. The gap size is stride minus 1. The expanded input size and the output size are calculated using Equation 2 and Equation 3 below. Equation 2:

$$ei_x = i_x + 2*pad_x + (s_x-1)*(i_x-1) + opad_x$$

$$o_x = (i_x-1)*s_x - 2*pad_x + k_x + opad_x \quad \text{Equation 3:}$$

Where $ei_x$ and $ei_y$ are the expanded input sizes, and $opad_x$ and $opad_y$ are output padding. The location was the extra row or column is added for output padding varies between frameworks. Pytorch adds to left and bottom, while Tensorflow adds to top and right. Expanding the input is an expensive price for the accelerator, since it increases the required memory footprint by $(s_x-1)*(i_x-1)$. The representative compiler does not send the padded input, it uses the right access addresses to avoid sending padding/repeated data from memory 25 to the MM accelerator circuit 100 and/or MM processor 200.

C. Fully Connected (FC): A fully connected layer is a matrix-vector multiplication. The matrix parameters are learned so that they map its input into an output vector with a learned linear function. FC is used as the last layers of CNN to provide a classification vector. FC is also largely used in Recurrent Neural Networks (RNNs). A FC layer is a data movement intensive operation because it provides limited data reuse, e.g., CNNs are compute intensive whereas RNNs are data movement intensive. Memory bandwidth is a bottleneck for RNN FPGA based accelerators. Weight compression and weight pruning based on network sparsity are techniques that lower memory bandwidth requirement for this type of workload. FC layers can also be viewed as a CONV with unitary kernel sizes and strides. $i_p$ is the input vector size, which is also the width of the matrix. And $o_p$ is the output size, which is also the height of the matrix. This allows the reuse of most algorithms used in CONV for FC.

D. Average pooling (Avgpool) and Max pooling (Maxpool): Average pooling takes the average of the values in a window of the feature plane. Avgpool also can be implemented as a CONV with a single weight value of inverse of window size $(1/(k_x*k_y))$. Multiplying and accumulating all values in a window produce the average value of a window. Max pooling is a down-sampling technique to achieve data invariance and to compress feature representation. Max pooling is element-wise comparison and its output is the highest value in a window. The input and output size relationship is same as shown in Equation 1.

E. Activation Unit: Non-linear functions are applied to some layer's outputs, so that the model will reproduce non-linear relations. Some examples of activation units used are: rectified linear unit (ReLU), softmax, tanh and sigmoid.

F. Add, Multiply and Concatenation: Add, Multiply and Concatenation are important vector operations in linear algebra. Given a multiply and accumulate engine, add is y=x*1+b, where y is output, x is one input vector and b is another vector. Multiply is y=x*b+0. Vector add is mainly used as a bypass connection between layers. This idea was introduced in ResNet models. Concatenation is used to group together feature maps from different layers. This was introduced in GoogLeNet models.

II. A Representative Compiler:

The custom ISA for the inference engine circuit architecture 50, as a representative accelerator, has instructions which implement four different functionalities: data movement, compute, flow control and memory access. For the representative compiler 400, 500, the most relevant instructions are: MAC, MAX, VMOV, LOAD (LD), TMOV, Branch and SYNC. Other typical or known instructions such as Add, Move, Multiply may also be implemented. MAC multiplies and accumulates a contiguous sequence of data from maps buffer 105 (also abbreviated as "Buf" or "MBuf" in FIGS. 11-21) and kernel (weights) buffer 125 (also abbreviated as "WBuf" in FIGS. 11-21). MAX compares two blocks of data from maps buffer 105 (Buf). MAC and MAX send results back to the maps buffer 105. VMOV pre-loads data to the MV accelerator circuits 115 to set the initial value for MAC. It is used to add the bias or implement the residual addition. LOAD (or LD) sends data from external memory 25 to maps buffer 105, kernel (weights) buffer 125 or the instruction cache (buffer or register) 244. TMOV sends data from the maps buffer 105 to external memory 25 or to another buffer. Branch is used to create loops and if-else conditions. SYNC is an instruction that ensures all VV accelerator circuits 150, and/or MV accelerator circuits 115 and/or MM accelerator circuits 100 are synchronized.

Figure 11:
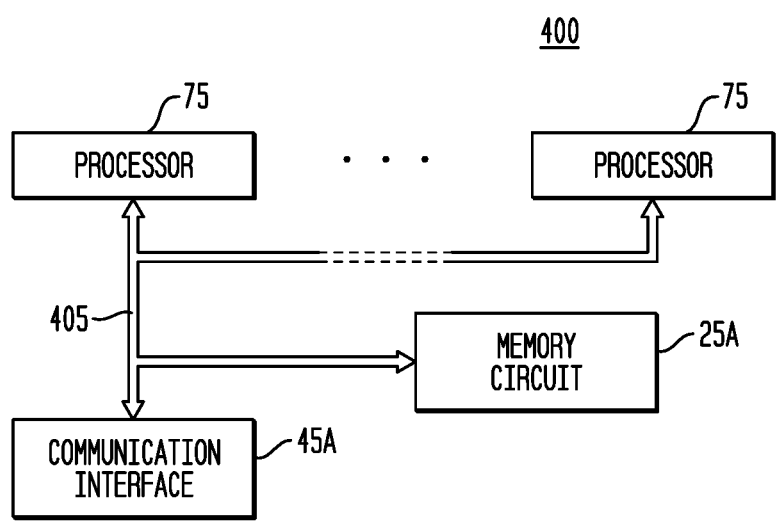
FIG. 11 is a block diagram of a representative embodiment of a compiler system.

FIG. 11 is a block diagram of a representative embodiment of a compiler system 400 (also referred to more simply as a "compiler 400"). The representative compiler system 400 implements the compiler method 500 illustrated and discussed below with reference to FIG. 12. As illustrated in FIG. 11, the representative compiler system 400 includes one or more processors 75, which may be any type of processor (such as described in greater detail below); a memory circuit 25A; and a communication interface 45, such as for input of the neural network (e.g., ONNX) code which is to be stored in memory 25A and compiled into the instructions which are subsequently stored in instruction cache (buffer or register) 244 and executed by the inference engine circuit architecture 50, for example and without limitation. The memory circuit 25A also may be referred to as a "second memory circuit" to distinguish it from the first memory circuit 25 which will be utilized by the various MV accelerator circuits 115 and/or MM accelerator circuits 100 when they execute the plurality of executable instructions which are to be generated by the compiler 400. These various components are typically coupled to each other, directly or indirectly, as the case may be, such as through various bus structures 405 as illustrated, with all such coupling arrangements and topologies considered equivalent and within the scope of the disclosure, for example and without limitation. Not separately illustrated, the compiler system 400 may include a plurality of different types of processors, such as graphics processors, etc., also as discussed in greater detail below. In a representative embodiment, the one or more processors 75 may be multi-core processors as an option, with each processor 75 having a plurality of processor (or processing) cores. The representative compiler system 400 may be embodied or implemented as an exemplary or representative computer, a server, a supercomputer, an Internet-based or "cloud" based server system (equivalently referred to as a computer server), and not separately illustrated, may be coupled through a network (such as the Internet) (along with other network equipment and various components such as a router, a wireless router, a switching center and/or base station) to a plurality of client devices. A user can interact with the representative compiler system 400 through one or more client devices which are coupleable through a network to the communication interface 45 or directly coupled to the communication interface 45 (e.g., through a keyboard, a mouse, etc.). Although several components are illustrated, there may be fewer or more components in the representative compiler system 400. Moreover, the components can be distributed on one or more computing devices connected by one or more networks or other suitable communication mediums.

Figure 12A:
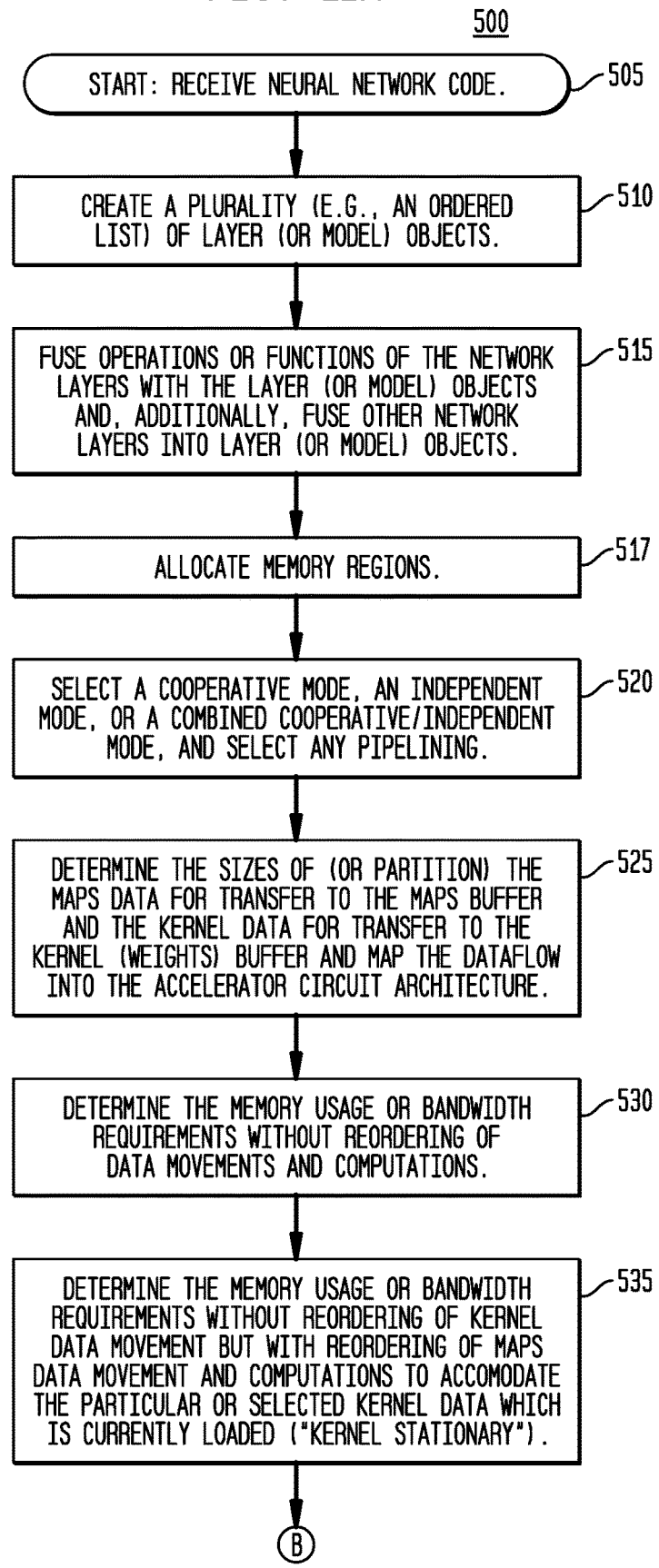
FIGS. 12A, 12B and 12C (collectively referred to as FIG. 12) is a flow chart of a representative embodiment of a compiler or compilation method for compiling code for execution by the inference engine circuit architecture or other accelerator system.
Figure 12B:
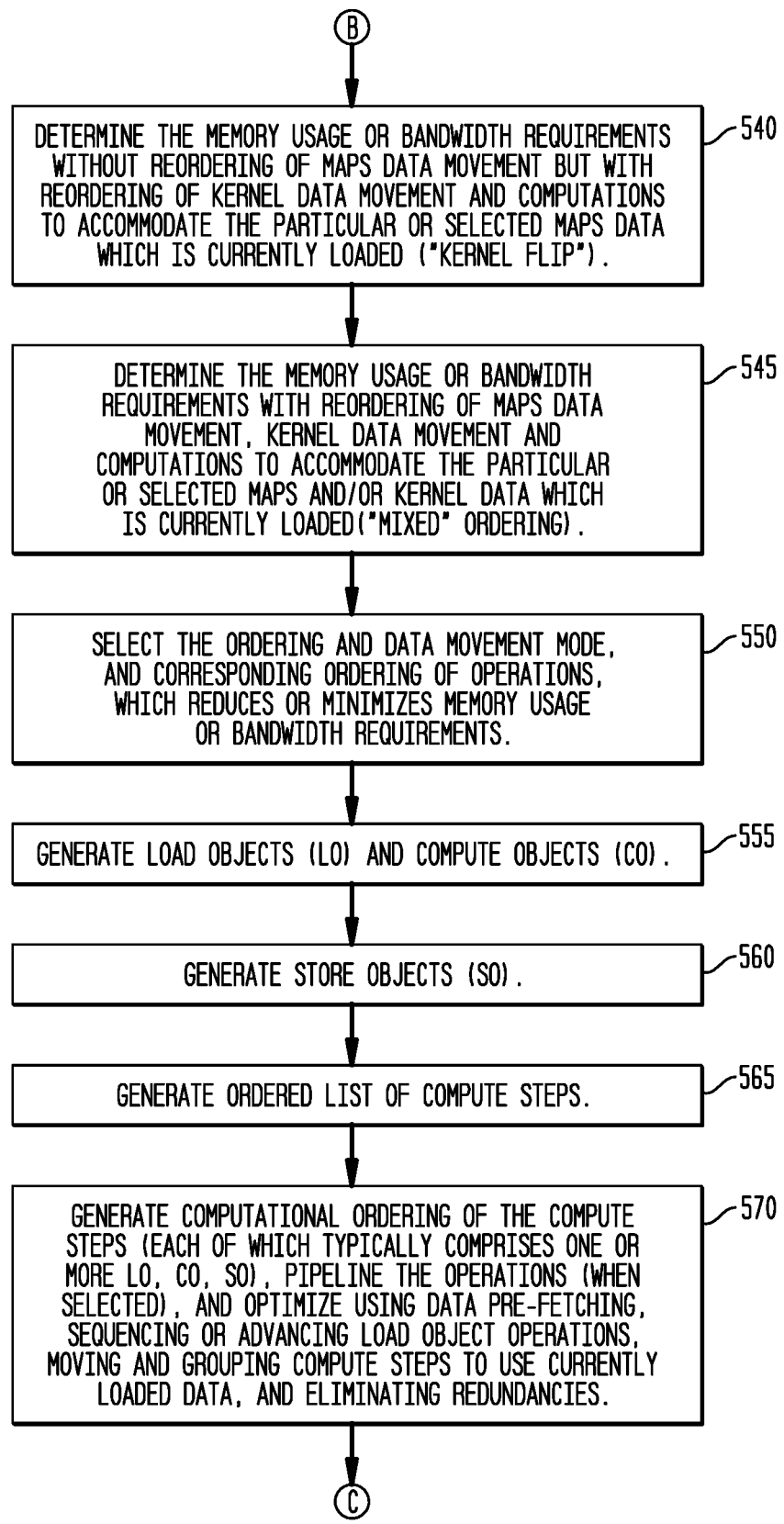
Figure 12C:
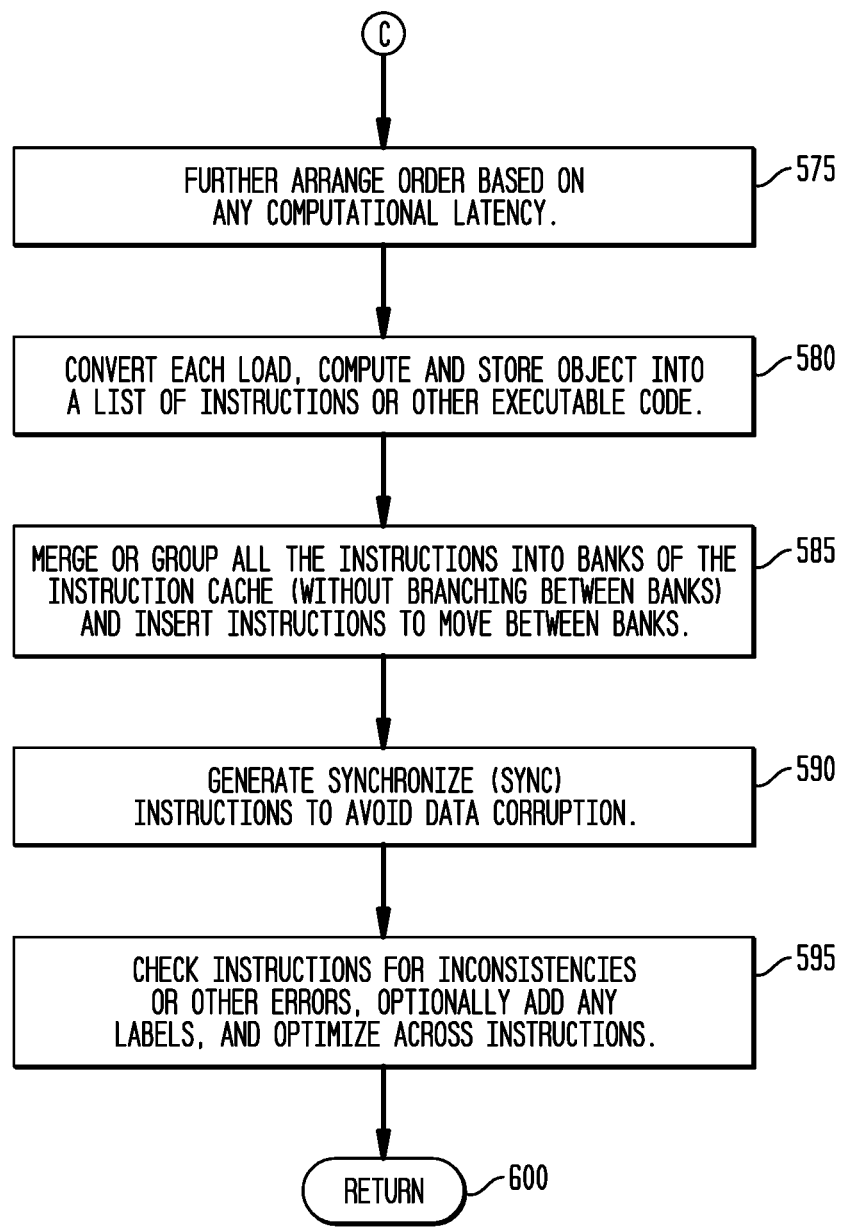

FIG. 12 is a flow chart of a representative embodiment of a compiler or compilation method 500 for compiling code for execution by the inference engine circuit architecture 50 or other accelerator system. The compiler or compilation method 500 is performed by the compiler system 400, and more particularly, by one or more processors 75 of the compiler system 400. It should be noted that the various steps illustrated in FIG. 12 may occur in a wide variety of orders, and all such variations are considered equivalent and within the scope of the disclosure. In addition, many of the various steps illustrated in FIG. 12 may be subdivided into multiple steps, which also may occur in a wide variety of orders, and all such variations are considered equivalent and within the scope of the disclosure.

The compiler or compilation method 500 starts, step 505, with receipt of the neural network code, such as an ONNX file or other file having the neural network code, which is to be converted for acceleration of execution on the inference engine circuit architecture 50 or other accelerator circuit. The first step towards generating code for a custom accelerator is to gather information about the model's architecture. There are various high-level DL being used today, with each representing DNNs differently, and exploiting different optimizations for deploying it on CPU or GPU systems. ONNX is an intermediate exchange format that allows models from different frameworks to be converted into other formats. Adopting ONNX allows users to deploy models that were trained on any DL framework supported by ONNX.

Figure 13:
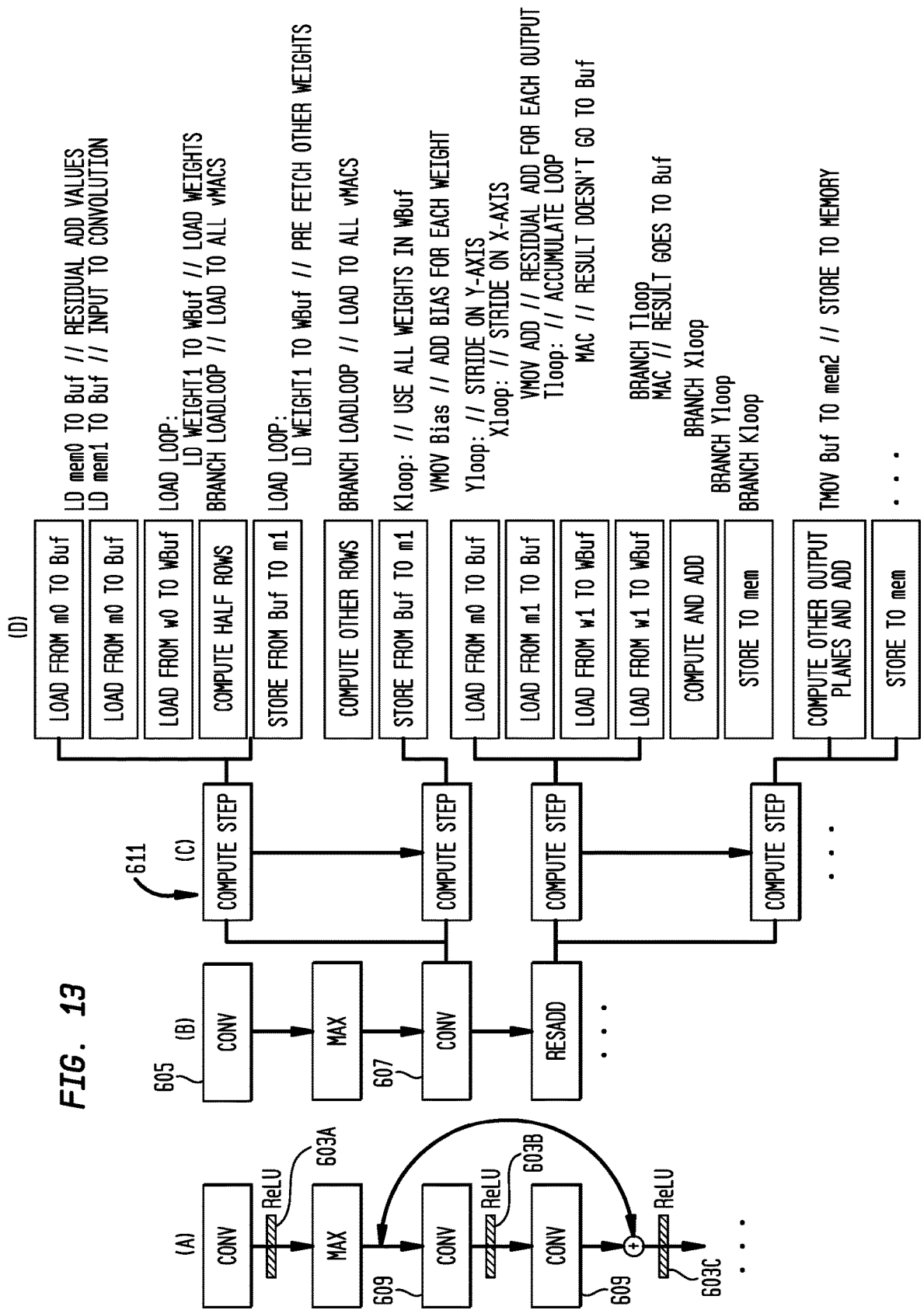
FIG. 13 is an example of instruction generation for a portion of a ResNet model, with (1) illustrating ResNet model layers, (2) illustrating a list of computation layers for an inference engine circuit architecture, (3) illustrating compute steps with load objects (LOs), compute objects (COs), and store objects (SOs), and (4) illustrating representative instructions for an inference engine circuit architecture.

From such an ONNX or other intermediate file, parsing begins, with a plurality (e.g., an ordered list) of layer (or model) objects being created, step 510, by one or more processors 75 of the compiler system 400. For example, Tnets (ThinkNets) can be used to read a model file exported from ONNX. A list of layer (or model) objects is created to represent the layer computation sequence in the hardware accelerator such as the inference engine circuit architecture 50. The layer or model objects contain information needed to generate code. In step 515, operations or functions of the network layers are fused with the layer (or model) objects and, additionally, various network layers may also be fused into layer (or model) objects. For example, the vector add operation present in ResNet models is fused with a convolution layer. Non-linear operations, such as MFM and ReLU, are also merged with convolution layers. An example is shown in FIG. 13, parts (A) and (B), in which ReLUs 603A, 603B, and 603C are merged or fused into convolution layers to form convolution layer (or model) objects (CONV 605, 607), and separate convolution layers 609 (with a ReLU 603B) are merged or fused into a single convolution layer (or model) object (CONV 607).

Main memory 25 shared between a host and the inference engine circuit architecture 50 is managed by software. Memory 25 regions are allocated, step 517, and maps are accessed in a ping-pong fashion. When maps are shared among non-sequential layers, then extra regions are allocated to keep maps for later layers to use. Using two memory regions for sequential layers save main memory space compared to allocating memory for each layer. This is important for embedded systems applications in which main memory is limited. In some models, such as GoogLeNet and ResNet, some layers share their input and output. Those layers are labeled according to their parallel path. Later the labels are translated into memory addresses.

After creating the model list and allocating memory regions, each layer goes through a selection or decision step, step 520, that processes each layer's information and its neighboring layers to decide how to decompose and generate instructions for them, in a cooperative mode, an independent mode, or a combined cooperative/independent mode, as discussed above, and further, allows for user input to select whether operations will be pipelined across the various MV accelerator circuits 115 and/or MM accelerator circuits 100. The choice of which modes (cooperative mode, an independent mode, or a combined cooperative/independent mode, along with a pipelined mode) to use is user selectable and may be defined by the layer parameters, for example and without limitation, and this step is used to generate the various mode control words described above (when the various instructions are generated in step 580, described below). In a pipelined mode, a plurality of MV accelerator circuits 115 and/or MM accelerator circuits 100 are utilized, essentially in a chain one after the other, to perform a series or sequence of computation, generally without the data (e.g., maps data) being stored to the memory circuit 25, but either provided directly to the next MV accelerator circuit 115 and/or MM accelerator circuit 100 or stored in the maps buffer 105. As another variation, the work load may be distributed, such as by having each MV accelerator circuit 115 and/or MM accelerator circuit 100 work on a different portion of an image, for example and without limitation. Also as an example of a mode choice and without limitation, if the kernel size provides enough computational cycles and its channel size is a multiple of 16 then use a cooperative mode, and otherwise use an independent mode, or a combined cooperative/independent mode.

The compilation method 500 will then determine the maps data size for transfer to the maps buffer 105 and the kernel data size for transfer to the kernel (weights) buffer 125, step 525, as discussed in greater detail below, partitioning the input maps data and kernel (weights) data and further mapping the dataflow into the accelerator circuit architecture. Alternatively, this partitioning may be performed after the parsing, also as discussed below.

Figure 15:
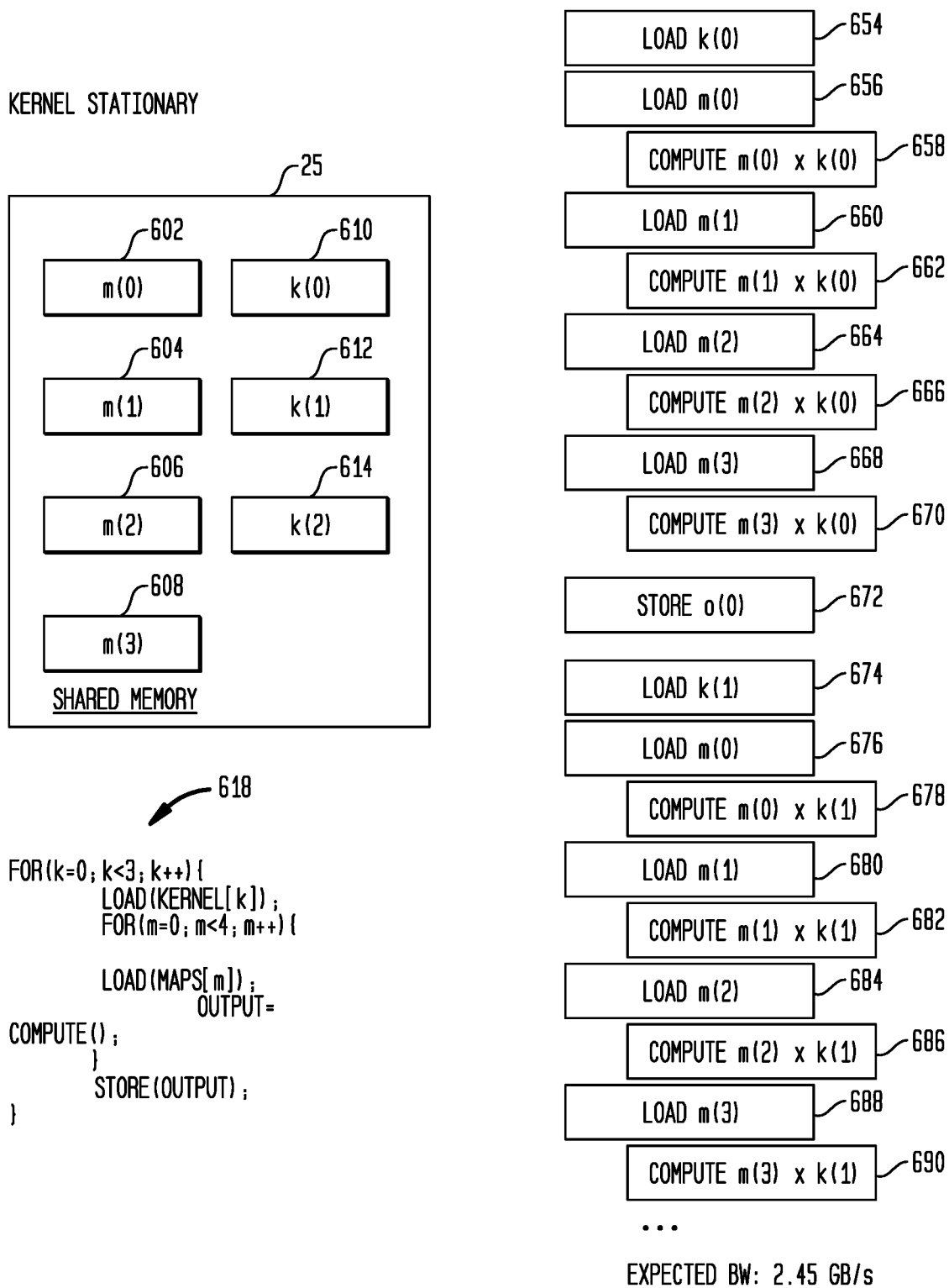
FIG. 15 illustrates a second example of compute steps and memory bandwidth requirements without reordering of kernel data movement but with reordering of maps data movement and computations.
Figure 16:
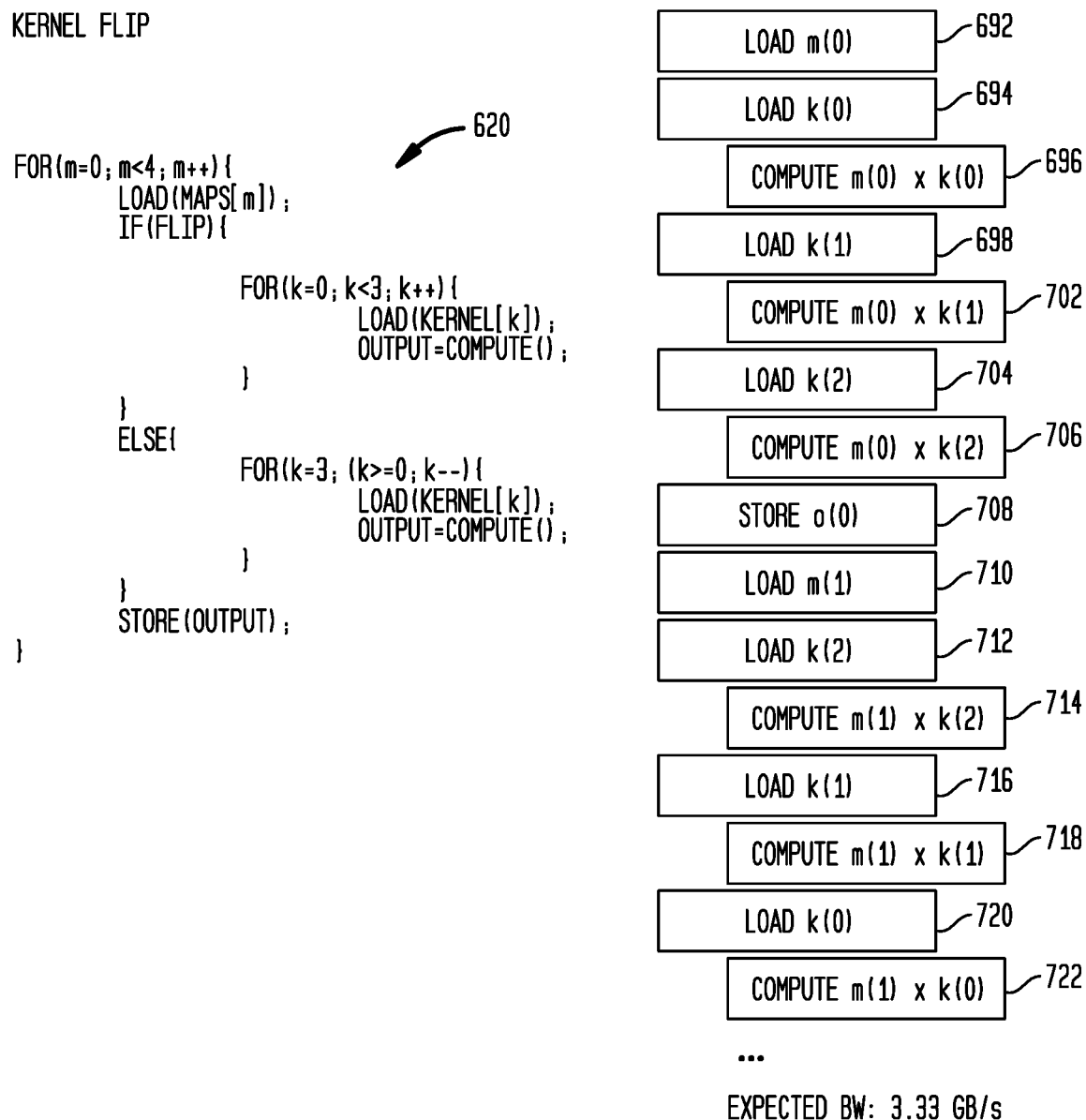
FIG. 16 illustrates a third example of compute steps and memory bandwidth requirements without reordering of maps data movement but with reordering of kernel data movement and computations.
Figure 17:
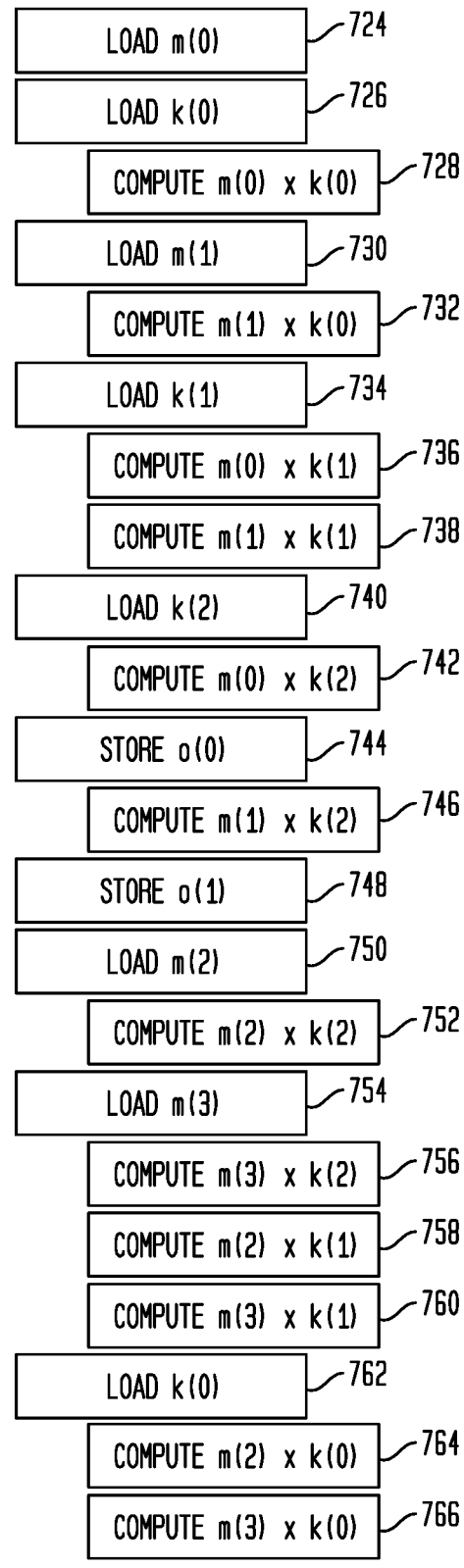
FIG. 17 illustrates a fourth example of compute steps and memory bandwidth requirements with reordering of maps data movement, kernel data movement and computations.

The compilation method 500 will then order the various computations and data transfers, effectively moving the computation to the data, where possible, to reduce or minimize data transfers to and from the memory circuit 25, to optimize memory bandwidth or usage, illustrated as steps 530, 535, 540, and 545. A compute order choice is based primarily on whether to reuse kernel data or reuse maps data, or both. Kernel data and maps data tile sizes are defined by their respective buffer sizes, with the number of tiles needed being the ratio between the total size and the tile size. An estimate of the data to be sent is calculated, and the option that requires the least amount of data transferred is chosen. FIG. 14 illustrates a first example of compute steps and memory 25 usage or bandwidth requirements without reordering of data movements and computations. FIG. 15 illustrates a second example of compute steps and memory 25 usage or bandwidth requirements without reordering of kernel data movement but with reordering of maps data movement and computations. FIG. 16 illustrates a third example of compute steps and memory 25 usage or bandwidth requirements without reordering of maps data movement but with reordering of kernel data movement and computations. FIG. 17 illustrates a fourth example of compute steps and memory 25 usage or bandwidth requirements with reordering of maps data movement, kernel data movement and computations. FIGS. 14 and 15 illustrate maps data m(0) 602, maps data m(1) 604, maps data m(2) 606, and maps data m(3) 608, and kernel data k(0) 610, kernel data k(1) 612, and kernel data (k2) 614 stored in memory circuit 25, which are to be transferred from the memory circuit 25 to the inference engine circuit architecture 50 to perform the computation, with instructions 616, 618, 620, 622 for representative computations also illustrated in FIGS. 14-17. The data movement and computation steps are illustrated as objects, such as "load m(0)" (a load object) and compute m(0)×k(0) (a compute object), for example and without limitation, and serve to illustrate differences in memory 25 bandwidth requirements with and without certain kinds of reordering of data movement and computations.

The compilation method 500 will first determine the memory 25 usage or bandwidth requirements without reordering of data movements and computations, step 530, e.g., a "naïve" ordering based upon the list of layer or model objects previously created in step 510, such as illustrated in FIG. 14. As illustrated in FIG. 14, maps data m(0) has been loaded and remains stationary (i.e., remains loaded) for a predetermined number of computations (load m(0) 624), followed by a loading of kernel data (load k(0) 626) and a computation of m(0)×k(0) 628, followed by a loading of kernel data (load k(1) 630) and a computation of m(0)×k(1) 632, followed by a loading of kernel data (load k(2) 634) and a computation of m(0)×k(2) 636, storing the output o(0) (store o(0) 638), then loading the next maps data m(1) (load m(1) 640) which remains stationary (i.e., remains loaded) for a predetermined number of computations, followed by a repeated loading of kernel data (load k(0) 642) and a computation of m(1)×k(0) 644, followed by a repeated loading of kernel data (load k(1) 646) and a computation of m(1)×k(1) 648, followed by a repeated loading of kernel data (load k(2) 650) and a computation of m(1)×k(2) 652, for an estimated usage or bandwidth of 6.34 GB/s in this example.

The compilation method 500 will then determine the memory 25 usage or bandwidth requirements without reordering of kernel data movement but with reordering of maps data movement and computations to accommodate the particular or selected kernel data which is currently loaded and does not need to be reloaded, step 535, e.g., a "kernel stationary" ordering such as illustrated in FIG. 15. As illustrated in FIG. 15, kernel data k(0) has been loaded and remains stationary (i.e., remains loaded) for a predetermined number of computations (load k(0) 654), followed by successive loading of maps data and computations of m(0)×k(0), m(1)×k(0), m(2)×k(0), m(3)×k(0), illustrated as a loading of maps data m(0) (load m(0) 656) and a computation of m(0)×k(0) 658, followed by a loading of maps data m(1) (load m(1) 660) and a computation of m(1)×k(0) 662, followed by a loading of maps data m(2) (load m(2) 664) and a computation of m(2)×k(0) 666, followed by a loading of maps data m(3) (load m(3) 668) and a computation of m(3)×k(0) 670, then storing the output o(0) (store o(0) 672), loading the next kernel data k(1) (load k(1) 674) which remains stationary (i.e., remains loaded) for a predetermined number of computations, followed by successive loading of maps data and computations of m(0)×k(1), m(1)×k(1), m(2)×k(1), m(3)×k(1), illustrated as a repeated loading of maps data m(0) (load m(0) 676) and a computation of m(0)×k(1) 678, followed by a repeated loading of maps data m(1) (load m(1) 680) and a computation of m(1)×k(1) 682, followed by a repeated loading of maps data m(2) (load m(2) 684) and a computation of m(2)×k(1) 686, followed by a repeated loading of maps data m(3) (load m(3) 688) and a computation of m(3)×k(1) 690, for an estimated usage or bandwidth of 2.45 GB/s in this example.

In comparison with the "naïve" ordering, this reordering in which the kernel data remains loaded or stationary, with a reordering of maps data movement and corresponding computations to accommodate the particular or selected kernel data which is currently loaded and does not need to be reloaded, has resulted in appreciable improvement in memory bandwidth requirements, reducing the estimated bandwidth from 6.34 GB/s to 2.45 GB/s in these examples.

The compilation method 500 will then determine the memory 25 usage or bandwidth requirements without reordering of maps data movement but with reordering of kernel data movement and computations to accommodate the particular or selected maps data which is currently loaded and does not need to be reloaded, step 540, e.g., a "kernel flip" ordering such as illustrated in FIG. 16. As illustrated in FIG. 16, maps data m(0) has been loaded and remains stationary (i.e., remains loaded) for a predetermined number of computations (load m(0) 692), followed by successive loading of kernel data and computations of m(0)×k(0), m(0)×k(1), m(0)×k(2), illustrated as a loading of kernel data (load k(0) 694) and a computation of m(0)×k(0) 696, followed by a loading of kernel data (load k(1) 698) and a computation of m(0)×k(1) 702, followed by a loading of kernel data (load k(2) 704) and a computation of m(0)×k(2) 706, storing the output o(0) (store o(0) 708), then loading the next maps data m(1) (load m(1) 710) which remains stationary (i.e., remains loaded) for a predetermined number of computations, followed by successive loading of kernel data in the reverse order (k(2) followed by k(1) followed by k(0) and computations of m(1)×k(2), m(1)×k(1), m(1)×k(0), illustrated as a repeated loading of kernel data (load k(2) 712) and a computation of m(1)×k(2) 714, followed by a repeated loading of kernel data (load k(1) 716) and a computation of m(1)×k(1) 718, followed by a repeated loading of kernel data (load k(0) 720) and a computation of m(1)×k(0) 722, for an estimated bandwidth of 3.33 GB/s in this example. It should be noted, however, that as discussed in greater detail below, from the first k(2) computation, the k(2) data has already been loaded (load k(2) 704) and remains in the kernel (weights) buffer 125, as does the k(1) data (load k(1)

698) when double-buffering is implemented, such that the second load k(2) and load k(1) steps (load k(2) 712 and load k(1) 716) may be eliminated, further saving memory 25 usage or bandwidth.

In comparison with the "naïve" ordering, this reordering in which the maps data remains loaded or stationary, with a reordering of kernel data movement and corresponding computations to accommodate the particular or selected maps data which is currently loaded and does not need to be reloaded, has resulted in appreciable improvement in memory bandwidth requirements, reducing the estimated bandwidth from 6.34 GB/s to 3.33 GB/s in these examples, with additional memory 25 bandwidth savings occurring from the elimination of redundant kernel loading steps, as the currently loaded kernel data may be reused for the next several computations following the loading of the next maps data.

The compilation method 500 will then determine the memory 25 usage or bandwidth requirements with reordering of maps data movement, kernel data movement and computations to accommodate the particular or selected maps and/or kernel data which is currently loaded and does not need to be reloaded, step 545, e.g., a "mixed" ordering such as illustrated in FIG. 17. As illustrated in FIG. 17, maps data m(0) has been loaded and remains stationary (i.e., remains loaded) for a predetermined number of computations (load m(0) 724), followed by successive loading of kernel and maps data and computations of m(0)×k(0), m(1)× k(0), m(0)×k(1), m(1)×k(1), illustrated as a loading of kernel data (load k(0) 726) and a computation of m(0)×k(0) 728, followed by a loading of maps data (load m(1) 730) and a computation of m(1)×k(0) 732, followed by a loading of kernel data (load k(1) 734) and two successive computations, a computation of m(0)×k(1) 736 and a computation of m(1)×k(1) 738, followed by a loading of kernel data (load k(2) 740) and a computation of m(0)×k(2) 742, storing a first output o(0) (store o(0) 744), followed by a computation of m(1)×k(2) 746 and storing a second output o(1) (store o(1) 748), then loading the next maps data m(2) (load m(2) 750) which remains stationary (i.e., remains loaded) for a predetermined number of computations, followed by a computation of m(2)×k(2) 752 (without reloading of any kernel data), followed by loading of the next maps data m(3) (load m(3) 754) which remains stationary (i.e., remains loaded) for a predetermined number of computations, followed by three successive computations, a computation of m(3)×k(2) 756, a computation of m(2)×k(1) 758 and a computation of m(3)×k(1) 760, a repeated loading of kernel data k(0) (load k(0) 762) followed by computation of both m(2)×k(0) 764 and m(3)×k(0) 766, and so on, for an estimated usage or bandwidth of 2.38 GB/s in this example. It also should be noted that additional or repeated loading steps have been eliminated when double-buffering is implemented.

It should be noted that one of the advantages of the representative compilation method 500 is that it also provides for storage of intermediate results, typically in the maps buffer 105, which further improves performance by decreasing usage of the memory circuit 25 (decreases memory bandwidth requirements). This is illustrated with the storing a first output o(0) (store o(0) 744) and storing a second output o(1) (store o(1) 748) in FIG. 17.

In comparison with the previously illustrated orderings, this reordering of maps data movement, kernel data movement and computations to accommodate the particular or selected maps and/or kernel data which is currently loaded and does not need to be reloaded, has resulted in appreciable improvement in memory 25 usage or bandwidth requirements, reducing the estimated bandwidth from 6.34 GB/s to 2.38 GB/s in these examples, with additional memory 25 bandwidth savings occurring from the elimination of redundant kernel and maps loading steps, as the currently loaded kernel and maps data may be reused for the next several computations following the loading of the next maps or kernel data, for example and without limitation.

Essentially, the compilation method 500 has moved the computation to the currently loaded or available data, for both kernel data and maps data, rather than the more traditional movement of the data to the computation. This may also involve or result in network layer fusion as well, as various computations of different layers may be utilizing some of the same maps or kernel data as previous layers, and those computations from one layer may be moved or fused into another layer, such as a previous layer. For example, in FIG. 18, the loading of the next maps data m(3) (load m(3) 754), followed by three successive computations, a computation of m(3)×k(2) 756, a computation of m(2)×k(1) 758 and a computation of m(3)×k(1) 760, may be the result of a layer fusion in which the kernel data (here, k(1) and k(2) are held in place in the kernel (weights) buffer 125 and reused, bringing these three computations to this static kernel data, rather than leaving the three computations in their own subsequent layer and reloading this kernel data (i.e., moving the data to the computation) in that subsequent layer.

For example, accelerators may be limited mostly by their off-chip memory bandwidth. The required bandwidth for a layer is a ratio between total amount of data transferred by the expected execution time. Loop rearrangement is a method that reduces the total amount of data movement by exploiting data reuse, which leads to memory bandwidth savings. Some CONV layers have large kernels, whereas others have large maps, but usually neither completely fits into the kernel (weights) buffer 125 and/or maps buffer 105. Maps and kernels need to be partitioned and processed in buffer-sized tiles. A map tile needs to go through each kernel tile, leading to repeated kernel loads when the next map tile is loaded. Alternatively, a kernel tile needs to be processed with every map tile, resulting in repeated map loads for the following kernel tile. The total amount of data moved is different depending on kernel/map load repetition for a particular CONV layer. An advantage of the representative compiler 400, 500 is that the compiler 400, 500 estimates the amount of data to be transferred for both configurations and chooses the one that sends less data.

Following these memory circuit 25 usage or bandwidth estimation steps, the compilation method 500 then selects the ordering and data movement mode, and corresponding ordering of operations, which reduces or minimizes memory 25 usage or bandwidth requirements, step 550, and the parsing portion of the compilation method is completed.

After the model parsing task completes, if not previously performed in step 525, the compilation method 500 partitions the input maps data and kernel (weights) data and further maps the dataflow into the hardware's architecture. The inference engine circuit architecture 50 and other DNN accelerators are composed of an on-chip memory buffer (kernel (weights) buffer 125 and maps buffer 105) to store data, a group of processing elements such as MM accelerator circuits 100, and a control core 275 of a MM processor circuit 200. This leads to three main operations: load, compute and store. In the compilation method 500, a sequence of load, compute and store is grouped into a compute step. Each step consumes part of the layer's input and produces part of the layer's output. The compilation method 500 creates a list of compute steps based on the layer parameters.

The limits imposed by buffer size and layer parameters are first calculated (step 525) before creating the compute list. Based on these limits, load objects ("LO") are created such that a balance between input data and output data coexists in the same buffer. LO sends data from external memory 25 into the maps buffer 105 and kernel (weights) buffer 125. As the inference engine circuit architecture 50 has separate buffers for weights (kernel (weights) buffer 125), the compilation method 500 aggregates as many weights as possible that fit in kernel (weights) buffer 125. Double buffering is accounted for during LO creation, such that a compute step will pre-fetch data for the following compute step, eliminating latency and maximizing available memory 25 bandwidth. After LO creation, compute objects (CO) are generated based on the data available in the maps buffer 105 and the kernel (weights) buffer 125. Accordingly, in step 555, load objects and compute objects are generated (which will be further ordered based on data pre-fetching, in addition to ordering based on the data movement and memory bandwidth optimization previously discussed).

For a CONV, the minimum input necessary to produce an output is $k_x \times k_y \times k_p$. Maps data is arranged with planes first, column and row last (p,x,y). To ensure data is contiguous and to avoid issuing multiple LOAD (LD) instructions, $i_x \times k_y \times k_p$ is needed to create one output row. The division order is rows first, columns and planes last and a greedy approach tries to create as many output rows it can. If input rows and output row doesn't fit into the maps buffer 105, then other strategies are used. The input rows are divided into parts, which requires multiple LOAD (LD) instructions to put the maps data into the maps buffer 105. In a cooperative mode, parts of the output row can be sent to different maps buffers 105 of different MM accelerator circuits 100 and/or MV accelerator circuits 115, which requires multiple TMOV instructions. Another approach is to divide the planes into parts and the MM accelerator circuits 100 and/or MV accelerator circuits 115 would create partial results in a compute step. In ResNet models, it is common to have a CONV followed by an ADD. In this case, the maps buffer 105 will contain the CONV's input, output and the ADD's input, and allows for layer fusion. This fused layer CONV+ADD needs to have both its inputs in different maps buffer 105 regions so that both inputs can be accessed simultaneously.

CO contains information about the vector compute operations necessary for producing a number of output values. This encompasses up to three loops: stride on y-axis, x-axis and accumulate. The accumulate loop issues multiple instructions that accumulate the results before producing an output pixel. This is because not all data needed to produce an output value is contiguous. CO will be translated into nested loops of vector instructions to perform multiply and accumulate or compare. The loop boundaries are a repeat variable and the data access address is incremented by an offset variable. CO also has an extension with variables for vector register load, which implements residual add and bias addition.

There are three types of CO: MAC, MAX and COPY. MAC CO generates instructions to multiple and accumulate values from maps buffer 105 and kernel (weights) buffer 125, and it conditionally creates VMOV instructions. MAX CO generates instructions to compare values in maps buffer 105. COPY uses self-comparison (MAX instructions) to copy maps buffer 105 values to a different location in maps buffer 105.

In step 560, store objects (SO) are created to return the output in maps buffer 105 to external memory 25, so that the processor 75 can access the results, and a list of compute steps is generated, step 565. Compute step creation is shown in FIG. 13, part (C), as compute steps 611. In the example, assume input data to CONV is in m0, which is also the input to a residual add in a following RESADD layer; m1 is another memory location that has the output of the previous CONV and it is the input of the CONV part of the RESADD; w0 and w1 are other kernel (weights) buffer 125 locations for weights. Precise address offsets were omitted in FIG. 13.

Every CO uses data from a LO or previous CO and creates data for a SO or for a following CO. The list of compute steps (611) needs to guarantee that all LOs needed by a CO happened before it. All results of a CO are stored with a following SO or consumed by another CO. Following these rules, in step 570, the compilation method 500 provides computational ordering of the compute steps (each of which typically comprises one or more LO, CO, SO, as illustrated in part (C) of FIG. 13), pipelining of the operations across the MV accelerator circuits 115 and/or MM accelerator circuits 100 (when selected as a parameter by a user), and optimizes across all compute steps using data pre-fetching, sequencing or advancing load object operations, moving and grouping compute steps to use currently loaded data, and eliminating redundancies. For example, LO to different maps buffer 105 or kernel (weights) buffer 125 regions are moved to a previous compute step to allow data pre-fetching. A LO in the next layer is moved to a previous layer if that doesn't create any true data dependency, providing additional layer fusion. Compute steps with LOs accessing the same data are grouped together in a sequence to improve data reuse. This may cause some of the LOs to become redundant, which can be eliminated as previously discussed. LOs that loads data that are already present in maps buffer 105 or kernel (weights) buffer 125 or LOs that are not used by any CO are removed. LOs with same address offset are merged into one LO with a loop variable.

The computational ordering (LO, CO, SO) also accounts for computational latency, step 575, adjusting the ordering as may be necessary or desirable. For example, a step having a certain computational latency may be moved to earlier in a sequence of operations to avoid stalling the MV accelerator circuits 115 while waiting on data from such a computation.

Figure 18:
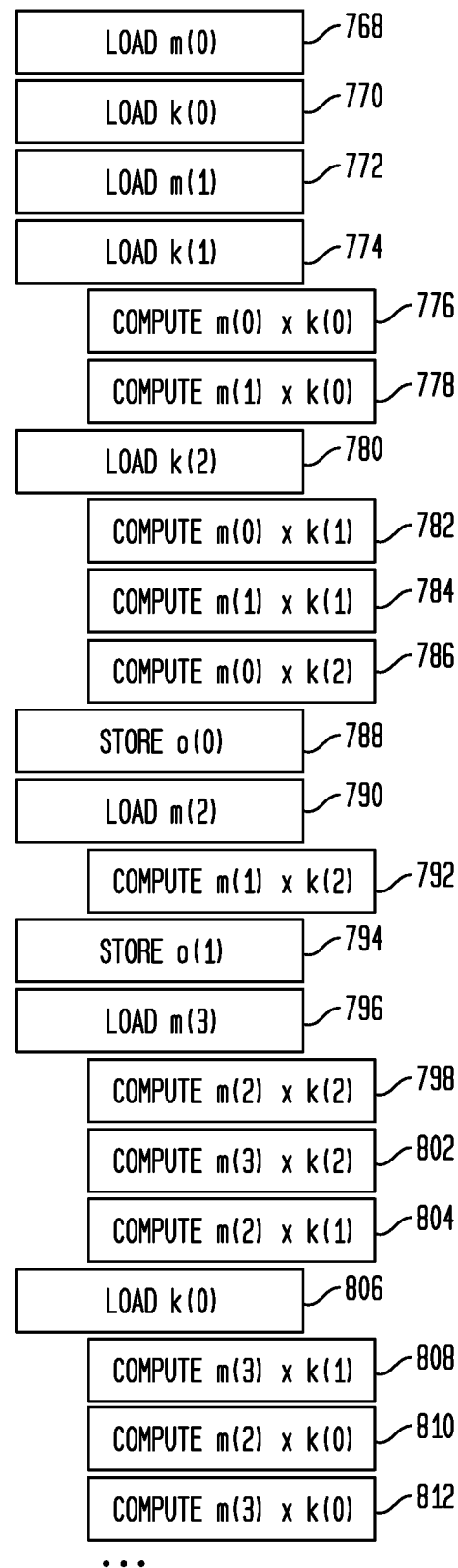
FIG. 18 illustrates a fifth example of reordering of maps data movement, kernel data movement and computations with data pre-fetching.

FIG. 18 illustrates a fifth example of reordering of maps data movement, kernel data movement and computations with data pre-fetching (and other optimizations, such as with redundancies having been removed). In this fifth example, the compilation method 500 has reordered the maps data movement, kernel data movement and computations of the fourth example illustrated in FIG. 17, using pre-fetching of maps and kernel data in advance of their use in computations. As illustrated in FIG. 18, prior to any computations, maps data m(0) has been loaded (load m(0) 768), kernel data has been loaded (load k(0) 770), maps data has been loaded (load m(1) 772), and kernel data has been loaded (load k(1) 774), each of which remains stationary (i.e., remains loaded) for a predetermined number of computations. This is followed by successive computations of m(0)×k(0) 776 and m(1)×k(0) 778, loading of kernel data (load k(2) 780) as a pre-fetching step, followed by successive computations of m(0)×k(1) 782, m(1)×k(1) 784 and m(0)×k(2) 786 (with kernel data k(2) having been pre-fetched), storing a first output o(0) (store o(0) 788), followed by loading of maps data (load m(2) 790) as a pre-fetching step, computation of m(1)×k(2) 792 and storing a second output o(1) (store o(1) 794), loading of maps data (load m(3) 796) as a pre-fetching step, followed by three successive computations, a computation of m(2)×k(2) 798 (with maps data m(2) having been pre-fetched), a computation of m(3)×k(2) 802 (with maps data m(3) having been pre-fetched), and a computation of m(2)×k(1) 804, followed by a repeated loading of kernel data (load k(0) 806) as a pre-fetching step, and followed by three successive computations, a computation of m(3)×k(1) 808, a computation of m(2)×k(0) 810 (with kernel data k(0) having been pre-fetched), and a computation of m(3)×k(0) 812, and so on. It also should be noted that additional or repeated loading steps have been eliminated when double-buffering is implemented.

Once a list of compute steps is created, ordered and pipelined, a code generation phase converts each load, compute and store object into a list of instructions or other executable code for the inference engine circuit architecture 50 or other accelerator, step 580. Most of the computational structure was developed as a result from compute step creation and the ordering previously discussed. This code generation phase provides for instruction level optimizations, such as register assignment, branch delay slot filling, loop creation and unrolling. Each object (LO, CO, SO) has a corresponding function that creates corresponding instructions or other executable code. An example of generation of instructions or other executable code for a compute step is shown in part (D) of FIG. 13.

In a representative embodiment, instructions are grouped into basic blocks ("BB"). A list of BB is created per MM accelerator circuit 100. Each BB runs in sequence; thus the destination of any control flow instruction cannot be at any other BB. This way makes scanning instructions for potential optimizations and error checking bounded within a BB, rather than all or a fixed number of instructions.

In a representative embodiment, instruction cache 244 is separated into two banks of 512 instructions. For each bank a load is needed to load instructions to other bank. In step 585, the compiler 400, 500 compiler merges BBs together to form instruction banks (groups of 512 instructions), i.e., merges or groups all the instructions into these banks (e.g., sections of 512), while ensuring that there is not a branch from one instruction bank to another. Some instructions that are not in a loop or if else condition from the following BB are moved to the instruction bank to so that the instruction cache 244 is better utilized. Absence of branches across instruction banks is ensured by the BBs. As part of step 585, as an option, at the beginning of each instruction bank, a load for the following bank is inserted, and at the end, a jump to a next bank is inserted, to align the section of useful instructions to 512 and to provide for movement to a next instruction bank.

In MAC CO, the accumulate loop issues multiple instructions that accumulate the results before producing an output pixel. This is because not all data needed to produce an output value is contiguous. In the case of a CONV with kx and ky equal to three, three MAC instructions with three different addresses in the maps buffer 105 and kernel (weights) buffer 125 is needed. CO creates the accumulate loop that issues a MAC and increment each address by a constant. MAC CO code generation function unrolls the accumulate loops if they are small enough. They also add VMOVs in case of CONV+ADD. If two consecutive output values need to be compared like in CONV+MFM layers in LightCNN, then two sets of MAC instructions are created in sequence. Loop over all kernels in kernel (weights) buffer 125, y-loop and x-loop are conditionally created, as part of this code generation. MAX CO and COPY CO also creates those loops if needed.

In step 590 of the compilation method, SO conditionally creates synchronize ("sync") instructions to avoid data corruption. Load, vector compute and store instructions have variable latency and can be issued in parallel. In cases when there is a latency mismatch, a sync instruction is needed to avoid vector data hazards. The inference engine 50 has multiple compute clusters, each with an independent control core 275, maps buffer 105 and kernel (weights) buffer 125. In a representative embodiment, a single sync instruction can be used to synchronize all execution across the MV accelerator circuits 115 and/or MM accelerator circuits 100. For example, if a MV accelerator circuit 115 and/or MM accelerator circuit 100 finishes producing half of the outputs in a CONV, it will wait at the sync instruction for the other MV accelerator circuits 115 and/or MM accelerator circuits 100 to also react a barrier and complete the CONV layer before going to a second layer. In a representative embodiment, another alternative within the scope of the disclosure is to send different inputs for all MV accelerator circuits 115 and/or MM accelerator circuits 100 in which barrier is not needed.

As instructions are created, they are checked for inconsistencies or other errors, step 595, such as inconsistencies in their arguments, such as an immediate being above a certain number of bits, the register value has overflown, special registers can only be used with some instructions, etc. As part of step 595 (or as a separate step), as an option, instructions are also labeled to determine some properties of the instruction, such as whether they cause write after write ("WAW") or read after write ("RAW") on the scalar registers, they are in a branch delay slot, they are redundant, they are in nested loops or they have an immediate that will be modified (e.g., for address reallocation).

As part of step 595 (or as a separate step), as an option, after a BB creation is finished, instruction optimizations are applied to the BB.

For example, tensor or vector instructions (MAC/MAX) take variable amounts of cycles to produce a result. Within these cycles, there are other operations occurring, such as loop control, conditional branches, buffer address increments and load instructions, for example and without limitation. If those operations were to take more cycles on average than such MAC/MAX latency, then the MV accelerator circuits 115 and/or MM accelerator circuits 100 could stall.

As another example, read after write (RAW) may occur when an instruction reads from a register that was just written to in less than predetermined number of cycles, such as a 4 cycle gap. In case of RAW, the instruction will stall up to 4 cycles to get access to the required register. FIG. 19 illustrates an example of optimization or transformation of instructions or other executable code to account for execution latencies. A common situation is shown in FIG. 19, where some instructions set some registers to have the maps buffer 105 and kernel (weights) buffer 125 addresses for a MAC/MAX. To avoid RAW between the registers sets and the MAC/MAX instructions, some instructions for setting addresses are grouped together, using different registers, such that the following set of MAC/MAX instructions will not be stalled due to RAW. Also as illustrated in FIG. 19, pre-loading of addresses into different registers solves this issue, provided there are enough registers. This instruction level transformation is useful for CONV/TCONV with a comparatively small kernel size, which has low MAC latency, or max-pool layers. For example, second AlexNet's max-pool layer reduced the execution time from 0.53 to 0.31 ms. and TCONV with 3×3 kernel, 2×2 stride, 32×32×64 input, op=64 reduced the execution time from 2.202 to 1.498 ms.

An array determines whether a register is currently available, and this further determines if instructions can or cannot use a particular register at that time. It also determines how far an instruction can be moved without affecting other instructions. Redundant instructions or dead code are eliminated. Branch delay slot filling follows are a similar approach to RAW, in which potential independent scalar instructions inside a loop are moved into an empty delay slot.

Following the error checking an optimizations of the instructions or other executable code in step 595, the compilation method 500 may end, return step 600. FIG. 20 illustrates an example of instructions or other executable code.

After code generation, weights data is arranged to make kernel loads contiguous. For example, in independent mode, each MAC 190 processes a different kernel, so each kernel (weights) buffer 125 of each MV accelerator circuit 115 and/or VV accelerator circuit 150 may have a group of 16 kernels, for example and without limitation. Each MV accelerator circuit 115 and/or MM accelerator circuit 100 has a group of 64 kernels, assuming kernel loads are in broadcast mode. If two groups of kernels fit in the kernel (weights) buffer 125, then kernel 0 to 15 and 64 to 79 are arranged in sequence so that one load is needed. Bias values are attached in beginning of each kernel.

The memory circuit 25 contains all the data needed for execution. The memory layout reserves memory locations for temporary, intermediate results for layers, input, output, weights and instructions. The inference engine circuit architecture 50 accesses those locations to run. Memory layout, arranged weight data and instructions are saved in a file, which can be read by a decoding program to bypass recompilation of the same DNN model. Instructions that access memory 25 are labeled in code generation phase, and a reallocation table is created and saved.

It is possible to instantiate the inference engine circuit architecture 50 on different FPGA cards with one host processor 75. In this case, a separate inference engine circuit architecture 50 object is created for each FPGA card. Different FPGAs can run different models or different inputs.

The inference engine circuit architecture 50 may provide some configuration registers that enable an initial load instruction to populate the instruction cache 244 with the first set of instructions. Another register can be used to count the amounts of data sent to and received from memory 25. Software can be used to poll the output counter register to check whether processing has finished or not.

Additional variations for the compiler system 400 and compilation method 500 are also available and may be included, as one or more options. A "quantize mode" is an optional variation or addition to the compilation method 500 and may be performed by the compiler system 400. Data values in neural network models are typically quantized into fixed point representations to save or decrease the number of bytes transferred. The location of the fixed point is chosen ahead-of-time by the compiler. The fixed point location can be different for each layer in the model or different sections of the model to reduce degradation of accuracy due to floating to fixed point quantization. The compiler system 400 chooses the fixed point for weight values based on its distribution.

The compiler system 400 uses one or more inputs of the model to choose the fixed point for input and output of each layer. Each layer output's fixed point location should match the following layer input's fixed point location. For each input, the compiler system 400 executes the model in floating point using the CPU, and keeps track of the best fixed point location for each layer. After reaching a stable point, the compiler system 400 saves the fixed point configuration of each layer to be used in the future executions of that model.

As an option, a quantize mode can be included in which the compiler system 400 uses some real inputs and measures the scale of the output of each layer in floating point mode. In this way the compiler system 400 can choose the right scale to use for each layer, enabling different quantization types for different layers (e.g., block floating point, where each layer is considered a block and has fixed point for that layer).

The compiler system 400 may also implemented various different strategies to do the same job. For example, one choice that the compiler system 400 performs is the order in which loops are done, such as, for example: (1) loading a partition of the map data and then looping through different kernels to get the different outputs planes, i.e., the outer loop is the maps partitioning, the inner loop is the kernels partitioning (first original implementation); or (2) keeping the kernels in memory and looping through different maps partitions to get the different output parts for the same output planes, i.e., the outer loop is kernel partitioning, the inner loop is maps partitioning (kernel stationary mode). This choice can be done by an approximate calculation that calculates the amount of data for loading maps partitions from memory 25 and kernels partitions from memory 25 and choosing the strategy that loads less data and is then in theory faster. As another option, the compiler system 400 can split the network in different layers and benchmark each layer with the two different strategies, and use the measured fastest choice for each layer, separately or independently of another layer.

The compilation method 500 may include an optimizer loop to search which compilation options may be the best given the run-time profiling. The compilation method 500 can run each layer in a model separately or the entire model with a compilation option. It will store run-time measurements of that execution with the compilation options that are being evaluated. The compiler system 400 (compilation method 500) then stores the options that gave the best results and applies them in future neural network executions.

In kernel stationary mode, the output planes may need to be contiguous in memory, so with the kernel loop being the outer loop, and the output being stored in blocks, each outer loop iteration will store its output, which will be in output planes blocks. So the output organization will be organized as [output planes blocks] [height] [width] [planes inside planes block] or alternatively also [height] [output planes blocks] [width] [planes inside planes block]. This should be reordered correctly as [height] [width] [planes]. This can done with an additional, separate layer. Additional strategies that can be included, as options, are:

(1) Saving directly as [height] [width] [planes] by performing a strided saving to memory 25 (instead of saving the entire generated block as is, it is divided into parts and the parts are scattered in memory 25 as required). This can be done when the parts, i.e., the number of output planes in each block is a multiple of 64, with this being the minimum memory granularity.

(2) Saving directly as [height] [width] [planes] by rearranging data correctly in the MM accelerator circuit 100 buffers before storing. This requires loading an entire output row, filling the missing planes and storing that row back to memory, essentially interleaving the additional (rearranging) layer work with the calculations.

A "progressive mode" may also be implemented as a variation of the "mixed mode" discussed above, in which either maps or kernel data may be maintained in their respective buffers 105, 125 while the kernel or maps data may be loaded or reloaded, and which may be explained by an example. Suppose we have 6 input rows with 3 rows kernel, which will produce 4 output rows. One way to do this is:

Load rows 1-3 in bank 1;
Load rows 2-4 in bank 2;
Process bank 1 and output row 1;
Load rows 3-5 in bank 1;
Process bank 2 and output row 2;
Load rows 4-6 in bank 2;
Process bank 1 and output row 3;
Process bank 2 and output row 4.

In a "progressive mode", processing may instead be ordered as:

Load rows 1-3 in positions 1-3;
Load row 4 in position 4;
Process rows 1-3 (positions 1-3) and output row 1;
Load row 5 in position 1;
Process rows 2-4 (positions 2-4) and output row 2;
Load row 6 in position 2;
Process rows 3-5 (positions 3, 4, 1) and output row 3;
Process rows 4-6 (positions 4, 1, 2) and output row 4.

In case of kernel stationary mode, where this loop will need to be repeated for different kernels, for the next kernel it will not restart from the beginning, but will start from the end in order not to reload something that is already in memory, so even kernel iterations will start outputting the first row, odd kernel iterations will start outputting the last row, for example. In this progressive mode variation of the mixed mode, the data may be split or divided in a more fine-grained approach into rows in the maps buffer 105 or the kernel buffer 125, and new rows of data may be loaded in the maps buffer 105 or the kernel buffer 125 while the MAC circuits 190 are executing using other rows of data, i.e., comparatively smaller blocks of data are being utilized and transferred, as a single row of data, rather than multiple rows, of the respective maps buffer 105 or the kernel buffer 125. This mode may also be utilized in the comparisons previously discussed and illustrated.

In a representative embodiment, as an option, all MAC circuits 190 in a VV accelerator circuit 150 execute the same MAC instruction in lockstep. Different computation patterns (stencils) may cause some of the MAC circuits 190 to be under-utilized. CONV layers have a different computation pattern in their padding regions. If padding zeros are not sent into the maps buffer 105, then the computation window size is smaller in the corners of the input. In CONV layers with padding/corner cases ran in independent mode, the input of the top corner case is not considered as a separate compute step and the MM accelerator circuit 100 can be disabled during processing of the top corner case. This saves a load compared to the naïve approach of considering the top corner as a separate compute step.

In a representative embodiment, as an option, the compiler system 400 can divide the work across MM accelerator circuits 100 or MV accelerator circuits 115 along columns or rows, depending on the amount of data in the maps buffer 105. As an example using 4 MM accelerator circuits 100, if the maps buffer 105 contains data to produce less than 4 rows, then each row can be divided across the MM accelerator circuits 100. For example, using 4 MM accelerator circuits 100 for each of the 3 rows is better than using 3 MM accelerator circuits 100 for 3 rows. When there is not padding, the distinction between rows and column for workload distribution is not needed. A CONV k=1×1 with o=6×6 can be represented as o=36×1 and all MM accelerator circuits 100 produces 9 pixels. The column and row division trade-off comes from different computation patterns. Going back to the 3 rows example, now there is padding in the right and left most pixels of each row. Using 3 MM accelerator circuits 100 for all 3 rows is not worse than using 1 MM accelerator circuit 100 for corner cases for each row.

This is more evident in TCONV layers with stride greater than 1, in which adjacent output pixels may require a different computation pattern. The compiler system 400 (compilation method 500) approaches this in a top-down fashion. It starts with the largest possible groups of output pixels that are broken into smaller groups hoping that it will create a better distribution. Kernel indexes are the computation pattern to be matched, since weights are shared across VV accelerator circuits 150. An output pixel is associated with a sequence of accessed kernel indexes. And a group is a sequence of adjacent output pixels. Different output pixels in a group combines their kernel indexes to create a larger kernel index sequence. A set data structure is used to identify unique sequences of kernel indexes that can be distributed across MV accelerator circuits 115.

Transpose convolution has been changed by creating a memory 25 structure that will contain all the operations to do:

1. A transposed convolution is made of a list of output rows blocks to generate.
2. Each output rows block is made of several rows and a common set of parameters for that block, these parameters being the number of such blocks, the numbers of MV accelerator circuits 115 to use and a set of offsets for MV accelerator circuits 115 and the output.
3. Each row is made of several row parts.
4. Each row part is made of several pixels and a common set of parameters for that part, these parameters being the number of such parts, the numbers of MV accelerator circuits 115 to use and a set of offsets for MV accelerator circuits 115 and the output
5. Each pixel contains the offsets into maps and kernels for generating that pixel.

Figure 21:
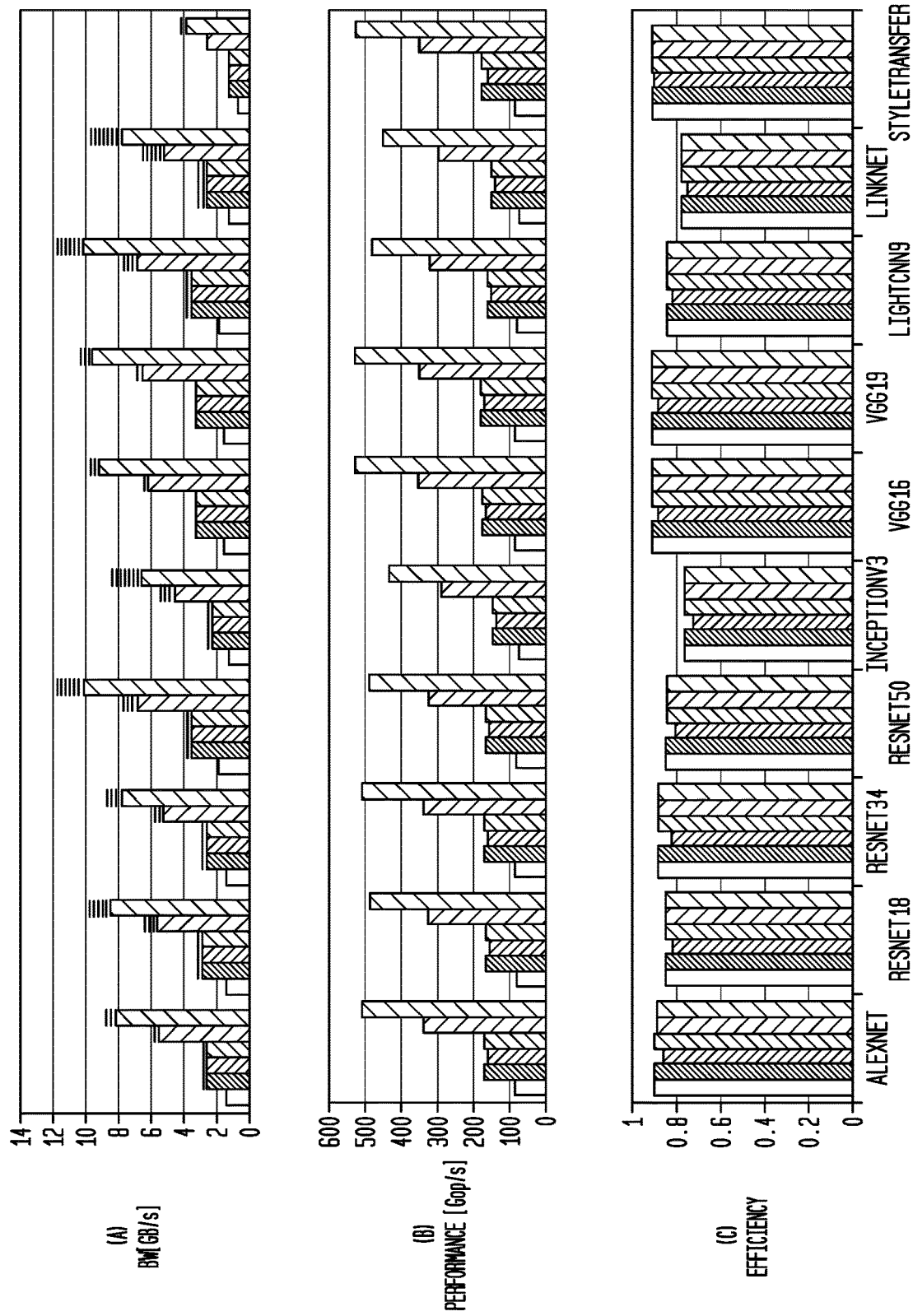
FIG. 21 is a set of bar graphs illustrating bandwidth, performance, and efficiency measurements for the inference engine circuit architecture 50 for different DNN models with instructions or other executable code generated by the compilation method.

FIG. 21 is a set of bar graphs illustrating (A) bandwidth measurements, (B) performance measurements, and (C) efficiency measurements for the inference engine circuit architecture 50 for different DNN models with instructions or other executable code generated by the compilation method 500. The required bandwidth is illustrated with stripped bars and the measured bandwidth is the solid bar. The inference engine circuit architecture 50 used in this work had 512 KB of kernel (weights) buffer 125 and 256 KB of maps buffer 105, 4 KB of instruction cache 244 and 256 MACs 190 per MM accelerator circuit 100. A representative inference engine circuit architecture 50 operating at 187 MHz was implemented using AC510 having a HMC memory and a Xilinx KU060 FPGA. The performance achieved was measured for some DNN models as shown in FIG. 21. The execution time did not account for linear layers. The input size selected generally was 3×224×224, while for LightCNN9 the input size was 1×128×128, for Inception-v3 the input size was 299×299×3, for Linknet and styletransfer the input sizes were 256×256×3. Using an EX750 backplane, multiple AC510 cards were added. The measurements were run on 1 FPGA (1f) or 2 FPGAs (2f), using 1 input image (1i) or 2 images (2i) and using one MM accelerator circuit 100 (1c) or two MM accelerator circuits 100 (2c). For example, 1f1i2c means that 1 image was distributed into two MM accelerator circuits 100 within one FPGA, and 1f2i2c 1 image was processed by each MM accelerator circuit 100 on one FPGA. Efficiency is calculated as ratio between measured execution time and expected execution time at peak performance. Memory bandwidth takes into account input, weights, output and instructions that are moved into/from the inference engine circuit architecture 50. The maximum bandwidth that was achieved on one FPGA was 7 GB/s. The bandwidth required for each layer is plotted in stripped bars. The inference engine circuit architecture 50 was able to scale its performance across MM accelerator circuits 100 and FPGA cards. 1f2i2c bandwidth requirement is higher because it had to send 2× of the input data using the bandwidth provided by 1 FPGA. In 2f2i1c, 2 FPGAs provide more bandwidth, thus it shows higher efficiency. 1f1i2c shows 2× performance boost as expected from using 2× more MACs on same number of operations. The measured power consumption of one AC510 FPGA was 24W, Tegra TX1 14W, Titan-X 154W. On Alexnet without linear layers, performance per power consumed achieved in one AC510 FPGA was 3.8 Gops/W.

Numerous advantages of the representative compiler 400, 500 are readily apparent. The compiler 400, 500 significantly reduces memory usage or bandwidth and increases data reuse, resulting in significant performance and efficiency of accelerator circuits such as the inference engine circuit architecture 50. The compiler 400, 500 merges or fuses neural network layers, including merger or fusion of different functions or operations into network layers, and provides for rearranging instructions or other executable code, all for additional performance and efficiency of accelerator circuits such as the inference engine circuit architecture 50. The compiler 400, 500 also provides for selection of various operating modes, such as cooperative modes, independent modes, mixed cooperative and independent modes, in addition to selection of pipelining modes.

Representative embodiments provide a highly intelligent solution to the complexities of compiling potentially millions of lines of code for a DNN. The bandwidth determinations alone, for innumerable nodes across innumerable layers of a DNN, including all of the potential millions upon millions of combinations and permutations of data movement and computation movement, plus merging of layers, simply cannot be performed both accurately and within a practical or reasonable period of time without the representative automated compilation method. The representative embodiments automate the compilation process to produce a tangible result, namely, reducing memory usage or bandwidth and increasing data reuse, resulting in significant performance and efficiency of accelerator circuits such as the inference engine circuit architecture 50. As a further result, the representative embodiments improve the functioning of accelerator circuits, eliminating the prior art computational bottleneck of data transfers from memory circuits, decreasing the memory requirements, and further serving to decrease the load of the various system components. This improvement of the performance and efficiency of accelerator circuits such as the inference engine circuit architecture 50 further allows deployment of such accelerator circuits in new environments, especially those requiring immediate or other time-sensitive results, such as for artificial intelligence applications, including image recognition, autonomous vehicles, self-driving cars, for example and without limitation.

As used herein, a "processor" 75 or control core 275 may be any type of processor or controller, and may be embodied as one or more processor(s) 75, 275 configured, designed, programmed or otherwise adapted to perform the functionality discussed herein. As the term processor or controller is used herein, a processor 75 may include use of a single integrated circuit ("IC"), or may include use of a plurality of integrated circuits or other components connected, arranged or grouped together, such as controllers, microprocessors, digital signal processors ("DSPs"), array processors, graphics or image processors, parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components, whether analog or digital. As a consequence, as used herein, the term processor or controller should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with associated memory, such as microprocessor memory or additional RAM, DRAM, SDRAM, SRAM, MRAM, ROM, FLASH, EPROM or EEPROM. A processor 75 or control core 275, with associated memory, may be adapted or configured (via programming, FPGA interconnection, or hard-wiring) to perform the methodology of the invention, as discussed herein. For example, the methodology may be programmed and stored, in a processor 75 or control core 275 with its associated memory (and/or memory 25) and other equivalent components, as a set of program instructions or other code (or equivalent configuration or other program) for subsequent execution when the processor 75 or control core 275 is operative (i.e., powered on and functioning). Equivalently, when the processor 75 or control core 275 may be implemented in whole or part as FPGAs, custom ICs and/or ASICs, the FPGAs, custom ICs or ASICs also may be designed, configured and/or hard-wired to implement the methodology of the invention. For example, the processor 75 or control core 275 may be implemented as an arrangement of analog and/or digital circuits, controllers, microprocessors, DSPs and/or ASICs, collectively referred to as a "processor" or "controller", which are respectively hard-wired, programmed, designed, adapted or configured to implement the methodology of the invention, including possibly in conjunction with a memory 25.

The memory circuit 25, 25A, maps buffer 105, kernel buffer 125, and other registers or memory herein, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC") (for memory 25), or memory portion of an integrated circuit (such as the resident memory within a processor 75 or control core 275 or processor IC, or such as maps buffer 105, kernel buffer 125, and other registers or memory herein), whether volatile or non-volatile, whether removable or non-removable, including without limitation RAM, FLASH, DRAM, SDRAM, SRAM, MRAM, FeRAM, ROM, EPROM or EPROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory circuit 25, 25A, maps buffer 105, kernel buffer 125, and other registers or memory herein may be adapted to store various look up tables, parameters, coefficients, other information and data, programs or instructions, and other types of tables such as database tables.

As indicated above, the processor 75 or control core 275 is hard-wired or programmed, using software and data structures of the invention, for example, to perform the methodology of the present invention. As a consequence, the system and related methods of the present invention, including the various instructions of a configuration memory, may be embodied as software which provides such programming or other instructions, such as a set of instructions and/or metadata embodied within a non-transitory computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Matlab, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor 75 or control core 275, for example).

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory circuit 25, maps buffer 105, kernel buffer 125, and other registers or memory herein, e.g., a floppy disk, a CDROM, a CD-RW, a DVD, a magnetic hard drive, an optical drive, or any other type of data storage apparatus or medium, as mentioned above.

The communication interface 45, 45A is utilized for appropriate connection to a relevant channel, network or bus; for example, the communication interface 45, 45A may provide impedance matching, drivers and other functions for a wireline or wireless interface, may provide demodulation and analog to digital conversion for a wireless interface, and may provide a physical interface, respectively, for the processor 75 or control core 275 and/or memory circuit 25, 25A, with other devices. In general, the communication interface 45, 45A is used to receive and transmit data, depending upon the selected embodiment, such as program instructions, parameters, configuration information, control messages, data and other pertinent information.

The communication interface 45, 45A may be implemented as known or may become known in the art, to provide data communication to and from the inference engine circuit architecture 50 and any type of network or external device, such as wireless, optical, or wireline, and using any applicable standard (e.g., one of the various PCI, USB, RJ 45, Ethernet (Fast Ethernet, Gigabit Ethernet, 300ase-TX, 300ase-FX, etc.), IEEE 802.11, Bluetooth, WCDMA, WiFi, GSM, GPRS, EDGE, 3G and the other standards and systems mentioned above, for example and without limitation), and may include impedance matching capability, voltage translation for a low voltage processor to interface with a higher voltage control bus, wireline or wireless transceivers, and various switching mechanisms (e.g., transistors) to turn various lines or connectors on or off in response to signaling from processor 75 or control core 275. In addition, the communication interface 45, 45A may also be configured and/or adapted to receive and/or transmit signals externally to the inference engine circuit architecture 50 and/or compiler 400, such as through hard-wiring or RF or infrared signaling, for example, to receive information in real-time for output on a display, for example. The communication interface 45, 45A may provide connection to any type of bus or network structure or medium, using any selected architecture. By way of example and without limitation, such architectures include Industry Standard Architecture (ISA) bus, Enhanced ISA (EISA) bus, Micro Channel Architecture (MCA) bus, Peripheral Component Interconnect (PCI) bus, SAN bus, or any other communication or signaling medium, such as Ethernet, ISDN, T1, satellite, wireless, and so on.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. In addition, every intervening sub-range within range is contemplated, in any combination, and is within the scope of the disclosure. For example, for the range of 5-10, the sub-ranges 5-6, 5-7, 5-8, 5-9, 6-7, 6-8, 6-9, 6-10, 7-8, 7-9, 7-10, 8-9, 8-10, and 9-10 are contemplated and within the scope of the disclosed range.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

With respect to signals, we refer herein to parameters that "represent" a given metric or are "representative" of a given metric, where a metric is a measure of a state of at least part of the regulator or its inputs or outputs. A parameter is considered to represent a metric if it is related to the metric directly enough that regulating the parameter will satisfactorily regulate the metric. A parameter may be considered to be an acceptable representation of a metric if it represents a multiple or fraction of the metric.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method of compiling neural network code to a plurality of executable instructions or other into executable code for execution by a computational acceleration system having a memory circuit and one or more acceleration circuits having a maps data buffer and a kernel data buffer, each acceleration circuit of the one or more acceleration circuits comprising a plurality of multiply and accumulate ("MAC") circuits, the method comprising:

using one or more processors, from the neural network code, generating a list of neural network layer model objects;

using the one or more processors, fusing available functions and layers in the list of neural network layer model objects;

using the one or more processors, selecting a cooperative mode, an independent mode, or a combined cooperative and independent mode for code execution by the one or more acceleration circuits;

using the one or more processors, determining memory circuit usage when kernel data is maintained in the kernel data buffer for a predetermined number of computations with reordering of maps data movement and computations to utilize the selected kernel data which is currently loaded in the kernel data buffer;

using the one or more processors, determining memory circuit usage when maps data is maintained in the maps data buffer for the predetermined number of computations with reordering of kernel data movement and computations to utilize the selected maps data which is currently loaded in the maps data buffer;

using the one or more processors, determining memory circuit usage when maps data movement is reordered, kernel data movement is reordered, and computations are reordered to utilize one or more rows of the selected maps data or kernel data which is currently loaded respectively in the maps data buffer or in the kernel data buffer;

using the one or more processors, reordering at least one computation to utilize one or more rows of selected maps data or kernel data which is currently loaded respectively in the maps data buffer or in the kernel data buffer;

using the one or more processors, selecting a data movement mode and an ordering of computations which minimizes usage of the memory circuit;

using the one or more processors, generating an ordered sequence of load objects, compute objects, and store objects;

further ordering the sequence of load objects, compute objects, and store objects to reduce any computational latency and to provide data pre-fetching; and using the one or more processors, converting the ordered sequence of load objects, compute objects, and store objects into the plurality of executable instructions or other executable code.

2. The method of compiling of claim 1, wherein the independent mode comprises providing that each MAC circuit, of the plurality of MAC circuits of a selected acceleration circuit, generates an accumulation sum as a complete accumulation result.

3. The method of compiling of claim 2, wherein the cooperative mode comprises providing that each MAC circuit, of the plurality of MAC circuits of the selected acceleration circuit, generates the accumulation sum as a partial result for accumulation with other partial results to form the complete accumulation result.

4. The method of compiling of claim 3, wherein the combined cooperative and independent mode comprises providing that a first group of MAC circuits, of the plurality of MAC circuits of the selected acceleration circuit, operates in the cooperative mode to provide a first complete accumulation result and at least one second group of MAC circuits, of the plurality of MAC circuits of the selected acceleration circuit, operates in the cooperative mode to provide a second complete accumulation result.

5. The method of compiling of claim 1, wherein the step of selecting a data movement mode and an ordering of computations which minimizes usage of the memory circuit further comprises, using the one or more processors, selecting a data movement mode combined with selecting an ordering of computations which together reduce memory circuit bandwidth required for the code execution by reducing movement of maps data or kernel data from the memory circuit.

6. The method of compiling of claim 1, further comprising:

using the one or more processors, determining a maps data size for transferring maps data from the memory circuit to the maps data buffer.

7. The method of compiling of claim 1, further comprising:

using the one or more processors, determining a kernel data size for transferring kernel data from the memory circuit to the kernel data buffer.

8. The method of compiling of claim 1, further comprising:

using the one or more processors, merging a plurality of executable instructions into a plurality of instruction banks without branching between banks of the plurality of instruction banks.

9. The method of compiling of claim 1, further comprising:

using the one or more processors, generating one or more synchronization instructions.

10. The method of compiling of claim 1, wherein the neural network code is open neural network exchange (ONNX) interchange format code.

11. The method of compiling of claim 1, wherein determining memory circuit usage comprises determining memory circuit bandwidth requirements for the execution of the executable instructions or other executable code.

12. A compiler system for compiling neural network code to a plurality of executable instructions or other executable code for execution by a computational acceleration system having a first memory circuit and one or more acceleration circuits having a maps data buffer and a kernel data buffer, each acceleration circuit of the one or more acceleration circuits comprising a plurality of multiply and accumulate ("MAC") circuits, the compiler system comprising:

a second memory circuit configured to store the neural network code; and one or more processors coupled to the second memory circuit, the one or more processors configured to: generate a list of neural network layer model objects from the neural network code; fuse available functions and layers in the list of neural network layer model objects; select a cooperative mode, an independent mode, or a combined cooperative and independent mode for code execution by the one or more acceleration circuits; determine first memory circuit usage when kernel data is maintained in the kernel data buffer for a predetermined number of computations with reordering of maps data movement and computations to utilize the selected kernel data which is currently loaded in the kernel data buffer; determine first memory circuit usage when maps data is maintained in the maps data buffer for the predetermined number of computations with reordering of kernel data movement and computations to utilize the selected maps data which is currently loaded in the maps data buffer; determine first memory circuit usage when maps data movement is reordered, kernel data movement is reordered, and computations are reordered to utilize one or more rows of the selected maps data or kernel data which is currently loaded respectively in the maps data buffer or in the kernel data buffer; reorder at least one computation to utilize one or more rows of selected maps data or kernel data which is currently loaded respectively in the maps data buffer or in the kernel data buffer; select a data movement mode and an ordering of computations which minimizes usage of the first memory circuit; generate an ordered sequence of load objects, compute objects, and store objects; order the sequence of load objects, compute objects, and store objects to reduce any computational latency and to provide data pre-fetching; and convert the ordered sequence of load objects, compute objects, and store objects into the plurality of executable instructions or other executable code.

13. The compiler system of claim 12, wherein the independent mode comprises providing that each MAC circuit, of the plurality of MAC circuits of a selected acceleration circuit, generates an accumulation sum as a complete accumulation result.

14. The compiler system of claim 13, wherein the cooperative mode comprises providing that each MAC circuit, of the plurality of MAC circuits of the selected acceleration circuit, generates the accumulation sum as a partial result for accumulation with other partial results to form the complete accumulation result.

15. The compiler system of claim 14, wherein the combined cooperative and independent mode comprises providing that a first group of MAC circuits, of the plurality of MAC circuits of the selected acceleration circuit, operates in the cooperative mode to provide a first complete accumulation result and at least one second group of MAC circuits, of the plurality of MAC circuits of the selected acceleration circuit, operates in the cooperative mode to provide a second complete accumulation result.

16. The compiler system of claim 12, wherein the one or more processors are further configured to select a data movement mode and an ordering of computations which together reduce first memory circuit bandwidth required for the code execution by reducing movement of maps data or kernel data from the first memory circuit.

17. The compiler system of claim 12, wherein the one or more processors are further configured to determine a maps data size for transferring maps data from the first memory circuit to the maps data buffer.

18. The compiler system of claim 12, wherein the one or more processors are further configured to determine a kernel data size for transferring kernel data from the first memory circuit to the kernel data buffer.

19. The compiler system of claim 12, wherein the one or more processors are further configured to merge a plurality of executable instructions into a plurality of instruction banks without branching between banks of the plurality of instruction banks.

20. The compiler system of claim 12, wherein the one or more processors are further configured to generate one or more synchronization instructions.

21. The compiler system of claim 12, wherein the neural network code is open neural network exchange (ONNX) interchange format code.

22. The compiler system of claim 12, wherein the one or more processors are further configured to determine memory circuit usage by determining memory circuit bandwidth requirements for the execution of the executable instructions or other executable code.

\* \* \* \* \*